(12) United States Patent
Conrad

(10) Patent No.: US 8,048,183 B2
(45) Date of Patent: *Nov. 1, 2011

(54) VACUUM CLEANER WITH A DIVIDER

(75) Inventor: Wayne Ernest Conrad, Hampton (CA)

(73) Assignee: G.B.D. Corp., Nassau (BS)

( * ) Notice: Subject to any disclaimer, the term of this patent is extended or adjusted under 35 U.S.C. 154(b) by 0 days.

This patent is subject to a terminal disclaimer.

(21) Appl. No.: 12/868,620

(22) Filed: Aug. 25, 2010

(65) Prior Publication Data

US 2010/0313531 A1 Dec. 16, 2010

Related U.S. Application Data

(63) Continuation of application No. 11/683,751, filed on Mar. 8, 2007, now Pat. No. 7,803,207.

(60) Provisional application No. 60/780,824, filed on Mar. 10, 2006.

(51) Int. Cl.
*B01D 47/00* (2006.01)
(52) U.S. Cl. ............ 55/426; 55/345; 55/337; 55/346; 55/424; 55/428; 55/429; 55/467; 55/DIG. 3; 15/353
(58) Field of Classification Search ............ 55/426, 55/337, 345, 346, DIG. 3; 15/353
See application file for complete search history.

(56) References Cited

U.S. PATENT DOCUMENTS

| | | | |
|---|---|---|---|
| 2,542,634 A | 2/1951 | Davis et al. | |
| 2,913,111 A | 11/1959 | Rogers | |
| 2,942,691 A | 6/1960 | Dillon | |
| 3,130,157 A | 4/1964 | Kelsall et al. | |
| 3,200,568 A | 8/1965 | McNeil | |
| 3,530,649 A | 9/1970 | Shelton et al. | |
| 3,822,533 A | 7/1974 | Oranje | |
| 3,898,068 A | 8/1975 | McNeil | |
| 3,988,132 A | 10/1976 | Oranje | |
| 3,988,133 A | 10/1976 | Schady | |
| 4,187,088 A | 2/1980 | Hodgson | |

(Continued)

FOREIGN PATENT DOCUMENTS

CA 1218962 A1 3/1987

(Continued)

OTHER PUBLICATIONS

Supplementary European Search Report, dated Jun. 16, 2009, as received on the corresponding EP application No. 07719394.4.

(Continued)

*Primary Examiner* — Jason M Greene
*Assistant Examiner* — Dung H Bui
(74) *Attorney, Agent, or Firm* — Bereskin & Parr LLP S.E.N.C.R.L., s.r.l.; Philip C. Mendes da Costa

(57) ABSTRACT

An indoor vacuum cleaner comprises a dirty air inlet, a handle, a cyclone separator having an outer wall, a fluid inlet downstream from the dirty air inlet and a fluid outlet, a plate having a cyclone chamber surface and positioned to substantially divide the cyclone separator into a cyclone chamber and a dirt collection chamber, each of the cyclone chamber and the dirt collection chamber having an outer wall, the outer wall of each of the cyclone chamber and the dirt collection chamber having an outer perimeter, the dirt collection chamber having a cyclone chamber end spaced from a dirt collection floor, a passage extending between the cyclone chamber and the dirt collection chamber, the passage configured such that separated dirt travels at least outwardly as the dirt travels through the passage and, an air flow motor.

23 Claims, 27 Drawing Sheets

U.S. PATENT DOCUMENTS

| | | | |
|---|---|---|---|
| 4,236,903 A | 12/1980 | Malmsten | |
| 5,078,761 A | 1/1992 | Dyson | |
| 5,129,125 A | 7/1992 | Gamou et al. | |
| 6,221,134 B1 | 4/2001 | Conrad et al. | |
| 6,228,260 B1 | 5/2001 | Conrad et al. | |
| 6,231,645 B1 | 5/2001 | Conrad et al. | |
| 6,251,296 B1 | 6/2001 | Conrad et al. | |
| 6,406,505 B1 | 6/2002 | Oh et al. | |
| 6,440,197 B1 | 8/2002 | Conrad et al. | |
| 6,531,066 B1 | 3/2003 | Saunders et al. | |
| 6,599,338 B2 | 7/2003 | Oh | |
| 6,599,350 B1 | 7/2003 | Rockwell et al. | |
| 6,623,539 B2 | 9/2003 | Lee et al. | |
| 6,746,500 B1 | 6/2004 | Park et al. | |
| 6,782,583 B2 | 8/2004 | Oh | |
| 6,833,015 B2 | 12/2004 | Oh et al. | |
| 6,874,197 B1 | 4/2005 | Conrad et al. | |
| 7,160,346 B2 | 1/2007 | Park | |
| 7,449,040 B2 | 11/2008 | Conrad et al. | |
| 7,488,363 B2 | 2/2009 | Jeong et al. | |
| 7,547,338 B2 | 6/2009 | Kim et al. | |
| 2002/0011053 A1 | 1/2002 | Oh | |
| 2002/0062531 A1 | 5/2002 | Oh | |
| 2002/0134059 A1 | 9/2002 | Oh | |
| 2002/0178535 A1 | 12/2002 | Oh et al. | |
| 2002/0178698 A1 | 12/2002 | Oh et al. | |
| 2002/0178699 A1 | 12/2002 | Oh | |
| 2003/0046910 A1 | 3/2003 | Lee et al. | |
| 2003/0066273 A1 | 4/2003 | Choi et al. | |
| 2003/0159238 A1 | 8/2003 | Oh | |
| 2003/0159411 A1 | 8/2003 | Hansen et al. | |
| 2004/0010885 A1 | 1/2004 | Hitzelberger et al. | |
| 2004/0025285 A1 | 2/2004 | McKormick et al. | |
| 2005/0198769 A1 | 9/2005 | Lee et al. | |
| 2005/0252179 A1 | 11/2005 | Oh et al. | |
| 2006/0037172 A1 | 2/2006 | Choi | |
| 2006/0042206 A1 | 3/2006 | Arnold et al. | |
| 2006/0123590 A1 | 6/2006 | Fester et al. | |
| 2006/0137304 A1 | 6/2006 | Jeong et al. | |
| 2006/0137306 A1 | 6/2006 | Jeong et al. | |
| 2006/0137309 A1 | 6/2006 | Jeong et al. | |
| 2006/0137314 A1 | 6/2006 | Conrad et al. | |
| 2006/0162298 A1 | 7/2006 | Oh et al. | |
| 2006/0162299 A1 | 7/2006 | North | |
| 2006/0168922 A1 | 8/2006 | Oh | |
| 2006/0168923 A1 | 8/2006 | Lee et al. | |
| 2006/0207055 A1 | 9/2006 | Ivarsson et al. | |
| 2006/0207231 A1 | 9/2006 | Arnold | |
| 2006/0230715 A1 | 10/2006 | Oh et al. | |
| 2006/0230723 A1 | 10/2006 | Kim et al. | |
| 2006/0230724 A1 | 10/2006 | Han et al. | |
| 2006/0236663 A1 | 10/2006 | Oh | |
| 2006/0278081 A1 | 12/2006 | Han et al. | |
| 2007/0067944 A1 | 3/2007 | Kitamura et al. | |
| 2007/0079473 A1 | 4/2007 | Min et al. | |
| 2007/0095028 A1 | 5/2007 | Kim et al. | |
| 2007/0095029 A1 | 5/2007 | Min et al. | |
| 2007/0289089 A1 | 12/2007 | Yacobi | |
| 2008/0047091 A1 | 2/2008 | Nguyen | |
| 2008/0134462 A1 | 6/2008 | Jansen et al. | |

FOREIGN PATENT DOCUMENTS

| | | |
|---|---|---|
| EP | 0489468 A1 | 6/1992 |
| EP | 1629758 A3 | 2/2010 |
| FR | 2812531 A | 2/2002 |
| FR | 2812531 A1 | 2/2002 |
| GB | 2365324 B | 7/2002 |
| WO | 2006/026414 A | 3/2006 |
| WO | 20006/026414 A | 3/2006 |

OTHER PUBLICATIONS

Supplementary European Search Report, dated Jun. 16, 2009, as received on the corresponding EP Application No. 07719394.4.
International Report on Patentability, dated Sep. 16, 2008, for International application No. PCT/CA2007/000380.
Office Action, dated Sep. 8, 2009, for U.S. Appl. No. 11/683,751.

VACUUM CLEANER WITH A DIVIDER

CROSS REFERENCE TO RELATED APPLICATIONS

This application is a continuation of U.S. Utility patent application Ser. No. 11/683,751 filed on Mar. 8, 2007, which is still pending, which claims priority from U.S. Provisional Application No. 60/780,824, the entire content of which are hereby incorporated by reference.

FIELD OF THE INVENTION

In one aspect, this invention relates to a cyclonic surface cleaning apparatus, such as a vacuum cleaner, that has a divider that separates a dirt collection chamber from a cyclone chamber. The vacuum cleaner may have a cyclonic stage that comprises a plurality of cyclones in parallel or a plurality of cyclonic stages wherein at least two cyclonic stages comprise a plurality of cyclones in parallel. In another aspect, this invention relates to improved cyclone designs. In a further aspect, this invention relates to improved designs for an array of cyclones, including designs wherein the cyclones are positioned side by side, wherein some, and preferably all of the cyclones are connected in parallel.

BACKGROUND OF THE INVENTION

Cyclonic vacuum cleaners are known in the art. In addition, cyclonic vacuum cleaners which comprise a first stage cyclone and plurality of second stage cyclones are known. An example is shown in Conrad (U.S. Pat. No. 6,782,585). As shown therein, a vacuum cleaner has a first cyclonic cleaning stage comprising a single first stage cyclone and a second cyclonic cleaning stage downstream from the first cyclonic cleaning stage and comprising a plurality of cyclones in parallel.

The plurality of second stage cyclones typically remove particulate matter finer than the particulate matter that is removed in the first cyclonic cleaning stage. Accordingly, the coarsest particulate matter that is entrained in an air stream is removed in the first cyclonic cleaning stage and finer particulate matter is removed in the downstream cyclonic cleaning stage. However, the air exiting the second cyclonic cleaning stage may still contain sufficient particulate matter to damage a suction motor positioned downstream from the second cyclonic cleaning stage. Accordingly, as shown in Conrad, a filter may be positioned downstream from the second cyclonic cleaning stage and upstream from the suction motor.

SUMMARY OF THE INVENTION

In accordance with a first embodiment, a cyclone chamber for a vacuum cleaner may have a plate positioned intermediate the opposed ends (the top end and the bottom end) of the casing of a cyclone separator so as to divide the interior of the cyclone casing into an upper cyclone chamber and a lower dirt collection area or chamber positioned beneath the upper cyclone chamber. The plate, in conjunction with the structure of the cyclone separator, produces a passage that connects the cyclone chamber and the dirt collection chamber in communication such that dirt that enters the cyclone chamber is conveyed to the dirt collection chamber. All, or at least a portion of the passage, extends laterally or outwardly.

The plate may be any of those known in the art such as those disclosed in U.S. Pat. No. 6,874,197. The plate may have a plurality of openings therein or, preferably, it is solid. The plate is positioned inward from the outer wall of the casing so as to define an annular gap between the outer peripheral edge of the plate and the inner wall of the cyclone casing. The plate overlaps a portion of a flow director or a portion of an outwardly extending portion of the casing to define the passage. The peripheral wall of the plate may be of varying geometries and orientations to assist in particle removal.

In an alternate embodiment, instead of a plate, the central portion of the bottom of the cyclone casing may be raised inwardly so as to define a plateau. Accordingly, the dirt collection chamber need not extend under the plate or plateau.

In accordance with a first embodiment of this aspect, there is provided an indoor vacuum cleaner comprising:

(a) a dirty air inlet;
(b) a handle;
(c) a cyclone separator having an outer wall, a fluid inlet downstream from the dirty air inlet and a fluid outlet;
(d) a plate having a cyclone chamber surface and positioned to substantially divide the cyclone separator into a cyclone chamber and a dirt collection chamber, each of the cyclone chamber and the dirt collection chamber having an outer wall, the outer wall of each of the cyclone chamber and the dirt collection chamber having an outer perimeter, the dirt collection chamber having a cyclone chamber end spaced from a dirt collection floor;
(e) a passage extending between the cyclone chamber and the dirt collection chamber, the passage configured such that separated dirt travels at least outwardly as the dirt travels through the passage; and,
(f) an air flow motor.

In one embodiment, the passage is formed between the cyclone chamber surface of the plate and an outwardly extending portion of the outer wall of the cyclone separator.

In another embodiment, the dirt collection chamber and the cyclone chamber each have an outer perimeter, the plate is positioned below the outwardly extending portion and the outer perimeter of the dirt collection chamber is larger then the outer perimeter of the cyclone chamber.

In another embodiment, the plate comprises a disc positioned adjacent the cyclone chamber end of the dirt collection chamber and the dirt collection chamber extends under at least a portion of the disc.

In another embodiment, the plate comprises a floor of the cyclone chamber and the dirt collection chamber does not extend under all of the floor.

In another embodiment, the plate comprises a floor of the cyclone chamber and the dirt collection chamber does not extend under the floor.

In another embodiment, the vacuum cleaner further comprises a flow director having a flow directing surface that extends inwardly and downwardly into the cyclone chamber from the outer wall of the cyclone chamber to a position above the plate and the passage is formed between the flow director and the cyclone chamber surface of the plate.

In another embodiment, the vacuum cleaner further comprises an annular dirt collection region collinear with the cyclone chamber and separated therefrom by an inner annular wall that has a terminal end spaced from the plate and the passage is formed between the terminal end and the cyclone chamber surface of the plate.

In another embodiment, the fluid outlet comprises a tube having an inlet and the tube extends along the axis of the cyclone chamber to a position below the fluid inlet and has an end that is spaced from the plate. Preferably, a screen is provided in covering relation to the inlet of the air flow tube and the screen is spaced from the plate.

In another embodiment, the cyclone separator has a diameter adjacent the fluid inlet and the passage has a height that is less than ⅓ the diameter, preferably, less than ⅙ the diameter, more preferably less than 1/10 the diameter and most preferably less than 1/20 the diameter.

In another embodiment, the dirt collection chamber has a bottom that is openable.

In another embodiment, the plate is removably subsequent to the bottom being opened.

In accordance with a second embodiment of this aspect, there is provided a cyclone separator comprising:
(a) an outer wall, a fluid inlet and a fluid outlet, the fluid outlet comprises a tube having an inlet and the tube extends along the axis of the cyclone separator to a position below the fluid inlet;
(b) a plate having a cyclone chamber surface and positioned to substantially divide the cyclone separator into a cyclone chamber and a dirt collection chamber, each of the cyclone chamber and the dirt collection chamber having an outer wall, the outer wall of each of the cyclone chamber and the dirt collection chamber having an outer perimeter, the dirt collection chamber having a cyclone chamber end spaced from a dirt collection floor, the fluid outlet has an end that is spaced from the plate; and,
(c) a passage extending between the cyclone chamber and the dirt collection chamber, the passage configured such that separated dirt travels at least outwardly as the dirt travels through the passage.

In another embodiment, the plate is removably subsequent to the bottom being opened.

It will be appreciated that any of the alternate embodiments set out with respect to the first embodiment may be used with this second embodiment, and that they may be combined in an apparatus in any combination or sub-combination.

In accordance with a third embodiment of this aspect, there is provided a cyclone separator comprising:
(a) an outer wall, a fluid inlet and a fluid outlet, the cyclone separator has a diameter adjacent the fluid inlet;
(b) a plate having a cyclone chamber surface and positioned to substantially divide the cyclone separator into a cyclone chamber and a dirt collection chamber, each of the cyclone chamber and the dirt collection chamber having an outer wall, the outer wall of each of the cyclone chamber and the dirt collection chamber having an outer perimeter, the dirt collection chamber having a cyclone chamber end spaced from a dirt collection floor; and,
(c) a passage extending between the cyclone chamber and the dirt collection chamber, the passage configured such that separated dirt travels at least outwardly as the dirt travels through the passage, the passage has a height that is less than ⅓ the diameter.

It will be appreciated that any of the alternate embodiments set out with respect to the first embodiment may be used with this third embodiment and that they may be combined in an apparatus in any combination or sub-combination.

In accordance with a second embodiment of the instant invention, a plate of the first embodiment, or any plate known in the art, is moveably mounted in a cyclone casing independent of the movement of a bottom opening door, or may be removably mounted. For example, the plate may be secured in position by means of magnets. Alternately, the plate may be held in position mechanically, such as by the plate having one or more members that are received in an opening and secured therein by, e.g., a releasable snap fit. Thus the plate may be snapped into position and removed therefrom as required. Alternately, or in addition, the plate may be mounted on a mechanical member for movement from a first position wherein the plate divides the cyclone casing interior into a cyclone chamber and a dirt collection chamber and a second position wherein the plate has been moved to a position wherein the plate is positioned such that dirt may pass generally freely from one chamber to the other and then out an open end of the cyclone casing. For example, the plate may be pivoted to a position generally parallel to the longitudinal axis of the cyclone casing.

One advantage of this design is that the magnets permit the plate to be removed for disposal and/or cleaning. In addition, a further advantage of using magnets is that the magnets will assist in attracting and retaining magnetic particles in the cyclone chamber, thereby increasing the efficiency of the cyclone. In particular, carbon dust, which is produced by electric motors that have brushes, is magnetic. Accordingly, the use of a cyclone or cyclones incorporating magnets will assist in the removal of carbon dust from an air stream. Accordingly, it is preferred to utilize a cyclone or array of cyclones containing magnets downstream from a motor and, optionally, in place of a filter, such as a HEPA filter. It will be appreciated that magnets may be used to assist in particle capture in any of the embodiments set out herein.

In accordance with a first embodiment of this aspect, there is provided a surface cleaning apparatus comprising:
(a) a dirt inlet;
(b) a handle;
(c) a cyclone separator having an outer wall, a fluid inlet downstream from the dirt inlet and a fluid outlet;
a plate having a cyclone chamber surface and positioned to substantially divide the cyclone separator into a cyclone chamber and a dirt collection chamber, the plate being removably mounted in the cyclone separator;
(d) a passage extending between the cyclone chamber and the dirt collection chamber; and,
(e) a fluid flow motor.

In one embodiment, the plate is retained in position in the cyclone separator by magnets.

In another embodiment, the plate is mechanically retained in position. For example, the cyclone separator has a mechanical engagement member and the plate has a portion that is engageable with the mechanical engagement member.

In another embodiment, the plate has a hand grip portion. Preferably, the hand grip portion comprises a shaft extending away from the plate.

In another embodiment, the dirt collection chamber extends under the plate.

In another embodiment, a flow director having a flow directing surface that extends inwardly and downwardly into the cyclone chamber from the outer wall of the cyclone chamber to a position above the plate.

In another embodiment, the surface cleaning apparatus is selected from the group consisting of a vacuum cleaner, a sweeper and a carpet extractor.

In another embodiment, the dirt collection chamber has a bottom that is openable.

In another embodiment, the plate is removably subsequent to the bottom being opened.

In accordance with a second embodiment of this aspect, there is provided a surface cleaning apparatus comprising:
(a) a dirt inlet;
(b) a handle;
(c) a cyclone separator having an outer wall, a fluid inlet downstream from the dirt inlet, an openable bottom and a fluid outlet;

(d) a plate having a cyclone chamber surface and positioned to substantially divide the cyclone separator into a cyclone chamber and a dirt collection chamber, the plate being movably mounted in the cyclone separator independent of the bottom;

(e) a passage extending between the cyclone chamber and the dirt collection chamber; and, (f) a fluid flow motor.

It will be appreciated that any of the alternate embodiments set out with respect to the first embodiment may be used with this second embodiment. and that they may be combined in an apparatus in any combination or sub-combination.

In accordance with a third aspect of the instant invention, a filtration unit for a surface cleaning apparatus, preferably a vacuum cleaner, uses at least two cyclonic stages wherein each stage comprises a plurality of cyclones in parallel. An advantage of this design is that the backpressure across the cyclones is reduced. For example, the cyclonic separation construction of the filtration unit, may include a first stage comprising a plurality of cyclones in parallel and a second stage comprising a plurality of cyclones in parallel. In current known design, a single first stage cyclone is used. In comparison, pursuant to this third embodiment, the dirty air in a surface cleaning apparatus may be first subjected to treatment in a cyclonic stage comprising a plurality of cyclones in parallel and subsequently treated in a cyclonic stage comprising a plurality of cyclones in parallel wherein both stages are preferably upstream of the air flow motor. A third cyclonic stage comprising a plurality of cyclones in parallel may be positioned downstream from the air flow motor.

Preferably, each cyclone of one stage is not in fluid flow communication with all of the cyclones of the subsequent stage. More preferably, each of the cyclones of one stage is in fluid communication with only one downstream cyclone. Accordingly, the air exiting one cyclone is fed to only one downstream cyclone.

In accordance with this preferred design, the outlet from an upstream cyclone is connected in fluid communication with the inlet to a downstream cyclone. The outlet of the upstream cyclone may be tangential or a spiral, which extends for less than a full revolution. More preferably, the outlet of the upstream cyclone and the inlet of the downstream cyclone each are configured such that they individually extend for less than a full revolution. When the outlet and the inlet are directly connected together, together they may comprise a continuous spiral that extends more than one revolution. Accordingly, the outlet from the upstream cyclone and the inlet to the downstream cyclone, when merged, may form a continuous spiral. One advantage of this design is that the rotational momentum of the air developed in an upstream cyclone may be utilized and, preferably, enhanced in a downstream cyclone. For example, when an air stream enters a first cyclone, energy will be expended to produce rotational motion in the air. If a tangential outlet is utilized, then some of the rotational momentum may be preserved and in fact enhanced, as the air travels through the tangential outlet. If the tangential outlet merges or is fed to the inlet of a downstream cyclone, then the rotational momentum may be preserved and enhanced without having a substantially longer spiral or tangential inlet. It will be appreciated that the use of a tangential outlet from an upstream cyclone and a tangential inlet to a downstream cyclone wherein they are connected to maintain at least some rotational momentum, and preferably are connected together, may be used in alternate constructions. For example, they may be used with any embodiment disclosed herein. They may be used in embodiments wherein one cyclone is in communication with more than one downstream cyclone and in other fields of application.

In accordance with a first embodiment of this aspect, there is provided a household appliance comprising:

(a) a dirt inlet;

(b) first and second cyclonic stages wherein each cyclonic stage comprises a plurality of cyclones in parallel and the second cyclonic stage is downstream from the first cyclonic stage; and, (c) a fluid flow motor.

In one embodiment, at least one of the cyclones has a dirt collection chamber that, during operation of the portable appliance, is not in communication with any other cyclone.

In another embodiment, each cyclone of at least one of the cyclonic stages has an associated dirt collection chamber and each dirt collection chamber is associated with only one cyclone. Preferably, all of the dirt collection chambers are emptied concurrently. More preferably, the dirt collection chambers have a common openable bottom.

In another embodiment, each cyclone in the second cyclonic stage is connected in fluid flow communication with one cyclone in the first cyclonic stage.

In another embodiment, each cyclone of the first cyclonic stage has a fluid outlet and each cyclone of the second cyclonic stage has a fluid inlet and the outlet of a cyclone of the first cyclonic stage and the inlet of a cyclone of the second cyclonic stage form a continuous passage. Preferably, the fluid outlet is configured to maintain at least some of the cyclonic flow produced by fluid flowing through an associated cyclone. More preferably, the passage comprises a continuous curve.

In another embodiment, at least one of the cyclonic stages comprises at least 15 cyclones in parallel, preferably at least 20 and more preferably about 25 or more.

In another embodiment, at least one of the cyclonic stages comprises at least one cyclone per square inch and, preferably, at least two cyclones per square inch.

In another embodiment, the appliance is a surface cleaning apparatus, a household air cleaner or a breathing mask.

In another embodiment, the appliance is a surface cleaning apparatus.

In another embodiment, the surface cleaning apparatus is selected from the group consisting of a vacuum cleaner, a sweeper and a carpet extractor.

In another embodiment, the cyclonic stages are positioned upstream from the motor. Preferably, the air travels from the cyclonic stages to the motor without passing through a filter.

In another embodiment, the portable appliance further comprises an additional cyclonic stage wherein three cyclonic stages are positioned upstream from the motor.

In another embodiment, the air travels from the three cyclonic stages to the motor without passing through a filter.

In another embodiment, the portable appliance further comprises a post motor cyclonic stage. Preferably, fluid exiting the post motor cyclonic stage has a level of filtration at least equal to HEPA without the use of a HEPA filter. Alternately, or in addition, the post motor cyclonic stage comprises a plurality of cyclones in parallel.

In another embodiment, the first and second cyclonic stages are each separately removable from the appliance.

It will be appreciated that any of these alternate embodiments may be combined in an apparatus in any combination or sub-combination.

In accordance with a fourth aspect of the instant invention, a surface cleaning apparatus, preferably a vacuum cleaner, has two cyclonic stages wherein one of the cyclonic stages comprises a plurality of cyclones in parallel and at least one dirt collection chamber associated therewith, wherein the plurality of cyclones and associated dirt collection chamber or chambers comprise a cyclonic unit which is removable from the surface cleaning apparatus as a sealed unit, other than openings for fluid flow passages leading to and from the cyclones. In a preferred embodiment, the dirt collection chambers have a sufficient capacity such that they may require emptying only once a month, during normal use, preferably once every three months and more preferably once every four months. Once advantage of this design is that, due to the increased storage capacity, the cyclonic unit need only be removed and emptied occasionally and therefore may remain in the surface cleaning apparatus much of the time when a main or first stage collection chamber is removed for emptying. For example, if a first cyclonic stage is removed for emptying, retaining a second cyclonic stage in the surface cleaning apparatus reduces the weight and size of the component that is removed from the surface cleaning apparatus when the first stage is to be emptied.

Alternately, or in addition, in accordance with this fourth embodiment, a surface cleaning apparatus, preferably a vacuum cleaner, has at least first and second cleaning stages wherein the first cleaning stage has a dirt collection member and the second cleaning stage comprises a plurality of cyclones and at least one dirt collection chamber, wherein the first and second cleaning stages are emptied separately. Preferably, each stage comprises a plurality of cyclones and, more preferably, each stage comprises a plurality of dirt collection chambers.

In accordance with a first embodiment of this aspect, there is provided a portable vacuum cleaner comprising:
(a) a dirty air inlet;
(b) a handle;
(c) at least first and second cleaning stages wherein the first cleaning stage has a dirt collection member and the second cleaning stage comprises a plurality of cyclones and at least one dirt collection chamber, wherein the first and second cleaning stages are emptied separately; and,
(d) an air flow motor.

In one embodiment, the second cleaning stage is removed from the first cleaning stage prior to emptying the second cleaning stage.

In another embodiment, the second cleaning stage is removed by itself from the vacuum cleaner. Preferably, second cleaning stage includes at least one filter.

In another embodiment, the first and second cleaning stages are each separately removable from the vacuum cleaner. Preferably, the second cleaning stage is downstream from the first cleaning stage. Alternately, or in addition, the first cleaning stage comprises at least one cyclone and the dirt collection member comprises a dirt collection chamber.

In another embodiment, the first cleaning stage has a capacity to store dirt for a predetermined number of one hour sessions of use of the vacuum cleaner for regular household cleaning and the second cleaning stage has a capacity to store dirt for at least three times and, preferably ten times, the predetermined number.

In another embodiment, each of the first and second cleaning stages has a storage volume and the storage volume of the second stage is selected such that, when the vacuum cleaner is used to collect particulate matter for which the vacuum cleaner is designed, the second cleaning stage requires emptying not more than once for every three times, and preferably not more than once every ten times, the first stage is emptied.

In another embodiment, the second cleaning stage has a capacity to store dirt for at least one month of regular use of the vacuum cleaner.

In another embodiment, the second cleaning stage has a capacity to store dirt for at least three months of regular use of the vacuum cleaner.

In another embodiment, the second cleaning stage has a plurality of dirt collection chambers that are emptied concurrently.

In another embodiment, each cyclone of the second cleaning stage has an associated dirt collection chamber and each dirt collection chamber is associated with only one cyclone and all of the dirt collection chambers of the second cleaning stage are emptied concurrently.

In another embodiment, the plurality of cyclones and at least one dirt collection chamber are removable as a closed unit from the vacuum cleaner. Preferably, the dirt collection chamber has an openable bottom. Alternately, or in addition, the second cleaning stage has a plurality of dirt collection chambers that are emptied concurrently.

In another embodiment, the second cleaning stage is sealed when removed from the vacuum cleaner other than fluid flow passages leading to and from the cyclones.

In another embodiment, the vacuum cleaner is selected from the group consisting of an upright vacuum cleaner, a wet/dry vacuum cleaner and a canister vacuum cleaner.

In another embodiment, the vacuum cleaner further comprises a door moveable to an open position wherein the second cleaning stage is removable when the door is in the open position.

In another embodiment, the second cleaning stage is slidably removable from the vacuum cleaner.

In another embodiment, the second cleaning stage is removably mounted to the first cleaning stage. Preferably, the second cleaning stage is moveable upwardly from the first cleaning stage.

It will be appreciated that any of these alternate embodiments may be combined in an apparatus in any combination or sub-combination.

In accordance with a second embodiment of this aspect, there is provided a surface cleaning apparatus comprising:
(a) a dirt inlet;
(b) a handle;
(c) at least first and second cleaning stages wherein the second cleaning stage comprises a plurality of cyclones and at least one dirt collection chamber, wherein, other than fluid flow passages leading to and from the cyclones, the second cleaning stage is removable from the surface cleaning apparatus as a sealed unit for emptying; and,
(d) an air flow motor.

It will be appreciated that any of the alternate embodiments set out with respect to the first embodiment may be used with this second embodiment. and that they may be combined in an apparatus in any combination or sub-combination In accordance with a fifth aspect of this invention, a surface cleaning apparatus is constructed with a plurality of cyclones in parallel that have at least one associated dirt collection chamber, and preferably a plurality of dirt collection chambers, wherein the interior of the at least one dirt collection chamber, and preferably each dirt collection chamber, is visible from a position exterior to the surface cleaning apparatus. Therefore, a consumer can see the amount of dirt collected in the dirt chamber and determine when the dirt chamber should be emptied. This is particularly advantageous if the surface cleaning apparatus has two cyclonic stages and the stages are separately emptyable and, more preferably, separately removable. Therefore, a consumer will be able to visually determine when the stage should be emptied. This aspect is particularly preferred if combined with the fourth aspect, especially if the second stage has a dirt capacity wherein it need not be emptied every time the first stage is emptied.

While all or part of the associated cyclone(s) and the dirt collection chamber(s) may be transparent (i.e., see through), in a particularly preferred embodiment, the only transparent portion need be the upper end of the dirt collection chamber (e.g., the portion extending below a maximum fill line). Thus only the top, or all of, the dirt collection chamber(s) may be transparent. One advantage of this design is that when the dirt collection bin is full, a user will not see into the interior of any of the dirt collection chamber and will have a visual signal to empty the cyclonic stage. If both the interior of the cyclone and the dirt collection chamber are visible, then a consumer may overfill the dirt collection chamber thereby decreasing the efficiency of the surface cleaning apparatus. Preferably, the portion above a predetermined fill line is not transparent. For example, all of the cyclone casing may be made from transparent plastic and the required portion may be masked by coating it (e.g., paint) and/or by applying a label.

In accordance with a first embodiment of this aspect, there is provided a surface cleaning apparatus comprising:
(a) a dirt inlet;
(b) a handle;
(c) a cyclonic cleaning unit comprising a plurality of cyclones and at least one dirt collection chamber, each of the plurality of cyclones having an outer wall, an interior, a fluid inlet downstream from the dirt inlet and a fluid outlet;
(d) the at least one dirt collection chamber having an outer wall and an interior, wherein the surface cleaning apparatus is constructed such that the interior of the at least one dirt collection chamber is visible from a position exterior to the surface cleaning apparatus; and,
(e) a fluid flow motor.

In one embodiment, the outer wall of the at least one dirt collection chamber has at least a transparent portion.

In another embodiment, the at least one dirt collection chamber has a maximum recommended dirt capacity and the transparent portion extends downwardly from a position defining the maximum recommended dirt capacity.

In another embodiment, the at least one dirt collection chamber has a maximum recommended dirt capacity and the outer wall of the at least one dirt collection chamber is opaque above a position defining the maximum recommended dirt capacity.

In another embodiment, the outer wall of the at least one dirt collection chamber is an outer wall of the surface cleaning apparatus. Preferably, all of the outer wall of the at least one dirt collection chamber is transparent. More preferably, the surface cleaning apparatus further comprises a transparent wall positioned radially outwardly of the outer wall of the at least one dirt collection chamber.

In another embodiment, the surface cleaning apparatus further comprises a wall positioned exterior to the outer wall of the at least one dirt collection chamber, at least a sufficient portion of which is transparent to permit a user to view the transparent portion of the outer wall of the at least one dirt collection chamber.

In another embodiment, each of the plurality of cyclones has an associated dirt collection chamber. Preferably each of the associated dirt collection chambers has an outer wall, at least a portion of which is transparent. Alternately, or in addition, each of the associated dirt collection chambers has a bottom that is openable.

In another embodiment, each of the plurality of cyclones has a plate positioned to substantially divide the cyclone separator into a cyclone chamber and a dirt collection chamber.

In another embodiment, the surface cleaning apparatus has at least first and second cyclonic stages and the cyclonic cleaning unit comprises the second cyclonic stage.

In another embodiment, the first and second cyclonic stages are each separately removable from the surface cleaning apparatus.

In another embodiment, the first cyclonic stage comprises a single cyclone.

In another embodiment, the first cyclonic stage comprises a plurality of cyclones in parallel. Preferably, the plurality of cyclones of the first cyclonic cleaning unit have at least one first stage dirt collection chamber, the at least one first stage dirt collection chamber having a first stage outer wall and a first stage interior, wherein the surface cleaning apparatus is constructed such that the first stage interior is visible from a position exterior to the surface cleaning apparatus.

In another embodiment, at least a portion of the outer wall of each of the cyclones is transparent.

In another embodiment, the outer wall of each of the cyclones is transparent.

In another embodiment, the portion of the outer walls of the cyclones form an outer wall of the surface cleaning apparatus.

In another embodiment, the surface cleaning apparatus further comprises a wall positioned exterior to the outer wall of the cyclones, at least a sufficient portion of which is transparent to permit a user to view the transparent portion of the outer wall of the cyclones.

In another embodiment, each cyclone and associated dirt collection chamber is integrally molded from transparent plastic. Preferably, the outer walls of the dirt collection chambers are a portion of an outer surface of the surface cleaning apparatus and the transparent plastic of the cyclone is treated to render the sidewalls of the cyclones opaque. Alternately, or in addition, the surface cleaning apparatus further comprises a wall positioned exterior to the cyclonic cleaning unit, at least a sufficient portion of which is transparent to permit a user to view the interior of only the dirt collection chambers.

In another embodiment, the surface cleaning apparatus further comprises a header in fluid flow communication with the fluid outlets from the cyclones wherein the header is transparent.

In another embodiment, the surface cleaning apparatus further comprises a filter housing, at least a portion of which is transparent. Preferably, the transparent portion of the filter housing is visible when the vacuum cleaner is in use.

In another embodiment, the surface cleaning apparatus further comprises a filter housing, at least a portion of which is transparent wherein the transparent portion of the filter housing is visible when at least one of the cyclonic stages is removed.

It will be appreciated that any of these alternate embodiments may be combined in an apparatus in any combination or sub-combination.

In accordance with a second embodiment of this aspect, there is provided a surface cleaning apparatus comprising:
(a) a dirt inlet;
(b) a handle;
(c) at least one cyclonic cleaning stage;
(d) a filter housing, at least a portion of which is transparent; and,
(e) a fluid flow motor.

In one embodiment, the transparent portion of the filter housing is visible when the vacuum cleaner is in use.

In another embodiment, the cyclonic cleaning stage is removable from the surface cleaning apparatus and the transparent portion of the filter housing is visible when the cyclonic cleaning stage is removed.

In another embodiment, the surface cleaning apparatus further comprises an openable door and the transparent portion of the filter housing is visible when the door is open.

In another embodiment, filter is a pre-motor filter.

In another embodiment, all of the filter housing is transparent.

In another embodiment, the surface cleaning apparatus has at least first and second cyclonic cleaning stages. Preferably, the first and second cyclonic cleaning stages are each separately removable from the surface cleaning apparatus. Alternately, or in addition, the first cyclonic cleaning stage comprises a single cyclone. Alternately, or in addition, at least one cyclonic cleaning stage comprises a plurality of cyclones in parallel.

It will be appreciated that any of the alternate embodiments set out with respect to the first embodiment may be used with this second embodiment and that they may be combined in an apparatus in any combination or sub-combination.

In accordance with a sixth aspect of this invention, a surface cleaning apparatus is provided with at least a visible portion of the interior of a cyclone separator and an illumination member that is positioned to provide illumination to at least a portion of the cyclone separator interior. One advantage of this design is that it enhances the ability of a user to view the cyclonic action in the cyclone chamber (and know if there is a problem by the air flow pattern) and/or to know when the dirt collection chamber requires emptying. For example, if a vacuum cleaner is used under low light conditions, e.g. at night in a room, then it may be difficult for a consumer to view the interior of the cyclone separator. It will be appreciated that this aspect is particularly useful if combined with one or both of the fourth and fifth aspects.

If too much dirt accumulates in a dirt collection chamber, then the efficiency of the cyclone decreases and the amount of dirt that travels through the cyclone without being captured increases. This may result in excessive dirt passing through the suction motor of an appliance, such as a vacuum cleaner, thereby shortening the life expectancy of the appliance. Enhancing the ability of a consumer to monitor the dirt that has been captured by a cyclone separator reduces the likelihood of a consumer allowing too much dirt to accumulate in a dirt collection bin of a cyclone.

In accordance with this aspect, all or a portion of the cyclone separator casing may be constructed from an electroluminescent material. Alternately, the inner wall of all or a portion of a cyclone may be coated with an electroluminescent material.

For example, all or a portion of the front portion of the cyclone may be transparent and all or a portion of the rear portion may have an electroluminescent coating. The illumination provided by the electroluminescent material enhances the ability of a consumer to view the interior of the cyclone chamber and determine the amount of dirt that has accumulated therein. Accordingly, it will be more apparent to a consumer when the dirt collection chamber or bin (which is preferably part of the cyclone separator casing) needs to be emptied. Alternately, only the cyclone separator casing housing the cyclone chamber may be so treated or made of an electroluminescent material, whereby the appearance of dirt accumulating in the cyclone chamber may be a visible signal to a user to empty the dirt collection chamber.

Alternately, or in addition, one or more lights may be provided internal of a cyclone chamber and/or directed at the interior of a cyclone chamber so as to enhance the ability of a consumer to determine the amount of dirt present in the cyclone chamber. Preferably, the light comprises one or more LEDs.

In accordance with an embodiment of this aspect, there is provided a surface cleaning apparatus having an outer surface and comprising:
 (a) a dirt inlet;
 (b) a handle;
 (c) a cyclone separator having a cyclone separator interior and an outer wall having an inner surface, the cyclone separator comprising a cyclone chamber and a dirt collection chamber, the dirt collection chamber and the cyclone chamber each having an outer wall, the surface cleaning apparatus is constructed such that the cyclone separator interior is visible from a position exterior to the surface cleaning apparatus;
 (d) an illumination member positioned to provide illumination to at least a portion of the cyclone separator interior; and,
 (e) a fluid flow motor.

In one embodiment, the illumination member comprises electroluminescent material and a portion of the cyclone separator is constructed from the electroluminescent material. Preferably, the cyclone separator has a front portion and a rear portion and the rear portion is constructed from the electroluminescent material and the front portion is transparent.

In another embodiment, the illumination member comprises an electroluminescent coating and a portion of the cyclone separator is coated with the electroluminescent coating. Preferably, the cyclone separator has a front portion and a rear portion and the rear portion is coated with the electroluminescent coating and the front portion is transparent.

In another embodiment, the illumination member comprises at least one light.

In another embodiment, the light is positioned within the cyclone separator.

In another embodiment, the light is positioned exterior to the cyclone separator and light produced thereby is directed inwardly to the cyclone separator interior.

In another embodiment, the light comprises at least one LED.

In another embodiment, the dirt collection chamber has a dirt chamber interior, wherein the surface cleaning apparatus is constructed such that the interior of the dirt collection chamber is visible from a position exterior to the surface cleaning apparatus and the illumination member is positioned to provide illumination to at least a portion of the dirt chamber interior.

In another embodiment, the outer wall of the cyclone separator has at least a transparent portion and the transparent portion forms a portion of the outer surface of the surface cleaning apparatus.

In another embodiment, the outer wall of the dirt collection chamber has at least a transparent portion and the transparent portion forms a portion of the outer surface of the surface cleaning apparatus.

In another embodiment, the outer wall of the cyclone separator has at least a transparent portion and the surface cleaning apparatus further comprises a wall positioned exterior to the outer wall of the cyclone separator, at least a sufficient portion of which is transparent to permit a user to view the transparent portion of the outer wall of the cyclone separator.

In another embodiment, the outer wall of the dirt collection chamber has at least a transparent portion and the surface cleaning apparatus further comprises a wall positioned exterior to the outer wall of the dirt collection chamber, at least a sufficient portion of which is transparent to permit a user to view the transparent portion of the outer wall of the dirt collection chamber.

In another embodiment, all of the outer wall of the dirt collection chamber is transparent. Preferably, the surface cleaning apparatus further comprises a transparent wall positioned radially outwardly of the outer wall of the dirt collection chamber. Alternately, or in addition, all of the outer wall of the cyclone separator is transparent and at least one of the transparent plastic of the cyclone separator and the transparent wall is treated to inhibit a user viewing the cyclone chamber.

In another embodiment, all of the outer wall of the cyclone separator is transparent plastic, the outer wall of the cyclone separator is a portion of the outer surface of the surface cleaning apparatus and the transparent plastic of the cyclone separator is treated to render the outer wall of the cyclone chamber opaque.

It will be appreciated that any of these alternate embodiments may be combined in an apparatus in any combination or sub-combination.

In accordance with a seventh aspect of this invention, a surface cleaning apparatus is provided with a cyclonic stage comprising a plurality of cyclones in parallel and a plurality of dirt collection chambers that are emptied concurrently wherein the plurality of cyclones and the plurality of dirt collection chambers are removable as a unit from the surface cleaning apparatus. One advantage of this design is that by using a plurality of dirt collection chambers, cross flow between cyclones via the dirt exit of the cyclones is reduced. In a particularly preferred embodiment, each cyclone has its own dirt collection chamber. In practice, there may be a different vacuum level in each cyclone of a plurality of cyclones. If there is a common dirt collection chamber for a plurality of cyclones, then some air will tend to travel out the dirt exit of one cyclone and across the common dirt collection chamber and enter a second cyclone via the dirt exit of the second cyclone, resulting in some dirt reentering the second cyclone. A further advantage is that the cyclone dirt chambers are removed from the surface cleaning apparatus while closed so that they may be transported to a garbage can or the like for emptying without the contents being scattered during transport.

In accordance with an embodiment of this aspect, there is provided a surface cleaning apparatus comprising:
 (a) a dirt inlet;
 (b) a handle;
 (c) at least a first cleaning stage comprising a plurality of cyclones in parallel and a plurality of dirt collection chambers that are emptied concurrently wherein the plurality of cyclones and the plurality of dirt collection chambers are removable as a unit from the surface cleaning apparatus; and,
 (d) an air flow motor.

In one embodiment, each cyclone has an associated dirt collection chamber and each dirt collection chamber is associated with only one cyclone and all of the dirt collection chambers are emptied concurrently. Preferably, the dirt collection chambers have a common bottom that is openable.

In another embodiment, the surface cleaning apparatus further comprises a second cleaning stage and the first cleaning stage is removed from the second cleaning stage prior to emptying the plurality of dirt collection chambers.

In another embodiment, the surface cleaning apparatus further comprises a second cleaning stage and the first cleaning stage is removed by itself from the surface cleaning apparatus. Preferably, the first and second cleaning stages are concurrently removed from the surface cleaning apparatus and the first cleaning stage is removed from the second cleaning stage prior to emptying the plurality of dirt collection chambers.

In another embodiment, first cleaning stage comprises a cyclonic cleaning unit that is sealed when removed from the surface cleaning apparatus other than fluid flow passages leading to and from the cyclones.

In another embodiment, the first cleaning stage includes at least one filter removable with the first cleaning stage.

In another embodiment, the surface cleaning apparatus further comprises a door moveable to an open position wherein the first cleaning stage is removable when the door is in the open position.

In another embodiment, the first cleaning stage is slidably removable from the surface cleaning apparatus.

In another embodiment, the cyclonic cleaning unit is removably mounted to a second cleaning stage and the first cleaning stage is moveable upwardly from the first cleaning stage.

In another embodiment, the first cleaning stage comprises at least 15 cyclones in parallel.

In another embodiment, the first cleaning stage comprises at least one cyclone per square inch, preferably at least two cyclones per square inch, and more preferably at least four cyclones per square inch.

In another embodiment, the surface cleaning apparatus is selected from the group consisting of a vacuum cleaner, a sweeper and a carpet extractor.

In another embodiment, cyclones of the first cleaning stage are spaced apart to define a region between adjacent cyclones in which particulate matter collects. Preferably the region has a floor that is moveable, whereby the collection area may be emptied when the floor is moved. Preferably, the dirt collection chambers of the first cleaning stage have a common bottom that is openable and the floor is moved when the common bottom is opened. Preferably the common bottom and the floor comprise a continuous member that is moveably mounted, and preferably pivotally mounted, to the first cleaning stage.

In another embodiment, the surface cleaning apparatus further comprises a second cleaning stage and the first cleaning stage is positioned exterior to the second cleaning stage.

In another embodiment, the surface cleaning apparatus further comprises a second cleaning stage comprising at least one cyclone and the plurality of cyclones are positioned exterior to the at least one cyclone.

In another embodiment, the surface cleaning apparatus further comprises a second cleaning stage comprising at least one cyclone and the first cleaning stage is positioned exterior to the at least one cyclone.

It will be appreciated that any of these alternate embodiments may be combined in an apparatus in any combination or sub-combination.

In accordance with an eighth aspect of the instant invention, a cyclone chamber is provided with a screen that covers all or a portion of the outlet from the cyclone chamber and which is removable and, optionally, replaceable, preferably through the top (air entrance end) of the cyclone chamber. In a preferred embodiment, the screen is formed with a handle (e.g., the air outlet conduit) so that a consumer need not touch the screen during removal. A part of the top panel of the cyclone casing may be removable with the screen as an assembly and may be used to secure the assembly in position (e.g., by a screw thread, bayonet mount or other releasable means that engages with the portion of the cyclone separator casing that is not removed with the screen). The screen may have longitudinally extending side walls to define an outer perimeter screen and a transversely extending wall to define a central screen, which are connected together so as to define a screen member that has an open volume (a capture region) that is surrounded on its length, width and height by a screen material. For example, the screen may be H shaped, a square U shape or a square inverted U shape.

Alternately, or in addition, in accordance this aspect, the screen is provided in a cyclone chamber such that the air travels into an open enclosure of the screen prior to traveling through the screen to the outlet from the cyclone chamber. For example, the screen may be H shaped or a square inverted U shape. The open enclosure is surrounded on all sides (other than the bottom), by screen material, thereby enlarging the surface area of screen through which the air may travel prior to entering the cyclone outlet. The air will initially tend to travel upwardly into the open enclosure, and through the transverse member to the cyclone outlet. If the transverse member becomes clogged, the air may pass through the side wall of the open enclosure and then travel back inwardly through additional screen material into the interior of the screen prior to exiting through the cyclone outlet.

The screen is preferably constructed from a material that will assist in retaining or trapping particulate matter. For example, the screen may be made from an adhesive material. Alternately, or in addition, the screen may be provided with microfilaments that extend outwardly therefrom. The microfilaments create a surface (for example like a very fine Velcro™) material on which elongate material such as hair may become trapped.

In accordance with a first embodiment of this aspect, there is provided a surface cleaning apparatus comprising:
 (a) a dirt inlet;
 (b) a handle;
 (c) a cyclone separator having an outer wall, a top, a fluid inlet downstream from the dirty inlet and a fluid outlet;
 (d) a screen positioned around the fluid outlet such that fluid exiting the cyclone separator passes through the screen and the screen is removable through the top of the cyclone separator; and,
 (e) a fluid flow motor.

In one embodiment, the fluid outlet has an upper portion positioned above the top of the cyclone separator and is removable with the screen.

In another embodiment, the upper portion of the fluid outlet is a handle for the screen.

In another embodiment, a fluid flow conduit is collinear with the fluid outlet, extends through the cyclone chamber and has an upper portion positioned above the top of the cyclone separator and the upper portion of the fluid outlet is a handle for the screen.

In another embodiment, the screen is rotatably mounted to the cyclone separator.

In another embodiment, the screen has a larger diameter than the fluid outlet. Preferably, the top of the cyclone chamber has a removable annular band that has a diameter larger than the diameter of the screen. More preferably, the removable annular band is removable with the fluid conduit and may form a one piece assembly with the fluid conduit (e.g., they may be integrally molded).

In another embodiment, the screen has an outer perimeter defining a cavity and a transverse member extending across the cavity.

In another embodiment, the fluid outlet has an inlet and the screen has a longitudinal surface that is parallel to the fluid outlet, extends past the inlet of the fluid outlet, and first and second opposed ends and the transverse member is positioned between the first and second opposed ends and the inlet to the fluid outlet is surrounded by the longitudinal surface and the transverse member. The transverse member may be positioned midway along the longitudinal surface. Alternately the first opposed end is positioned towards the top and the transverse member is positioned adjacent the first opposed end. Alternately, the second opposed end is positioned distal from the top and the transverse member is positioned adjacent the second opposed end.

It will be appreciated that any of these alternate embodiments may be combined in an apparatus in any combination or sub-combination.

In accordance with a second embodiment of this aspect, there is also provided a surface cleaning apparatus comprising:
 (a) a dirt inlet;
 (b) a handle;
 (c) a cyclone separator having an outer wall, a top, a fluid inlet downstream from the dirty inlet and a fluid outlet, the fluid outlet having an inlet;
 (d) a screen positioned around the inlet of the fluid outlet, the screen having a longitudinal surface that is parallel to the fluid outlet, extends past the inlet of the fluid outlet, first and second opposed ends and a transverse member positioned to define a cavity interior of the longitudinal surface that is open to the fluid in the cyclone separator without passing through the screen; and,
 (e) a fluid flow motor.

It will be appreciated that any of the alternate embodiments set out with respect to the first embodiment may be used with this second embodiment and that they may be combined in an apparatus in any combination or sub-combination.

It will be appreciated that any one of these aspects may be combined with one or more of the other aspects in any combination or sub-combination.

In accordance with another aspect of this invention, there is provided an improved cyclone, which may be used in a vacuum cleaner. In particular, a cyclone may have an inlet that is positioned exterior to the cyclone chamber. For example, it may be positioned on top of the cyclone. It may be formed as the upper portion of the cyclone chamber casing or it may be mounted on top of the upper casing of the cyclone and be in air flow communication with the cyclone chamber formed in the casing. The inlet comprises a spiral or tangential inlet. Preferably, the spiral ramp may extend through an arc from 15 to 360° and, preferably from 25 to 270° and, more preferably from 25 to 90°. It will be appreciated that in an alternate embodiment, the spiral inlet that extends for less than a full revolution may be constructed in the side wall of a cyclone bin. This construction may be used in conjunction with any of the aspects set out herein or, alternately, on its own.

In accordance with another aspect of the instant invention, a cyclone or a plurality of cyclones may be made from a biodegradable material. An advantage of this design is that the cyclones may be disposable. Accordingly, when deposited in a land fill site, the cyclone casing will eventually biodegrade. For example, a cyclone may be made of a paper based material that is compression molded or an injection molded starch or glucose based material so that the product is biodegradable. This construction may be used in conjunction with any of the aspects set out herein or, alternately, on its own.

In accordance with another aspect of the instant invention, the casing of a cyclone chamber, or a portion thereof, may be made from a deformable material, such as an elastomeric material. Preferably, the casing has sufficient rigidity to maintain its shape during storage and transportation of a vacuum cleaner and, more preferably, during normal operation of a vacuum cleaner. This construction may be used in conjunction with any of the aspects set out herein or, alternately, on its own.

In accordance with another aspect of the instant invention, the inner surface of the outer wall of a cyclone separator, or a portion thereof, and/or the inlet and outlet and any components therein may be coated with an adhesive material or may be lined with a removable adhesive material. For example, the adhesive material may be agar or pectin or a rubber based adhesive. One advantage of this embodiment is that particulate matter will adhere to the adhesive material as the air rotates in the cyclone chamber and contacts the outer wall of the cyclone casing or other portion having adhesive material associated therewith. Accordingly, the efficiency of the cyclone will be increased by dirt adhering to the outer wall of the cyclone. In accordance with this aspect of the invention, the cyclone, or an adhesive liner inserted in the cyclone, may be disposable. Accordingly, the cyclone casing may be constructed from a thin walled plastic (e.g. a vacuum molded plastic). Alternately, the adhesive that is selected may release dirt on contact with water. Accordingly, if a user washes out the interior of the cyclone, then the dirt, which has adhered to the outer wall of the cyclone chamber, will be removed. In a particularly preferred embodiment, it is preferred that the adhesive be provided on a downstream cyclone which is designed to remove finer particulate mater. Accordingly, this embodiment is particularly preferred for use in the second, third, fourth or other sequential stage(s) of a multistage cyclone separator where small quantities of fine particles are to be collected. This construction may be used in conjunction with any of the aspects set out herein or, alternately, on its own.

In accordance with another aspect of the instant invention, the cyclone casing may be constructed from, or may be coated with, a biocidal material. The biocidal material will prevent the growth of microbiologics, or reduce the tendency of microbiologics to grow, in the cyclone chamber. For example, a biocidal agent such as a tin arsenic compound may be added to the plastics of which the cyclone bins are molded, or biocidal materials such as surfactant lipid preparations may be applied to the interior and/or exterior surfaces of the cyclones to inhibit the growth of bacteria, molds, or viruses. This construction may be used in conjunction with any of the aspects set out herein or, alternately, on its own.

In accordance with another aspect of the instant invention, all or a portion of a cyclone casing, which may include the inlet and/or outlets of the cyclone casing and any screen material utilized therein, may be manufactured from or coated with an electret material. Electret materials are constructed so as to have a permanent electric charge polarization. For example, a plastic may be heated in the presence of an electric field and allowed to cool, resulting in permanent polarization of the plastic. One advantage of this embodiment is that all or a portion of the cyclone casing may be constructed to function as a magnet thereby increasing the efficiency of a cyclone by removing electrically charged particles. Typically, particulate matter that travels through a cyclone becomes charged due to the passage of the material at high speed through the cyclone separator. Accordingly, the use of a cyclone casing or portions thereof, which are made from materials that have a permanent electrostatic field, enhances the separation efficiency of the cyclone, particularly finer particulate matter, by combining electrostatic attraction and cyclonic separation. Accordingly, this embodiment is particularly preferred for use in the second, third, fourth or other sequential stage(s) of a multistage cyclone separator where small quantities of fine particles are to be collected. This construction may be used in conjunction with any of the aspects set out herein or, alternately, on its own.

In accordance with another aspect of the instant invention, some or all of the particle collected in one cyclone are conveyed to another cyclone, which may be upstream or downstream, whereby at least some of the particulate matter conveyed to the upstream or downstream cyclone is collected in the particle collector for the upstream or downstream cyclone. One advantage of this embodiment is that a consumer may need to only empty a single cyclone bin of a surface cleaning apparatus. This construction may be used in conjunction with any of the aspects set out herein or, alternately, on its own.

In accordance with another aspect of the instant invention an array of cyclones is provided wherein the cyclones may be sized such that there are at least 2 cyclones, preferably at least 5 cyclones, more preferably at least 10 cyclones and most preferably at least 25 cyclones per square inch measured in a plane transverse to the longitudinal axis of the cyclone separators. This construction may be used in conjunction with any of the aspects set out herein or, alternately, on its own.

In any aspect of this invention, a cyclone separator may include any plate known in the art for defining a dirt collection chamber in a cyclone separator below the cyclone chamber. The plate is preferably positioned inward from the outer wall of the cyclone separator casing so as to define an annular gap between the outer peripheral edge of the plate and the inner wall of the cyclone casing. If the plate is spaced from the inner wall of the cyclone separator casing, then the plate has an upper surface and a lower surface and a peripheral wall that extends between the upper and lower surfaces. The peripheral wall may be of varying geometries and orientations to assist in particle removal.

BRIEF DESCRIPTION OF THE DRAWINGS

These and other advantages of the instant invention will be more fully and completely understood in association with the following description of preferred embodiments of this invention wherein:

FIG. 13 is a top plan view of the cyclone array of FIG. 8a;

FIG. 13a is a perspective view of the cyclone array of FIG. 8a;

DETAILED DESCRIPTION OF THE INVENTION

The following description of the preferred embodiments of the improvements in cyclones and arrays of cyclones are described herein with reference to their application in a surface cleaning apparatus and, in particular, a vacuum cleaner. It will be appreciated, that in different embodiments, the improvements may be used in other household appliances, such as air cleaners including portable room air cleaners, air cleaners for furnaces and the like, as well as other commercial and industrial uses including breathing masks, such as for use in hospitals and in toxic environments and air treatment systems for cars and the like.

Description of Exemplified Upright Vacuum Cleaner

Figure 1:
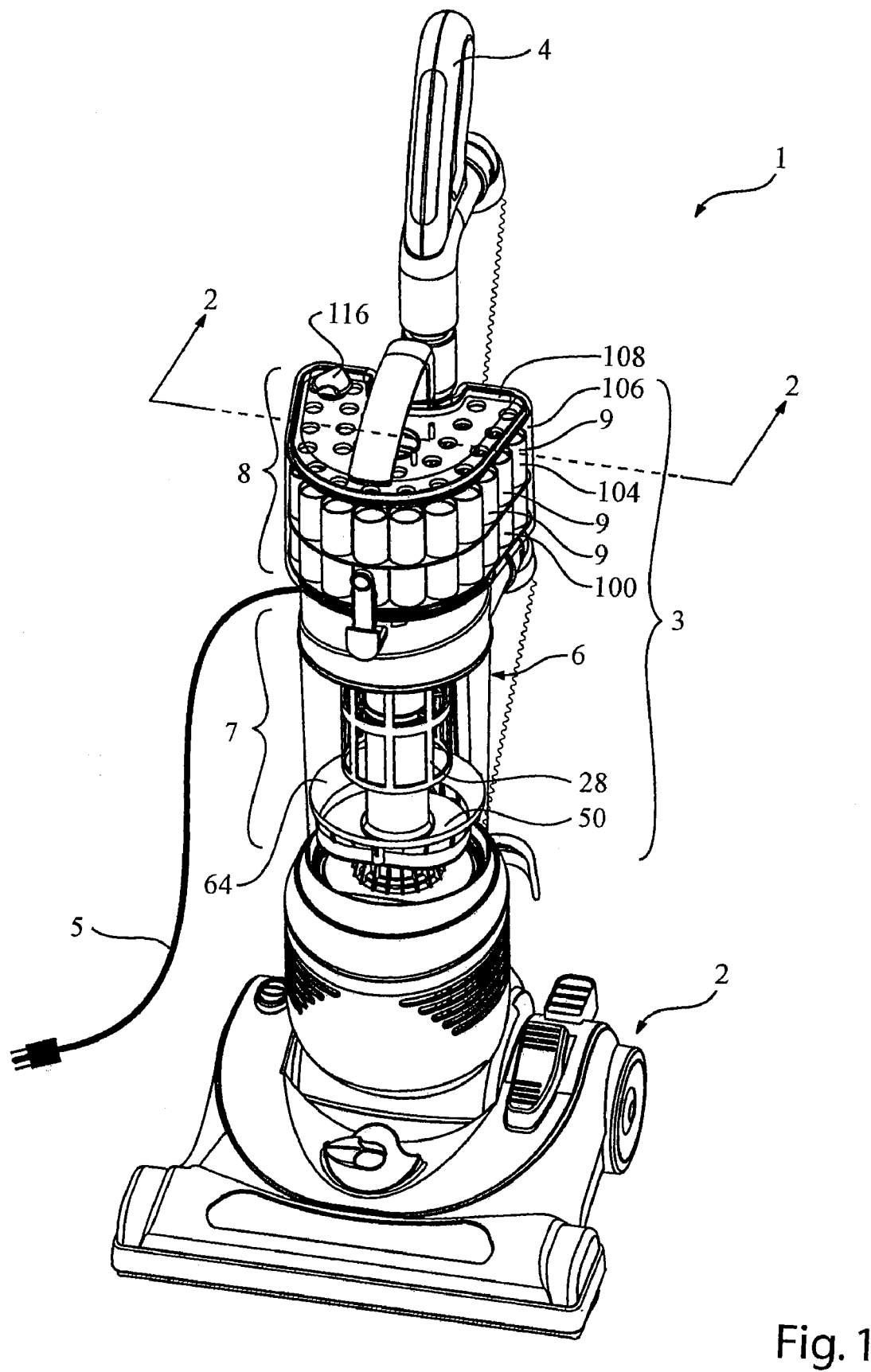
FIG. 1 is a perspective view of a preferred embodiment of a vacuum cleaner incorporating two cyclonic cleaning stages.
Figure 2:
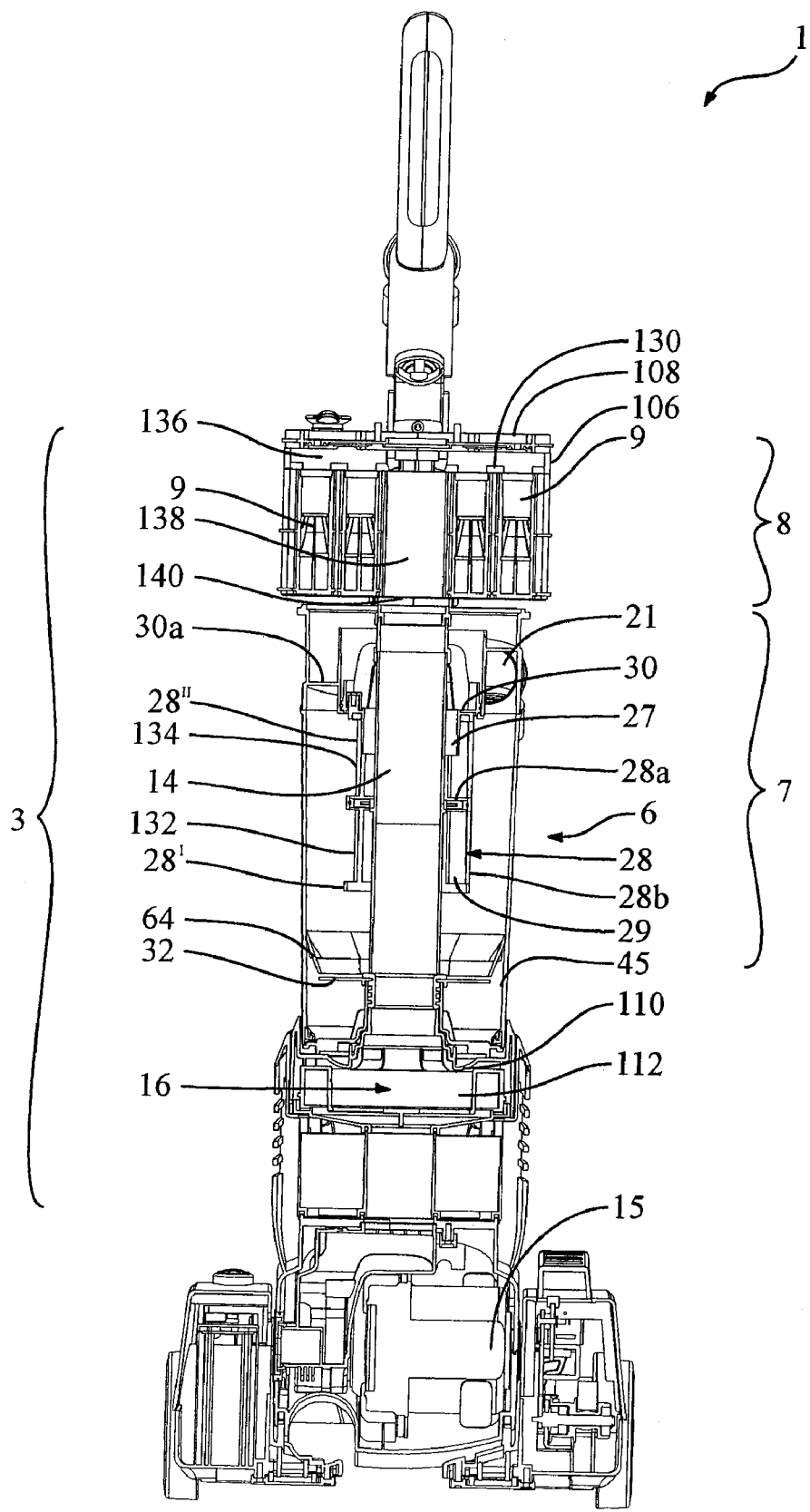
FIG. 2 is a cross section along line 2-2 of the vacuum cleaner of FIG. 1.

In a preferred embodiment, the improvements are used in a surface cleaning apparatus and, preferably, a vacuum cleaner and, more preferably, a vacuum cleaner having a plurality of cyclonic cleaning stages. A preferred embodiment of a multi stage cyclonic vacuum cleaner that is used to exemplify the different aspects is shown in FIGS. 1 and 2. As shown therein, vacuum cleaner 1 is an upright vacuum cleaner having a ground engaging head 2, a main casing 3 pivotally mounted with respect to ground engaging head 2, a handle 4 for steering vacuum cleaner 1 and an electric cord 5. Main casing 3 has a cyclonic cleaning unit 6 comprising a first cyclonic cleaning stage 7 comprising a single cyclone and a second cyclonic cleaning stage 8 comprising a plurality of cyclones 9 in parallel. Dirty air may be introduced into first cyclonic cleaning stage 7 by any means known in the art. Referring to FIGS. 1 and 2, vacuum cleaner 1 has a ground engaging head 2 having a dirty air inlet (not shown) which is in airflow communication with the first stage cyclone inlet 10. The air travels through first cyclonic cleaning stage 7, which is exemplified as comprising a single cyclone, and exits upwardly via first stage cyclone outlet 27. The air travels upwardly to enter second stage cyclones 9 via second stage cyclone inlets 12. The air travels through second stage cyclones 9 and exists second stage cyclones 9 via second stage cyclone outlets 13. The treated air then travels downwardly via conduit 14 into the ground engaging head to a fluid flow motor that is preferably a suction motor 15 prior to exiting vacuum cleaner 1.

Ground engaging head 2 may be of any construction known in the art and may include a rotating brush or the like to assist in entraining dirt in the dirty air inlet (not shown) in ground engaging head 2. In addition, vacuum cleaner 1 may include an extension wand or the like for above the floor cleaning as is known in the art. It will also be appreciated that in an alternate embodiment, vacuum cleaner 1 may be a canister vacuum cleaner, a back pack vacuum cleaner, a carpet extractor, a wet/dry vacuum cleaner, or other vacuum cleaner or surface cleaning equipment utilized in household and commercial applications which may use a surface cleaning head (i.e. a head that may be used to clean a surface that may be a floor, wall, furniture or other surface as is known in the art), and which are preferably used in domestic applications and, in particular, indoor applications.

Combinations of Cyclones

Figure 8:
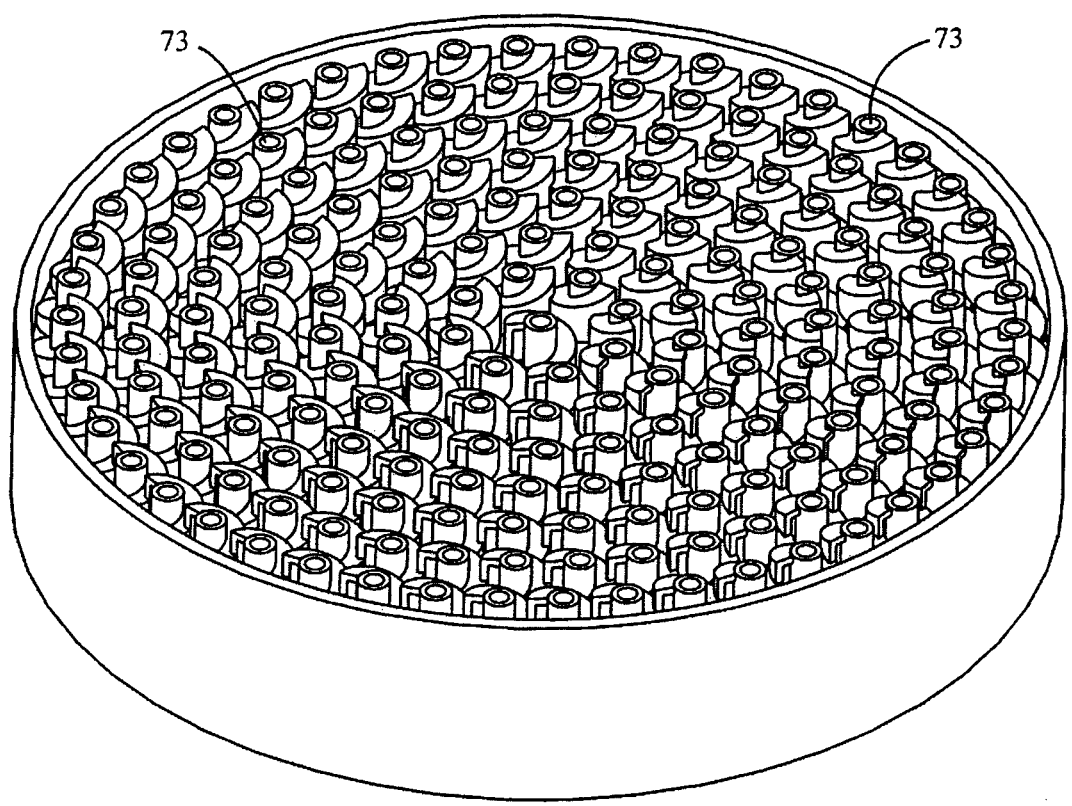
FIG. 8 is a perspective view of an array of cyclone separators in accordance with alternate preferred embodiment of the instant invention.

In accordance with an aspect of the instant invention, which may be used individually or with any other aspect, a plurality of cyclonic cleaning stages and, preferably, a plurality of arrays of cyclones are provided. Preferably, such constructions are utilized to remove particulate matter in air, particularly in domestic applications, such as surface cleaning apparatus (e.g. vacuum cleaners, carper extractors and the like) and air cleaners (e.g., portable air cleaners or air cleaners connected to a furnace for a house). As shown in FIG. 2, a vacuum cleaner may has a cyclonic cleaning unit 6 comprising a first cyclonic cleaning stage 7 comprising a single cyclone, a plurality of second stage cyclones 9 and a plurality of third stage cyclones positioned in pre-motor area 16 (e.g. an array 73 as shown in FIG. 8).

It will be appreciated that in an alternate embodiment, the first cyclonic stage may comprise a plurality of cyclones in parallel. For example, a vacuum cleaner may comprise two cyclonic cleaning stages wherein each comprises a plurality of cyclones in parallel, preferably the first and second stages in order of fluid flow through the vacuum cleaner.

As a further example, suction or air flow motor 15 (e.g., a dirty air motor) may be positioned upstream from the cyclonic cleaning unit 6, wherein unit 6 may contain 1, 2, 3 or 4 cyclonic cleaning stages. In accordance with this example, at least one, preferably a plurality of and, more preferably, all of the cyclonic cleaning stages comprise a plurality of cyclones in parallel.

Alternately, a cyclone cleaning stage may be provided upstream from motor 15 and a plurality of cyclonic cleaning stages (e.g. 2, 3 or 4), may be positioned downstream from the suction motor 15. Some, and preferably a plurality of and, more preferably, all of the cyclonic cleaning stages comprise a plurality of cyclones in parallel.

Alternately, a plurality of cyclonic cleaning stages may be provided upstream from the motor and one or more cyclonic cleaning stages may be provided downstream from motor 15. For example, two or three cyclonic cleaning stages may be positioned upstream from the motor 15 and one or two cyclonic cleaning stages may be positioned downstream from the motor 15. Preferably, some, more preferably most and, most preferably all of the cyclonic cleaning stages comprise a plurality of cyclones in parallel.

In a particularly preferred embodiment, four cyclonic cleaning stages may be provided upstream from a motor 15 wherein at least one, preferably some and, most preferably all of the cyclonic cleaning stages comprise a plurality of cyclones in parallel.

Preferably, the cyclonic stages are provided exterior to each other (i.e., not nested). Therefore, they may be stacked (one on top of the other) or positioned side by side.

Construction of Cyclone Inlets

Figure 3:
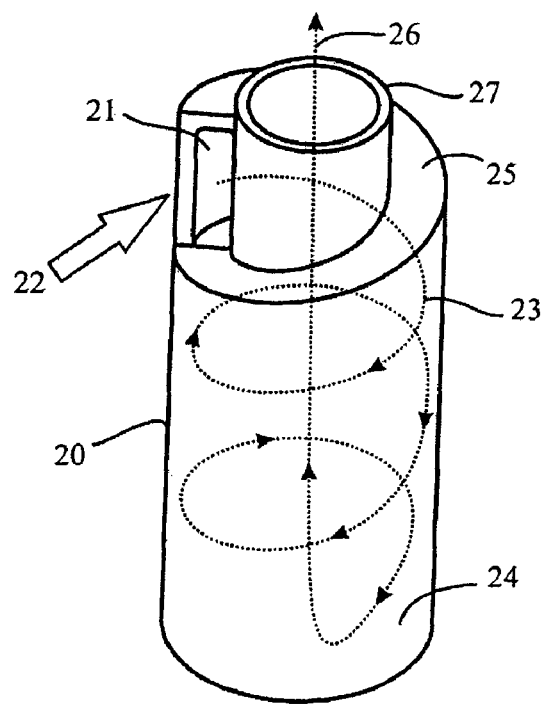
FIGS. 3, 3a and 3b are perspective views of a cyclone inlet according to an alternate preferred embodiment of the instant invention.
Figure 3A:
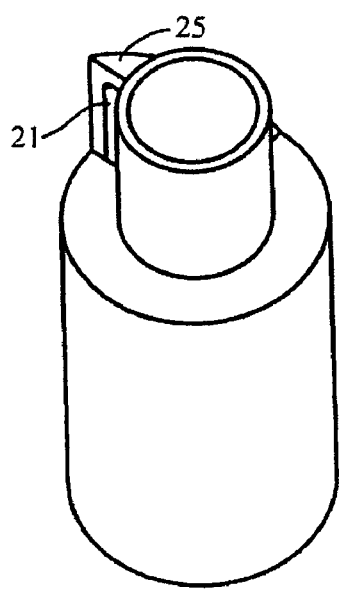
Figure 3B:
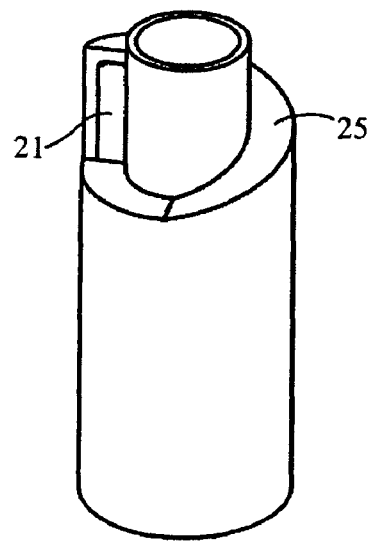

In accordance with another aspect, which may be used individually or with any other aspect, a cyclone separator 20 may have air inlet 21 that is located on the top of the separator 20, see for example FIGS. 3, 3a and 3b. The inlet 21 may be round, oval, square, rectangular, ellipsoid or any other shape in transverse section to the direction of flow, but a rectangular shape, as exemplified in the Figures, is preferred. The particle laden fluid represented by arrow 22 enters into the air inlet 21 and is directed by the spiral ramp 25 that defines inlet 21 so as to create cyclonic circulation 23 in cyclone separator 20. The spiral ramp 25 can be configured to occupy an arc of from 10° to 360° of the perimeter of the circumference of the cyclone separator 20 as seen from above. Preferably, the spiral ramp 25 extends through an arc from 15 to 360° and, more preferably from 25° to 270° and, most preferably from 25° to 90°. In the embodiment of FIG. 3a, air or fluid inlet 21 extends through an arc of 90° and in the embodiment of FIG. 3b, air inlet extends through an arc of 270°. The spiral ramp 25 may be configured in either a clockwise or counterclockwise direction. As exemplified in the drawings, at least a portion of, and preferably all of, inlet 21 is positioned exterior to the cyclone chamber, which chamber is located inside cyclone separator 20. For example, the inlet may be on the outer surface of cyclone separator 20 but is preferably positioned at the top of cyclone separator 20.

Cyclonic circulation 23 in cyclone separator 20 causes at least a portion of the particles 24 within the particle laden fluid stream 22 to be disentrained from the fluid flow stream and accumulate within the lower region of the cyclone separator 20. The fluid stream 26, which exits the cyclone separator 20 through the fluid outlet 27 that is located adjacent to the inlet 21, has a reduced concentration of the particles 24 than particle laden fluid stream 22. It is understood that this construction can be applied to a single cyclone or a plurality of cyclones in parallel. In another embodiment, it will be appreciated that outlet 27 may be provided in the bottom of cyclone separator 20 or any other location known in the art.

An advantage of having the spiral ramp 25 occupy only a portion of the circumference of the cyclone separator 20 is that the inlet 21 can be more readily connected to air intakes, manifolds, or ducts which may lead from the floor engaging nozzle (e.g. a surface cleaning head), from another cyclone, a filter bag, a plurality of other cyclones, a fan, a pump or other pressure source, or from any other source of particle laden fluid.

Another advantage of this embodiment is that by reducing the arc of the inlet 21, the volume of the inlet is reduced thereby effectively increasing the volume of a cyclone chamber. Accordingly, by using a spiral inlet that extends through an arc less than one full revolution, the volume of a cyclone separator 20, and accordingly, the amount of dirt which may be contained in the separator 20 may be increased without increasing the outer dimension of the cyclone casing or the appliance in which the cyclone casing is provided. It will be appreciated that in surface cleaning appliances, such as vacuum cleaners and carpet extractors, air cleaners and the like, the foot print that the appliance may occupy is limited. Accordingly, in order to enhance the dirt retaining capacity of the appliance, it is preferred to maximize the available dirt collection area without increasing the volume of the appliance. It will be appreciated that in an alternate embodiment, the spiral inlet 21 that extends for less than a full revolution may be constructed in the side wall of a cyclone bin (see, e.g., FIG. 5).

Internal Screen for a Cyclone Separator

Figures 4, 5:
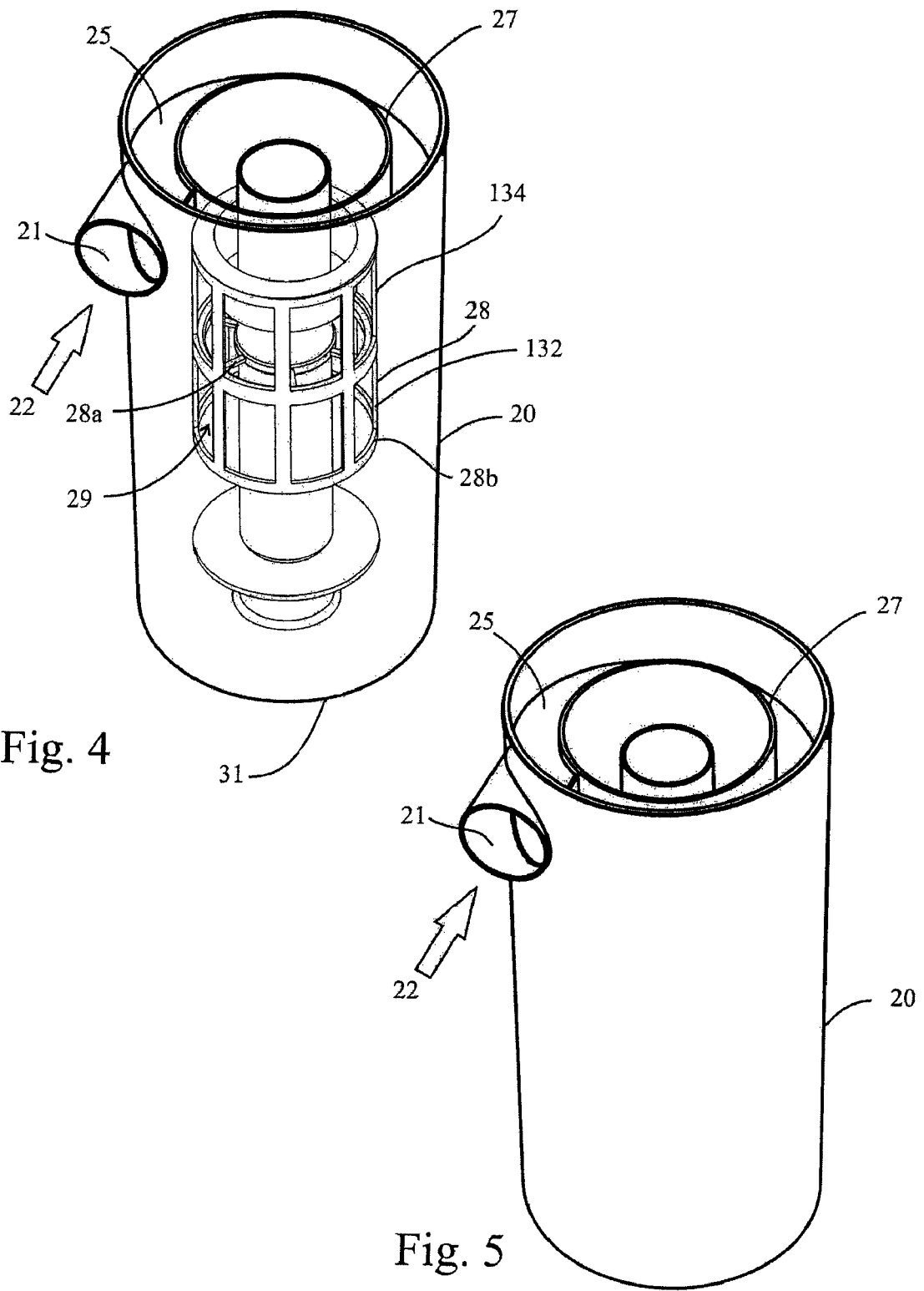
FIG. 4 is a perspective view of a cyclone separator in accordance with an alternate preferred embodiment of the instant invention, wherein the outer casing of the cyclone separator is transparent.
FIG. 5 is a perspective view of a cyclone separator in accordance with an alternate preferred embodiment of the instant invention.

In accordance with another aspect, which may be used individually or with any other aspect, an improved internal screen for a cyclone separator 20 is provided, see for example FIG. 4. In this alternative construction, a screen member 28 is preferably constructed from a fine mesh having a square area per opening or a hole of 0.000001 to 0.04 square inches. The screen openings or holes may be round, oval, triangular, square, pentagonal, heptagonal, or hexagonal or the like and are preferably multisided.

Alternately, or in addition, the screen 28 may comprise a central screen 28a and an outer perimeter screen 28b that has a longitudinal surface that is parallel to the cyclone outlet. The central screen 28a extends transversely to extend across the cross section of outer perimeter screen 28b so as to provide a complete screen surface extending between opposed parts of outer perimeter screen 28b. Central screen 28a, which is a transverse member, may be positioned at the lower terminal end 28' of the outer perimeter screen 28b (to define a generally square U-shaped screen), towards the upper terminal end 28" of the outer perimeter screen 28 but below the entrance to the fluid outlet (to define a generally square inverted U-shaped screen), or any position between the two, and preferably proximate the midpoint along the longitudinal length of outer perimeter screen 28b as exemplified (to define a generally H-shaped screen). It is preferred that the central screen 28a be positioned between the terminal ends of the outer perimeter screen 28b so as to form a capture region 29 interior of the outer perimeter screen 28b to assist in the entrapment of fibers, hairs or particles. Capture region 29 is a cavity interior of the longitudinal surface, namely outer perimeter screen 28b, that is open to the fluid in the cyclone separator without passing through the screen. It is understood that the cross sectional shape of the screen member 28 may be round, oval, square or any other shape.

As exemplified in FIGS. 2 and 4, the cyclone separator 20 is generally vertically disposed, the outlet is provided in the top of the cyclone chamber, and the screen 28 comprises a longitudinally extending wall 28b constructed of a screen material (which is preferably circular in cross-section) and a transversely extending central screen 28a which is positioned interior of the longitudinally extending outer perimeter screen 28b, extends across the entire cross-section of the interior of the longitudinally extending outer perimeter screen 28b and between the opposed ends of the longitudinally extending outer perimeter screen 28b so as to create a shape which is generally H shaped in vertical section. Accordingly, air that has traveled through the cyclone chamber to the bottom of the cyclone casing will travel upwardly through the central portion of the cyclone and, preferably, enter the capture region 29 of the screen 28 (i.e., travel upwardly between the longitudinally extending outer perimeter screen 28b). The air will encounter central screen 28a and pass therethrough. If central screen 28a becomes clogged, then some or all of the air will commence traveling out the lower portion 132 of outer perimeter screen 28b and may then travel back inwardly through the upper portion 134 of outer perimeter screen 28b towards the centre of the cyclone chamber at a position above central screen 28a so as to travel to the cyclone outlet. Accordingly, the use of a generally H shaped screen in vertical section enhances the amount of screen area which may be utilized.

In accordance with an alternate preferred embodiment, the central screen 28a may be positioned adjacent the bottom of the outer perimeter screen 28b so as to create a screen, which in vertical section, comprises a generally square U shaped member. Accordingly, the air that is traveling through the cyclone chamber towards the cyclone outlet must travel through the screen material 28a or 28b to reach the cyclone outlet 27. In accordance with this embodiment, the air may travel through the central screen 28a or the outer perimeter screen 28b so as to reach the cyclone outlet 27 thereby utilizing the enhanced surface area of the screen member 28. Accordingly, fluid may travel back inwardly through the upper portion 134 of outer perimeter screen 28b towards the centre of the cyclone chamber at a position above central screen 28a so as to travel to the cyclone outlet.

In a further alternate embodiment, the central screen 28a may be positioned at the top end of the outer perimeter screen 28b so as to create in a vertical section a generally square inverted U shaped filter. Accordingly, in order to reach the cyclone outlet, the air may travel upwardly through the capture region 29 interior of outer perimeter screen 28b to reach the central screen 28a and to pass therethrough to the outlet 27. Alternately, some of the air may travel through the outer perimeter screen 28b so as to reach the capture region 29 and to then travel upwardly to the cyclone outlet through the central screen 28a.

In accordance with a further embodiment of the instant invention, the outer perimeter screen 28b may flare outwardly in a direction away from the outlet. Accordingly, a portion of the outer perimeter screen 28b distal to the outlet 27 may have a diameter larger in cross section than the portion of the outer perimeter screen 28b adjacent to the outlet. One advantage of this design is that material that accumulates in the interior volume of the screen is more likely to fall downwardly to the bottom 31 of the cyclone casing when the air flow through the cyclone chamber is terminated. Accordingly, for example, if the cyclone is utilized as a cleaning stage in the surface cleaning apparatus or an air cleaner, the user may remove the dirt collection chamber of the cyclone bin (e.g. the cyclone casing itself may be removed if the bottom 31 of the cyclone casing defines the dirt collection chamber) permitting the dirt to flow out of the interior volume of the flared screen into the bottom of the cyclone casing. Alternately, if the screen 28 is removable, such as is disclosed herein, then the screen 28 may be removed permitting the dirt that has accumulated in the interior volume (capture region 29) of the flared screen to fall to the bottom 31 of the cyclone casing. Alternately, the screen may be placed over a garbage can and banged against the side to loosen the dirt contained therein and permit the dirt to fall out of the flared capture region 29.

It will be appreciated that transverse central screen 28a need not be perpendicular to the longitudinal axis of the outlet conduit 27.

Removable Screen

In accordance with another aspect of the instant invention, which may be used individually or with any other aspect and, preferably, the screen construction disclosed herein, a cyclone separator 20 is provided with a screen 28 that covers all or a portion of the outlet 27 from the cyclone chamber and which is removable and, optionally, replaceable. In accordance with this alternate preferred embodiment, the screen 28 is configured so as to be removable through or with the fluid outlet 27 of the cyclone chamber. For example, as exemplified in FIG. 4, cyclone separator 20 has an outlet conduit 27 that extends partially into the cyclone chamber and has a screen 28 attached or associated therewith. The screen may have the same diameter as the outlet conduit 27 or slightly less so as to be removable therethrough, or may be larger and removable with the outlet 27. The outlet conduit 27 may be removably mounted to the cyclone casing, such as by a screw or bayonet mount. Accordingly, a user may remove the outlet 27, and the screen 28 attached hereto by rotating the outlet conduit 27 and longitudinally withdrawing the outlet conduit 27 upwardly from the cyclone separator 20. Accordingly, one advantage of this embodiment is that the screen is removably mounted in the cyclone chamber and may be easily removed to permit the cleaning of the screen. In particular, it is not necessary for a user to reach into a cyclone chamber so as to remove the screen or to clean elongate material, such as hair and other fibrous material, from the screen while the screen is mounted in the cyclone chamber.

A further advantage of the instant invention is that outlet conduit 27 may function as a handle for the screen. For example, if the outlet conduit 27 extends above the top of the cyclone separator 20, the user may grasp the upper end of outlet conduit 27 and use that as a handle. Accordingly, the user need not touch the screen. Instead, the screen may be cleaned, by means of a brush and/or washing the screen under water. Once clean, the screen may be reinserted into the cyclone chamber without the user touching the screen. It will be appreciated that other means known in the art to secure the outlet conduit 27 and the cyclone separator 20 together may be utilized.

In addition, it will be appreciated that if the screen 28 has a larger diameter than the outlet conduit 27, then the wall of the cyclone casing in which the outlet conduit 27 is provided will have a removable annular band 30 wherein the diameter of the removable annular band 30 is greater than the diameter of the screen 28. Accordingly, when the annular band 30 is removed, an opening is provided in the outer wall 30a of the casing, which is sized to allow the passage therethrough of the screen 28 (see for example FIGS. 2a and 17). Preferably, the annular band 30 forms a one piece assembly with the outlet conduit 27 and may be integrally molded therewith. Accordingly, only a single element needs to be removed from the cyclone casing in order to remove the screen for cleaning. Annular band 30 may be lockingly affixed to outer wall 30a by any means known in the art, such as by a bayonet mount, a screw mount, magnets or locking tabs.

Figure 2A:
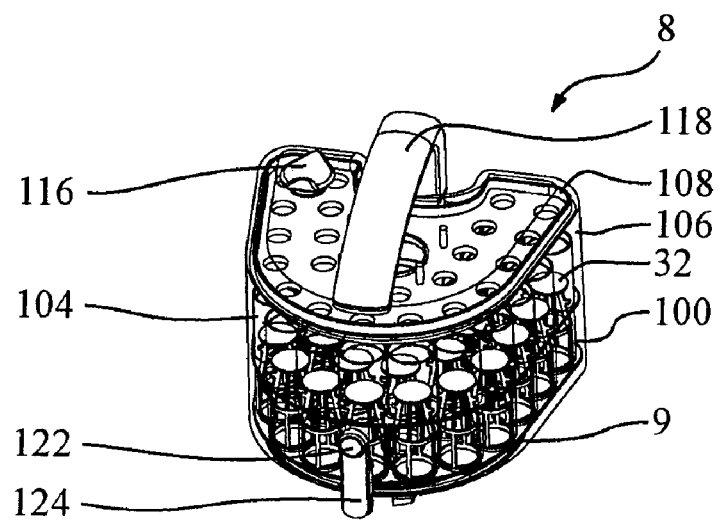
FIG. 2a is an exploded view of the cyclonic cleaning stages of the vacuum cleaner of FIG. 1.
Figure 2A:
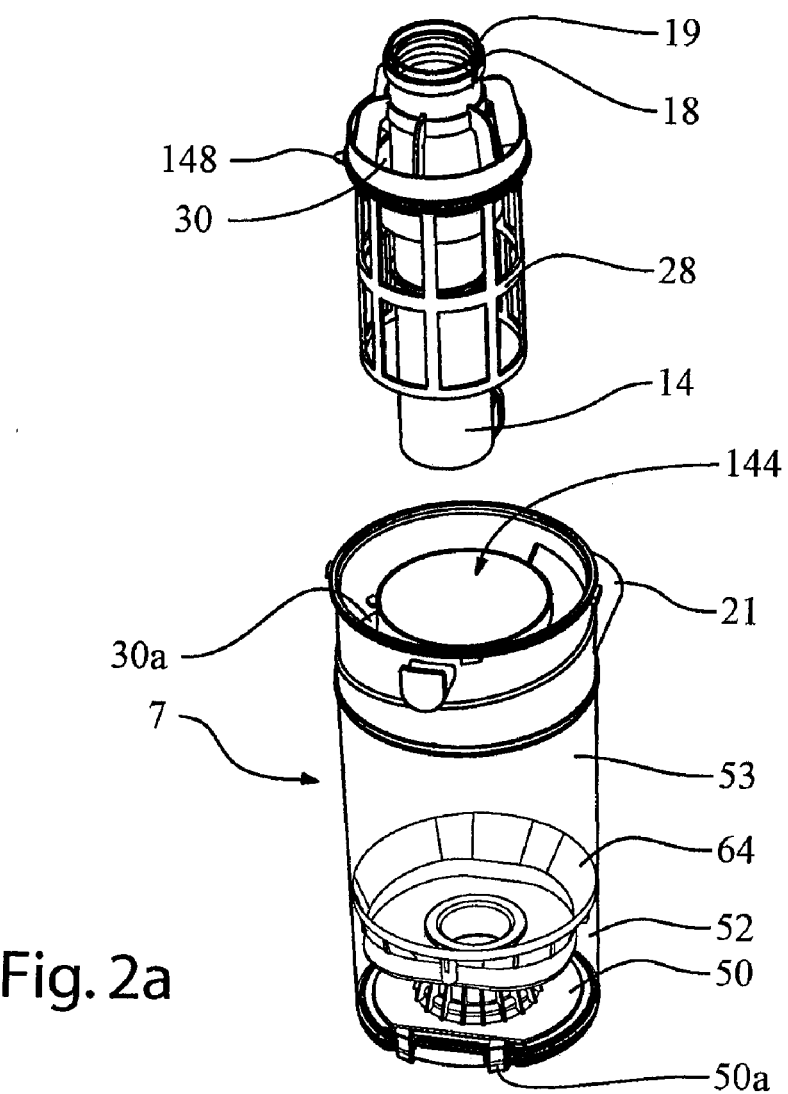

In the embodiment of FIG. 2a, the first cyclonic cleaning stage includes a down flow conduit 14. Down flow conduit 14 is collinear with the fluid outlet 27, extends through the cyclone chamber 53 and has an upper portion 19 positioned above the top of the cyclone separator 20. Accordingly, in this alternate embodiment, the down flow conduit 14 has an upper end 19 that forms the handle for the unit that is removed. As exemplified in FIG. 2a, a user may grasp end 19 and, e.g., rotate conduit 14 to unlock tab 148 from a recess, not shown, and then pull upwardly such that screen 28 is removed leaning an opening 144 in the top of the cyclone, through which dirt in the cyclone chamber 53 may be emptied.

If a second stage cyclonic stage 8 is mounted on top of the first cyclonic cleaning stage 7, and the second cyclonic cleaning stage includes a down flow tube 138, then the second cyclonic cleaning stage 8 is first removed. It will be appreciated that end 19 may have a gasket or O-ring 18 to seal down flow tube 138 of the second cyclonic cleaning stage 8 and the upper end 18 of down flow conduit 14 of the first cyclonic cleaning stage 7.

In accordance with an alternate embodiment, it will be appreciated that the screen 28 may be permanently adhered to a screen mount (e.g. it may surround the outlet conduit 27 of a cyclone chamber and be disposable therewith). It will be appreciated that as used herein, a screen 28 comprises a material that preferably has a generally open pore size, which is selected to permit the passage therethrough of finer dirt material but to prevent the passage therethrough of elongate material. Accordingly, the screen does not filter particulate matter and does not substantially affect the back pressure of the air traveling therethrough when the screen is clean.

It will be appreciated that the cyclone outlet 27 may be provided at different positions in the cyclone casing and that the orientation of the screen in accordance with these embodiments may be accordingly adjusted so as to cover the outlet 27. Further, transverse central screen 28a need not be perpendicular to the longitudinal axis of the outlet conduit 27.

Geometry for a Cyclone Separator

Figure 6:
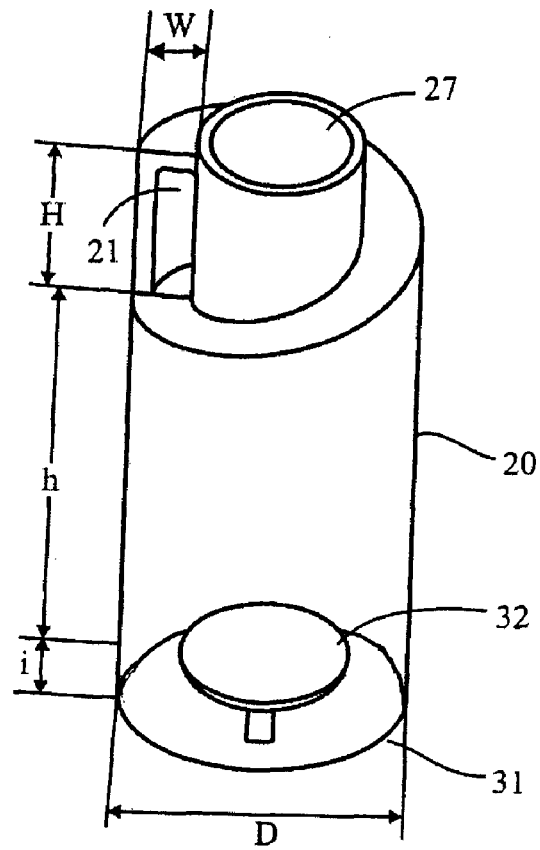
FIG. 6 is a perspective view of a cyclone separator in accordance with an alternate preferred embodiment of the instant invention.

In accordance with another aspect, which may be used individually or with any other aspect, an improved configuration for a cyclone separator 20 is provided, see for example FIG. 6. In accordance with this embodiment, different geometries of cyclone separators 20 are provided. In particular, it is preferred that the geometry of a cyclone separator 20 is selected based on the size of cyclone separator 20. According, it is preferred that for cyclone separators 20 that are greater than 1 inches in internal diameter (D), the geometry of the cyclone is as follows:

the inlet width (W) is preferably between D/3 and D/5,
the inlet height (H) is preferably between 2W to 5W, and
the height (h) above the floor or bottom 31 of the cyclone separator 20 is preferably greater than 2H, more preferably more than 4H and most preferably more than 8H.

If an optional plate 32 is employed, then:
the height (h) above the plate 32 is preferably greater than 2H, more preferably more than 4H and most preferably more than 8 H;
the height (i) below the plate 32 is preferably greater than 1 H, more preferably more than 2H and most preferably more than 4H; and,
the gap between the peripheral wall of plate 32 and the inner surface of the wall of the cyclone separator 20 is preferably 0.025" to 0.075", more preferably 0.035" to 0.050", and most preferably 0.040".

Alternately, it is preferred that for cyclone separators 20 that are equal to or smaller than 1 inch in internal diameter (D), the geometry of the cyclone is as follows:

the inlet width (W) is preferably between D/5 and D/15 and more preferably D/8 to D/12;
the inlet height (H) is preferably between 2W to 5W and preferably 3W to 4W; and,
the height (h) above the floor or bottom 31 of the cyclone separator 20 is preferably greater than 2H, more preferably more than 4H and most preferably more than 8H.

If an optional plate 32 is employed, then:
the height (h) above the plate 32 is preferably greater than 2H, more preferably more than 4H and most preferably more than 8H;
the height (i) below the plate 32 is preferably greater than 1H, more preferably more than 2H and most preferably more than 4H; and,
the gap between the peripheral wall of plate 32 and the inner surface of the wall of the cyclone separator 20 is preferably 1W to W/10, more preferably W/1.5 to W/4 and most preferably W/2 to W/3.

It is understood that for cyclones separators 20 between 0.75" and 1.5 inches in diameter, good but not optimal performance can be achieved by applying the parameters for cyclone separators 20 smaller or larger than 1 inch in diameter.

Configuration of a Divider Plate for Cyclone Separators

Figure 6A:
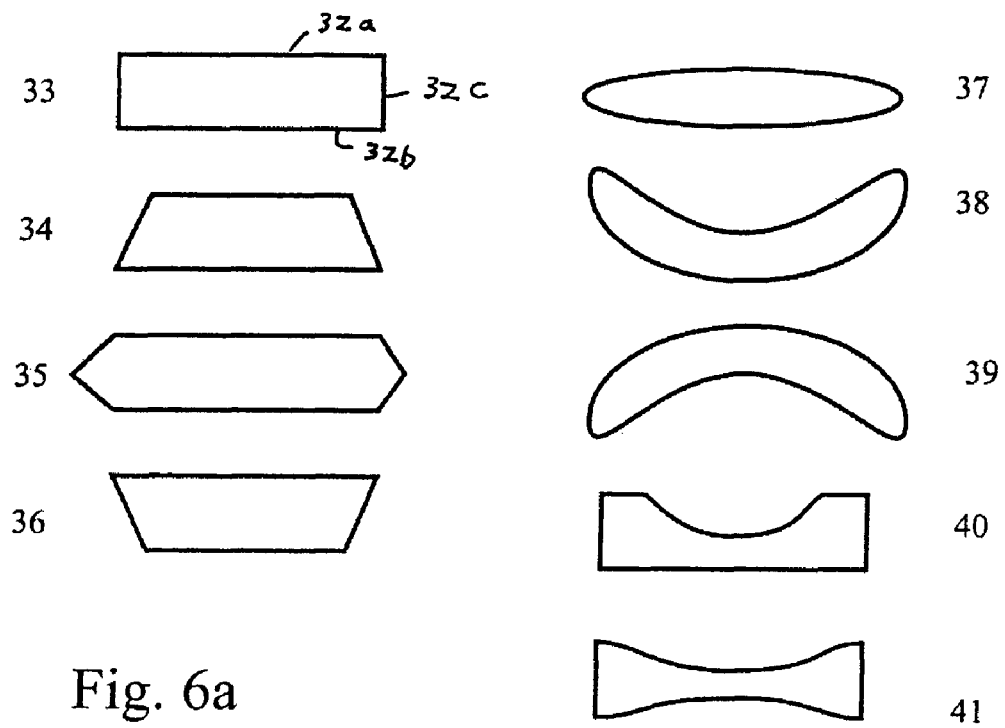
FIG. 6a are side views of plates that are used in accordance with alternate embodiments of this invention to divide the interior of a cyclone separator into a cyclone chamber and a dirt collection region.

In accordance with another aspect, which may be used individually or with any other aspect, improved configurations for a plate 32 that is included in a cyclone separator 20 to divide the interior of a cyclone separator 20 into a cyclonic region or cyclone chamber 53 and a dirt collection region or chamber are provided, see for example FIG. 6a. As illustrated therein, plate 32 has an upper or cyclone chamber surface 32a, a lower or dirt collection chamber surface 32b and a peripheral wall 32c. Each of these different configurations beneficially assist in capturing different particle sizes. For example, the peripheral wall 32c of plate 33 is flat (i.e. it may extend generally vertically). Plate 33 is preferred for use in a cyclone separator 20 to capture general particles found in carpets and homes where the particle size is 3 or more microns. Alternately, the peripheral wall 32c may meet upper and/or lower surfaces 32a, 32b at an angle. See for example plates 34, 35 and 36. As shown, plate 35 comprises an upper portion and a lower portion that intersect at an intermediate location along the thickness of the plate so as to define a sharp edge (e.g. it is generally V shaped). As the size of the particles decreases, plates 33, 34 and 35 are more effective in that the discontinuity at the outer perimeter improves ultra fine particle separation. Alternately, the peripheral edge may be curved (e.g. it may bow out in the centre so as to be generally C shaped as shown in plate 37). When the specific gravity of the particles being removed from the fluid stream is similar to the specific gravity of the fluid, curved surfaces such as 37, 38, 39, 40, and 41 tend to provide more efficient separation.

Figure 6B:
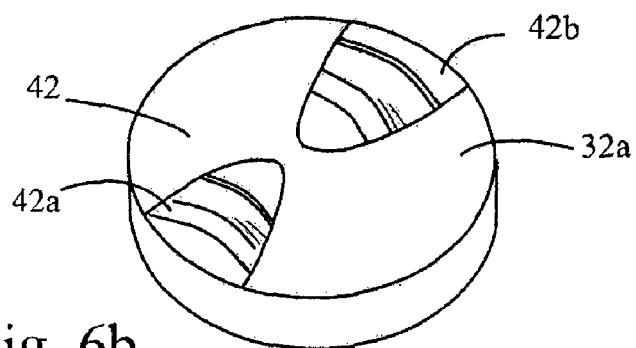
FIGS. 6b and 6c are perspective views of plates that are used in accordance with alternate embodiments of this invention to divide the interior of a cyclone separator into a cyclone chamber and a dirt collection region.
Figure 6C:
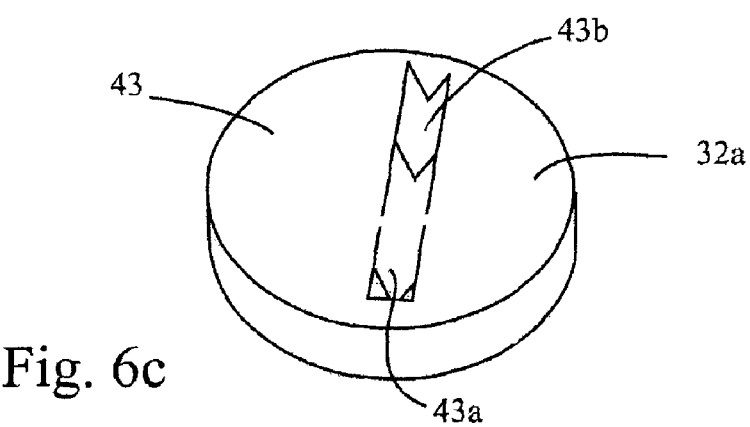

It has also been found that for mixtures including a wide range of particle specific gravities, creating regular or irregular, symmetrical or non-symmetrical curves or angled discontinuous surfaces on the upper surface 32a of the plate 32, i.e. the face disposed towards the cyclone chamber, can enhance separation efficiency. Examples are shown in FIGS. 6b and 6c. In the example of FIG. 6b, a discontinuity 42a curves upwardly from upper surface 32a and a discontinuity 42b curves downwardly into upper surface 32a. In the example of FIG. 6c, a discontinuity 43a is angled upwardly from upper surface 32a and a discontinuity 42b is angled downwardly into upper surface 32a.

Figure 6D:
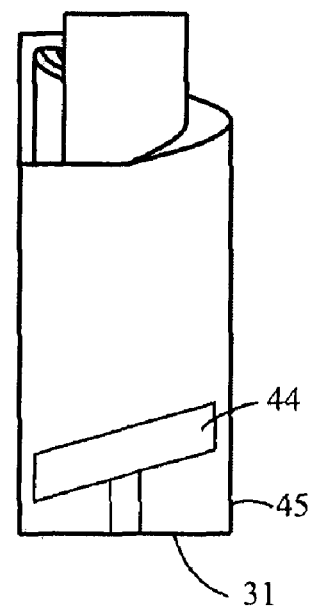
FIG. 6d is a vertical section through a cyclone separator showing an alternate position for a plate in accordance with an alternate preferred embodiment of the instant invention.

While plate 32 may be mounted transverse to the longitudinal axis of a cyclone separator 20 (e.g., if cyclone separator extends vertically, plate 32 extends horizontally), it will be appreciated that in an alternate embodiment that plate 32 may be other than in a plane transverse to the longitudinal axis of a cyclone separator 20. For example, as shown in FIG. 6d, the plate 44 is mounted on an angle relative to the wall 45 of the cyclone separator 20. It is understood that the cyclone separator wall 45 may optionally be curved or angled towards the top or towards the bottom of the cyclone separator 20.

In accordance with a further alternate embodiment of the instant invention, the plate 32, which may be of any particular configuration and/or one of the configurations disclosed herein, may be positioned so as to define an annular gap between the peripheral wall of the plate 32c and the inner surface of wall 45 of the cyclone casing is not uniform in thickness. For example, the plate 32 may be closer to the wall 45, or may touch the wall 45, at one or more locations or along in an arc of the wall 45. Alternately, or in addition, the plate 32 may be angled, as shown in FIG. 6d, such that one end is at an elevated distance above the bottom 31 of the cyclone casing compared to an opposed end. Accordingly, if the plate 32 is circular and centrally positioned, the annular gap at the raised end and the lower end will be larger than at the central portion that is not vertically displaced. Alternately, the plate 32 may be angled upwardly from adjacent one arc of wall 45. Alternately, or in addition, it will be appreciated that the plate need not be circular in cross section. Instead, the plate may have an irregular outer surface so as to provide variation in the gap between the peripheral wall 32c of the plate and the inner surface of wall 45 of the cyclone casing.

It will be appreciated that in one embodiment, the plate 32 may be secured to the bottom 31 of a cyclone casing. Alternately, the plate 32 may be attached to inner surface 56 of the wall 45 of the cyclone casing (see for example FIGS. 6g and 6h).

Figure 7:
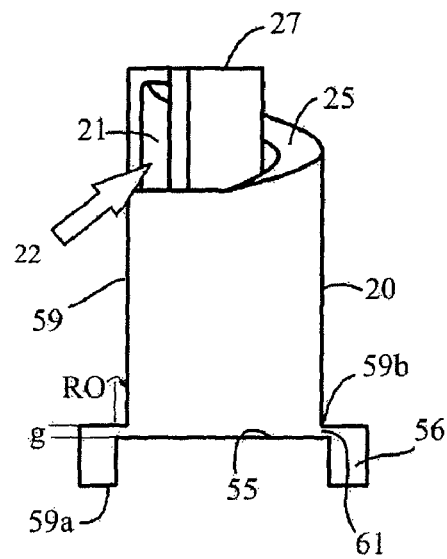
FIG. 7 is a vertical section of a cyclone separator showing an alternate preferred embodiment of the instant invention wherein the bottom of the cyclone casing is raised to form an annular dirt collection chamber.
Figure 7A:
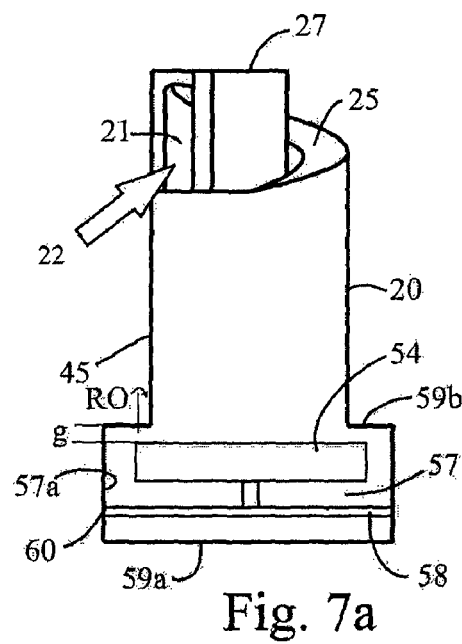
FIG. 7a is a vertical section of a cyclone separator showing an alternate preferred embodiment of the instant invention wherein the lower portion of the side walls of the cyclone casing have a larger diameter to form an enlarged dirt collection chamber.
Figure 7B:
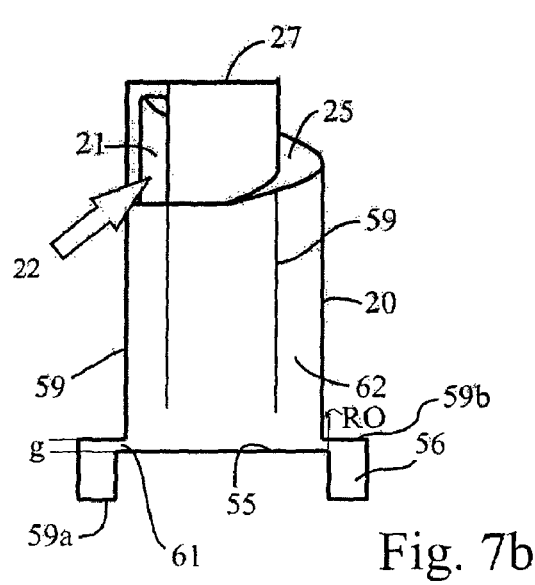
FIG. 7b is a vertical section of a cyclone separator showing an alternate preferred embodiment of the instant invention wherein the bottom of the cyclone casing is raised to form an annular dirt collection chamber and a longitudinally extending annular dirt collection chamber is provided.
Figure 7C:
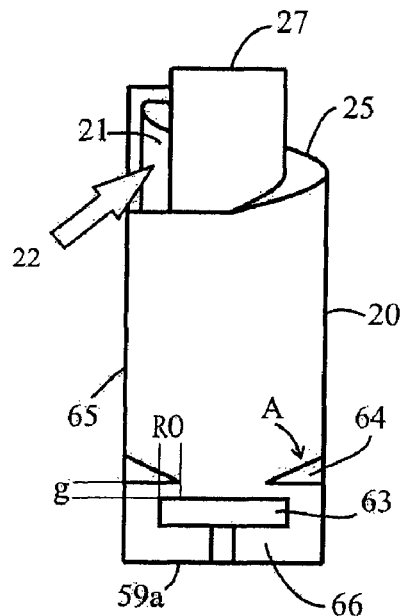
FIG. 7c is a vertical section of a cyclone separator showing an alternate preferred embodiment of the instant invention wherein a redirector is provided.
Figure 7D:
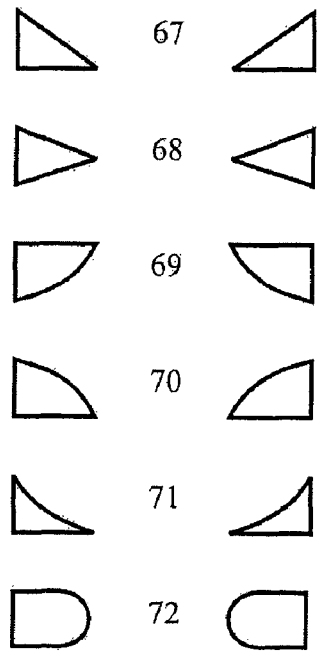
FIG. 7d is a vertical section of a cyclone separator showing an alternate preferred embodiment of the instant invention wherein a redirector is provided and the outlet is in the bottom of the cyclone casing.
Figure 7D:
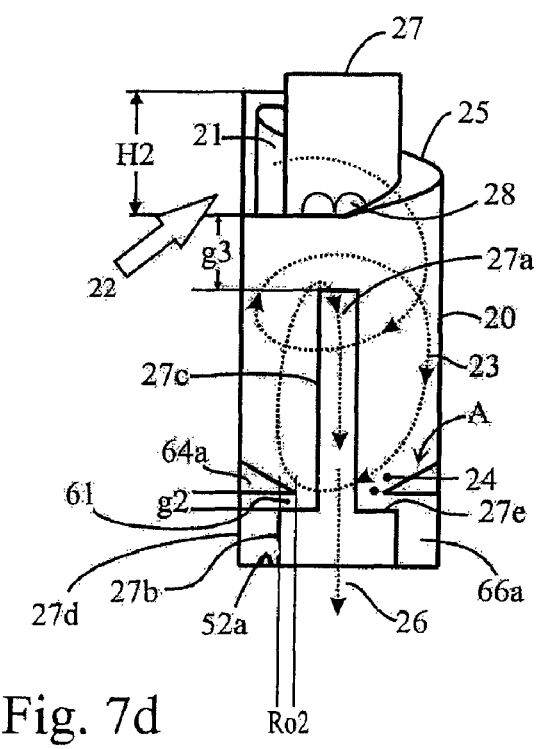

In an alternate embodiment, instead of a plate 32, the central portion e.g., 27e of FIGS. 7d and 55 of FIG. 7, of the bottom 31 of the cyclone casing may be raised inwardly so as to define a plateau. The raised floor 55 may have a continuous wall, e.g., 27b of FIG. 7d, which extends downwardly adjacent the periphery of the raised floor 27e so as to define a side wall, which may be generally vertical, and which extends upwardly from the floor 52a of the cyclone bin to the raised floor 27e. Alternately, the side wall 27b may be recessed underneath the raised floor. The side wall may have any of the configurations referred to above for the peripheral edge 32c of a plate 32. In addition, the raised floor a may be circular in cross section. However, the cross section of the floor may be varied so as to define a variable annular gap between the side wall and the inner surface 56 of the wall 45 of the cyclone casing.

Positioning of a Divider Plate for Cyclone Separators

Figure 6E:
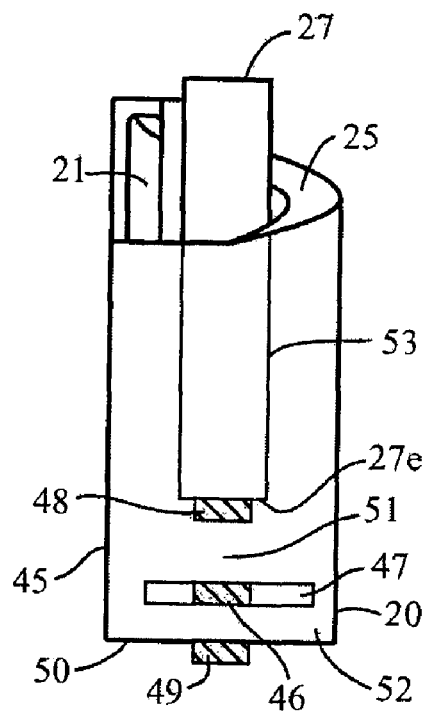
FIG. 6e is a vertical section through a cyclone separator showing an alternate preferred embodiment of the instant invention wherein the plate is mounted by means of magnets.

In accordance with another aspect, which may be used individually or with any other aspect, a passage, all or a portion of which extends outwardly, is preferably provided for connecting the cyclone chamber 53 in communication with the dirt collection chamber 52. Preferably, as shown in FIGS. 2 and 6e, the cyclone chamber includes a fluid outlet 27, which has a lower end that may comprise an entrance 27a to the fluid outlet 27, which is positioned above plate 32. The entrance to fluid inlet 27 may be covered by a screen, such as screen 28. The gap between plate 32, and the lower extent of fluid outlet 27, or screen 28 if provided, may be greater than 0.5", preferably greater than 1" and, more preferably greater than 2". In any such embodiment, the lower extent of fluid outlet 27 is preferably positioned below the bottom of cyclone inlet 21. The passage defines a vertical annular gap that has a height that may be less than 2" and, preferably less than 1". In any embodiment, the height may be less than ⅓, preferably less than ⅙, more preferably less than 1/10 and, most preferably less than 1/20 the diameter of the cyclone immediately below the bottom of the cyclone inlet 21.

It will be appreciated that the passage may be produced in several ways. For example, the outer circumference of the cyclone casing may be increased proximate to the height of the raised floor so as to create an outer annular region which functions as a dirt collection chamber. An example of such a construction is shown in FIG. 7 wherein a passage 61 having a vertical annular gap g and a length RO is positioned between the raised bottom wall 55 and the laterally extending wall 59b of the cyclone separator 20. In this embodiment the plate (raised floor 55) is formed by a step in the floor 59a of the cyclone separator 20.

An alternative construction is shown in FIG. 7a wherein the passage 61 having the vertical annular gap g is formed between the plate 54 and the wall 59b of the cyclone separator 20. The plate may be a molded or formed part and the gap (g) is formed between the plate 54 and the wall 59b of the cyclone separator 20 wherein plate 54 may be affixed to the wall 57a by support arms 58 extending inwardly from wall 57a or affixed to an optional screen member (not shown) which would be affixed or removably affixed to or mounted to, e.g., wall 57a, wall 45, the top of the cyclone, or a combination thereof. The plate 54 may optionally be held in place by magnets or other means described elsewhere herein.

Another alternative construction is shown in FIG. 7b wherein the passage 61 having a vertical annular gap g is formed between the raised bottom 55 and the wall 59b of the cyclone separator 20. A particle collection region 62 is formed in the annular space between the wall 59 and the wall 60. One advantage of this design is that the cyclone may be oriented with its longitudinal axis extending horizontally so that particulate matter may accumulate in collection region 62.

Another alternative construction for a plate 32 is shown in FIG. 7c wherein the passage 61 having a vertical annular gap g is formed between the plate 63 and the airflow redirector ring 64 of the cyclone separator 20. In this embodiment the plate comprises a disc attached, e.g., to the cyclone separator floor 59 of the cyclone separator 20. A particle collection region is marked 66. The airflow redirector ring creates and angle (A) with the wall 65 of, preferably, between 15° to 75° and, more preferably, 30° to 60° and most preferably 40° to 50°. It is understood that the airflow redirector ring 64 can take different geometries including those illustrated as 67, 68, 69, 70, 71 or 72.

Another alternative construction for a cyclone and dirt collection region is shown in FIG. 7d wherein the air exits from the end of the cyclone opposed to the end of the cyclone separator 20 having inlet 21. If the cyclone separator is vertically aligned, then the air enters the cyclone through an inlet air inlet 21 that is located on the top of the cyclone separator 20. The cyclonic circulation 23 causes at least a portion of the particles 24 within the particle laden fluid stream 22 to become removed and trapped within the collection region 66a of the cyclone separator 20. The fluid stream 26 which exits the cyclone through the outlet or entrance 27a to down flow tube 27c located in the bottom of the cyclone separator 20 at the end opposite to the inlet 21. Thus, a portion of the particles 24 originally entrained in the particle laden fluid 21 are removed. In this embodiment, the air travels down flow director 64a and then travel downwardly towards laterally extending wall 27e. The air then travels outwardly in the passage 61 between flow director 64a and lateral wall 27e that has a vertical annular gap g2.

The passage may have a height that is less than ⅓ the diameter, preferably, less than ⅙ the diameter, more preferably less than ¹⁄₁₀ the diameter and most preferably less than ¹⁄₂₀ the diameter. Accordingly, the height may be 2 inches or less and preferably 1 inch or less. In a particularly preferred embodiment, preferably, the height of the gap (g) is 0.015" to 0.250" for cyclones larger than 1 inch in diameter D, especially for use in vacuum cleaners. A radial overlap (RO) that defines the length of the passage 61 is defined by the overlap of the raised bottom floor or plate and the outwardly extending portion 59b of wall 59 of the cyclone separator and/or the flow director. Preferably, this radial overlap is 0.015" to 0.250" for cyclones larger than 1 inch in diameter D. Preferably, the height of the gap (g) is 0.002" to 0.040" for cyclones smaller than 1 inch in diameter D, and raised bottom floor 55 extends outwardly to extend slightly underneath the lower portion 59b of wall 59. More preferably the radial overlap between the lower portion 59b of wall 59 and the outer radial edge of the raised floor 55 is 0.005" to 0.125" for cyclones equal to or smaller than smaller than 1 inch in diameter D. In an alternate embodiment exemplified in FIG. 7d, it has been found that the gap g2 is preferably 0.025" to 0.075" for cyclones greater than one inch in diameter D for collecting particles between 4 and 100 microns in size. It has been found that the gap g2 is preferably 0.025" to 0.075" for cyclones greater than one inch in diameter D for collecting particles between 4 and 100 microns in size. It has been found that the gap g2 is preferably 0.005" to 0.040" for cyclones smaller greater than one inch in diameter D for collecting particles between 0.1 and 10 microns in size, and more preferably 0.015" to 0.025".

It is also understood that the dimensions of the gap (g) and the radial overlap may be varied around the perimeter of the raised bottom wall 55 to create conditions which are optimal for the collection of a band of particle sizes or particle densities.

The distance between the floor of the dirt collection region and the bottom of flow director 64a is preferably not less than the height of the inlet H2 and the height of section 27c is preferably greater than 2H, more preferably 4H and most preferably greater than 8H and the gap g3 between the bottom of the inlet 21 and the top of the down flow tube section 27c is preferably 0.5H2 to 1.5H2, and more preferably approximately 0.9H2. The internal area of the down flow tube 27c is preferably at least equal to the area of the spiral inlet 21 and more preferably is 1.5 to 2.5 times larger than the area of the spiral inlet 21. This cyclone design may optionally incorporate an airflow redirector 64a, which may be shaped as 67, 68, 69, 70, 71 or 72 or any similar shape, which creates a barrier to the re-entrainment of particles 24 captured in the region 66a.

The height of the gap (g2) is preferably 0.002" to 0.040" for cyclones smaller than 1 inch in diameter D, and the radial overlap RO2 between the airflow redirector ring 64a and the edge of the down flow tube 27b is preferably 0.005" to 0.125" for cyclones equal to or smaller than smaller than 1 inch in diameter D. It is also understood that the dimensions of the gap (g2) and the radial overlap (R02) may be varied around the perimeter of the down flow tube 27b to create conditions which are optimal for the collection of a band of particle sizes or particle densities.

In alternate embodiments, a cyclone separator 20 having a passage 61 may be used as a particle filter in the outlet conduit from a combustion chamber, preferably downstream from the outlet of a wood stove, a furnace, a car engine and a producer gas unit (partial oxidation reactor).

Moveable Divider Plates for a Cyclone Separator

In accordance with another aspect, which may be used individually or with any other aspect, it is understood that plate 32 may be permanently, removably, translatably or pivotally affixed in cyclone separator 20, such as by being permanently, removably, translatably or pivotally affixed to screen 28 or side wall 45.

The plate 32 may be held in position by means of magnets and or magnets may be used to assist in particle capture. For example, the plate 32 may have one or more magnets provided thereon and positioning magnets may be provided over and/or below the plate 32 wherein the faces of the positioning magnets that face the plate 32 have the same polarity as the faces of the magnet or magnets on plate 32 which are spaced from but facing the positioning magnets. Accordingly, the plate 32 may be held in place by magnetic repulsion. Alternately, it will be appreciated that the plate may be held in position by magnetic attraction.

FIG. 6e exemplifies a construction wherein a plate magnet 46 is affixed to or embedded within the plate 47 and is magnetically suspended between the positioning magnets 48 and 49 by means of magnetic repulsion. The magnet 49 may be affixed to or embedded within the floor 50 of the cyclone separator 20. One advantage of this construction is that the magnets 46, 47, 48 and 49 create a magnetic field within the cyclone chamber to enhance the collection of magnetic and paramagnetic particles.

If the floor 50 is removable or moveable (e.g. pivotally mounted such as by pivot hinge 50a as shown in FIG. 2a), then when dirt collection chamber 52 is opened (e.g. floor is pivoted open), the plate 47 could be removed (e.g., if it is not attached by any means to the cyclone separator it would fall out) or if it is mechanically retained (not shown) it could be translated some distance either vertically, laterally, or both to facilitate the removal of particles collected both in the cyclone chamber 51 above plate 47 and in the dirt collection region 52 below plate 47.

Similarly, if upper positioning magnet 48 is associated with a screen (not shown), such as by being affixed thereto or embedded therein, and the screen is removed through or with the outlet 27, plate 47 could be removed or if it is mechanically retained (not shown) it could be translated some distance either vertically, laterally, or both to facilitate the remove of particles collected both in the main collection region 51 and in the dirt collection region 52. Alternately, plate 32 may be moveable when a door, e.g., a bottom opening door 50, is pivoted open about, e.g. pivot hinges 50a. Accordingly, plate 32 may be secured to inner surface 56 of wall 45 of the dirt collection chamber 52 by any means known in the art, such as by a pivot hinge 158 (see for example FIGS. 6g and 6h). Plate 32 may be supported in a generally horizontal, or other desired, position by a column 160 extending upwardly from door 50. When door 50 is opened, such as by pushing button to move lever 164 outwardly and release the engagement of flange 166, and which may be by any means known in the art, plate 132 may pivot down, e.g., to a position generally parallel to or, as exemplified, inclined with respect to the axis of the cyclone separator.

It is understood that the plate 47 may be any type of plate including but not limited to those described in FIGS. 6, 6a, 6b, 6c and 6d. It is also understood that this configuration may be employed with any top inlet or a side wall inlet cyclone geometry. It is understood that magnetic attraction to another magnet or to a magnetically permeable material such as steel may also be used to movably or removably fix the plate 47 in position. It is also understood that a single positioning magnet may be used to produce a repulsive or attractive force to force the plate 47 against a fixed, movable or removable stop thereby permanently, movably or removably fixing the plate into position. An advantage of magnetic mounting is that the translation of the plate 47 to facilitate the removal of trapped particles makes cleaning such a unit much easier.

Magnetic Separation

In accordance with another aspect, which may be used individually or with any other aspect, one or more magnets may be provided in an air flow passage so as to assist in attracting and retaining metallic and paramagnetic particles. For example, one or more magnets may be provided adjacent the inlet or outlet, or inside the inlet or outlet, of a cyclone. Alternatively, or in addition, it will be appreciated that one or more magnets may be provided at any desired location inside a cyclone chamber, or exterior to a cyclone chamber or air flow passage, provided that the magnetic field extends inside the cyclone chamber or air flow passage.

In accordance with another embodiment of the instant invention, one or more magnets may be removably attached to the plate 47, the cyclone separator 20 and/or an air flow passage. When the magnet is removed, magnetic particles that have accumulated may fall off any surface to which they are adhered by magnetic force and/or may be removed by mechanical means. Accordingly, removal of the magnet assists in cleaning the cyclone separator.

Figure 6F:
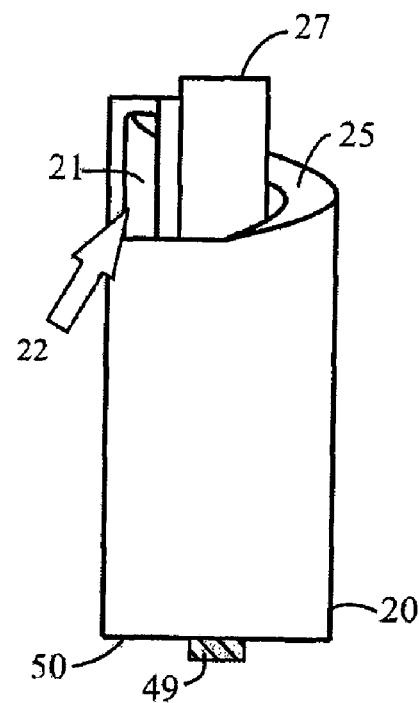
FIG. 6f is a side view of a cyclone separator showing an alternate preferred embodiment of the instant invention wherein a magnet is used to assist in particle capture.
Figure 6G:
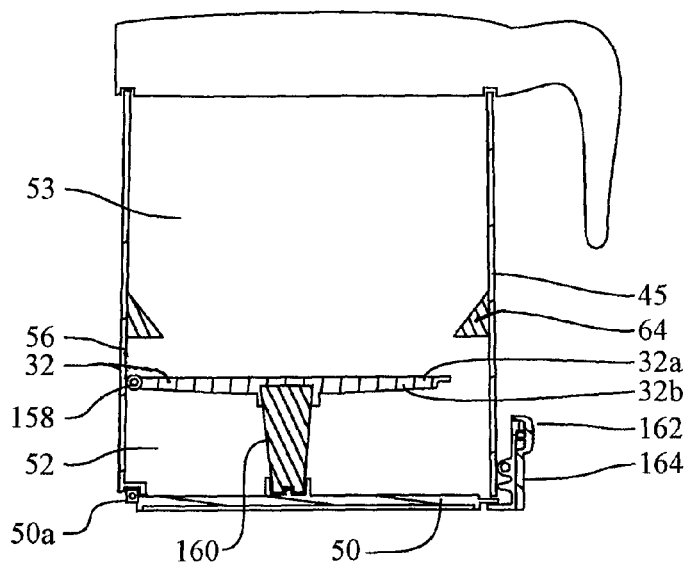
FIG. 6g is a vertical section through a cyclone separator showing an alternate preferred embodiment of the instant invention wherein the plate is mounted by mechanical means to the inner surface of the side wall of the dirt collection chamber wherein the bottom door is closed.
Figure 6H:
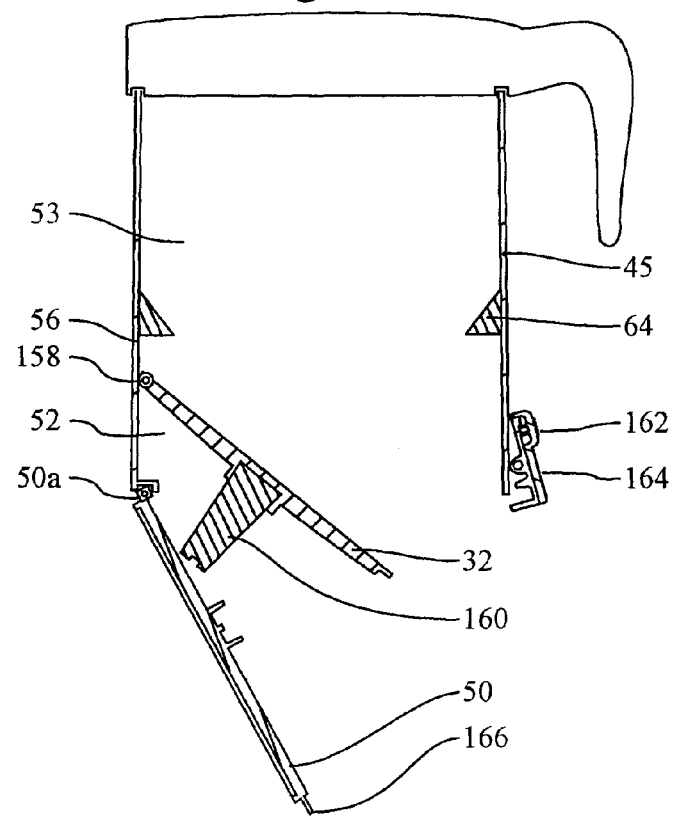
FIG. 6h is a vertical section through a cyclone separator of FIG. 6(g) wherein the bottom door is open.

For example, as exemplified in FIG. 6f, a cyclone separator 20 has a magnet 49a affixed to the floor 50, and optionally to the wall, (not shown) to assist in the collection of metallic and magnetic particles wherein the magnet 49a can be translated away from or removed from the floor 50 thereby eliminating the magnetic influence and allowing the particles captured in the cyclone separator 20 to be easily removed by either removing the floor 50 or by removing the inlet/outlet elements and pouring the contents of the cyclone.

Cyclone Separator Arrays

Figure 8A:
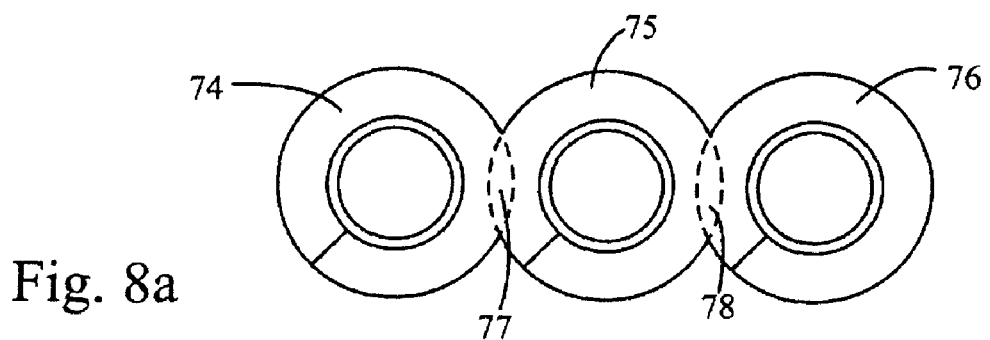
FIG. 8a is a top plan view of a construction detail for the array of cyclones of FIG. 8.

In accordance with another aspect, which may be used individually or with any other aspect, an array of cyclones is provided. Referring to FIG. 8a plurality of parallel cyclones 73 is provided, which may be of any construction know in the art or described elsewhere in this specification, and preferably are designed and configured to create a high separation efficiency and a high airflow rate with a minimum back-pressure. Preferably, the array comprises a large number of cyclones 73 in parallel. In particular, the array may comprises more than 1 cyclone per square inch, preferably more than 4 cyclones per square inch, more preferably 9 or more cyclones per square inch such that high airflow rates and high separation efficiencies for very small particles can be achieved. If the array is designed to separate particles smaller than 1 micron, the use of cyclone densities of 9 to 64 cyclones per square inch is preferred. Such arrays may be useful as a pre and/or post motor filter in a vacuum cleaner or in a breathing mask. For example, such an array may be positioned in the pre-motor area 16 (see FIG. 2).

Figure 8B:
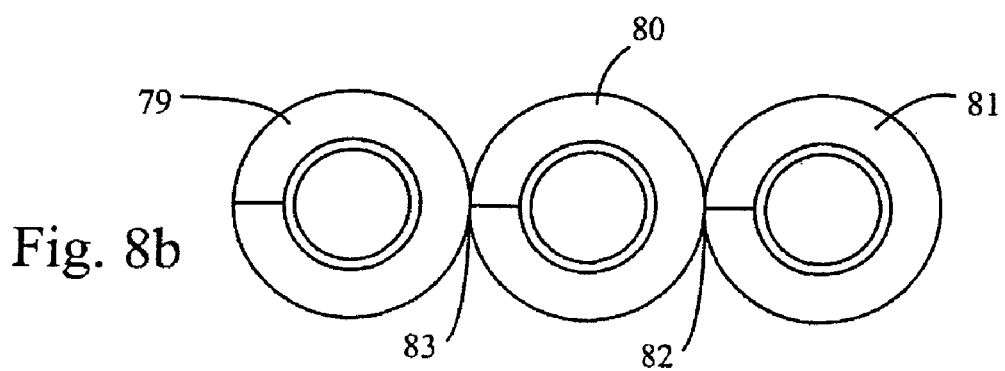
FIG. 8b is a top plan view of an alternate construction detail for the array of cyclones of FIG. 8.
Figure 8C:
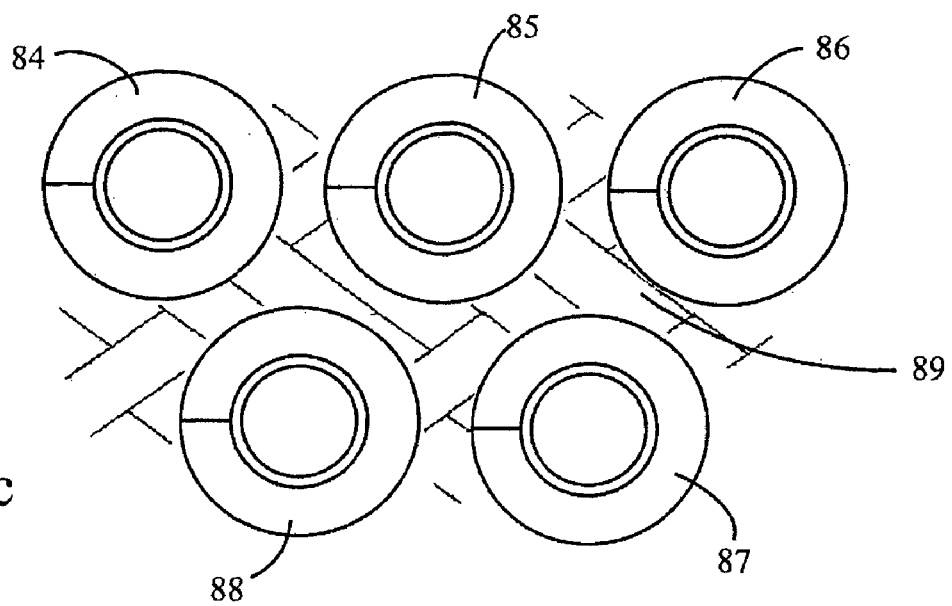
FIG. 8c is a top plan view of an alternate construction detail for the array of cyclones of FIG. 8.
Figure 8D:
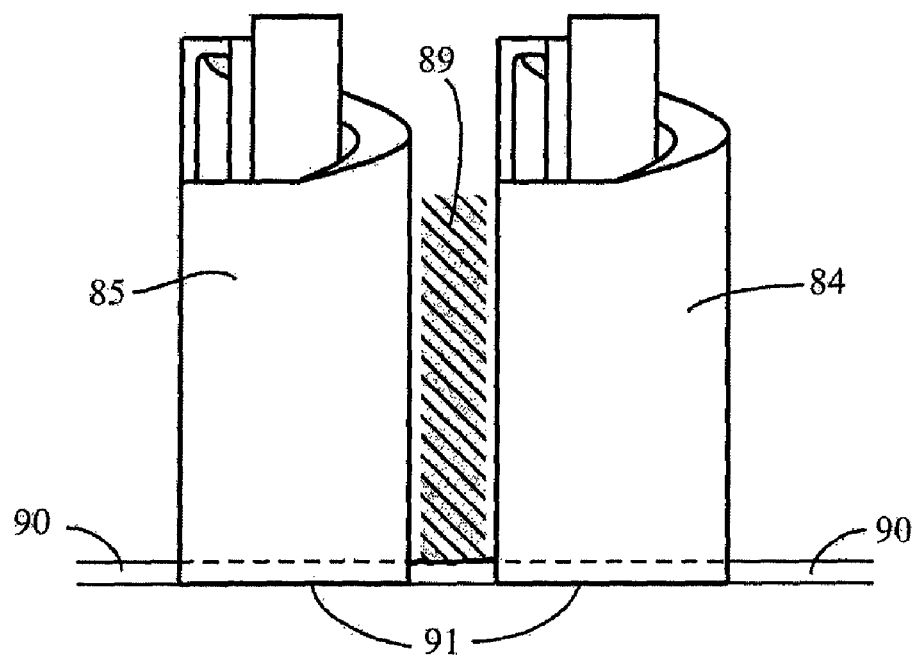
FIG. 8d is a side view of the alternate construction detail of FIG. 8c.
Figure 9A:
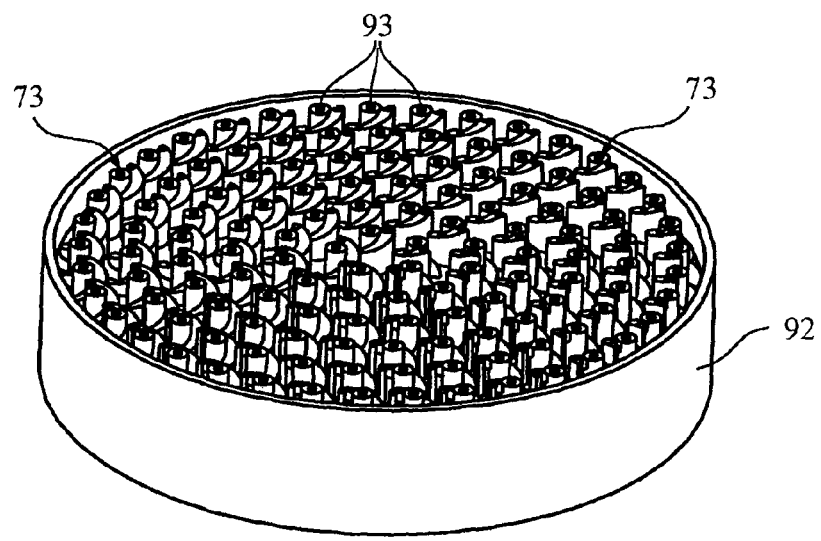
FIG. 9a is a perspective view of the cyclone array of FIG. 8c.
Figure 9:
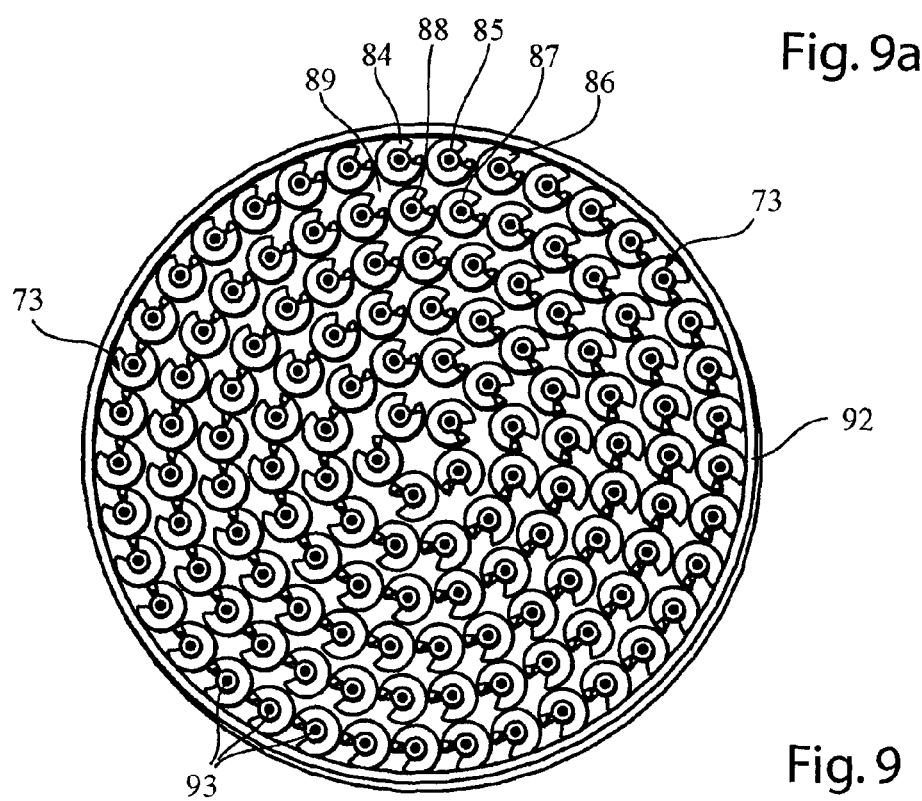
FIG. 9 is a top plan view of the cyclone array of FIG. 8c.
Figure 10:
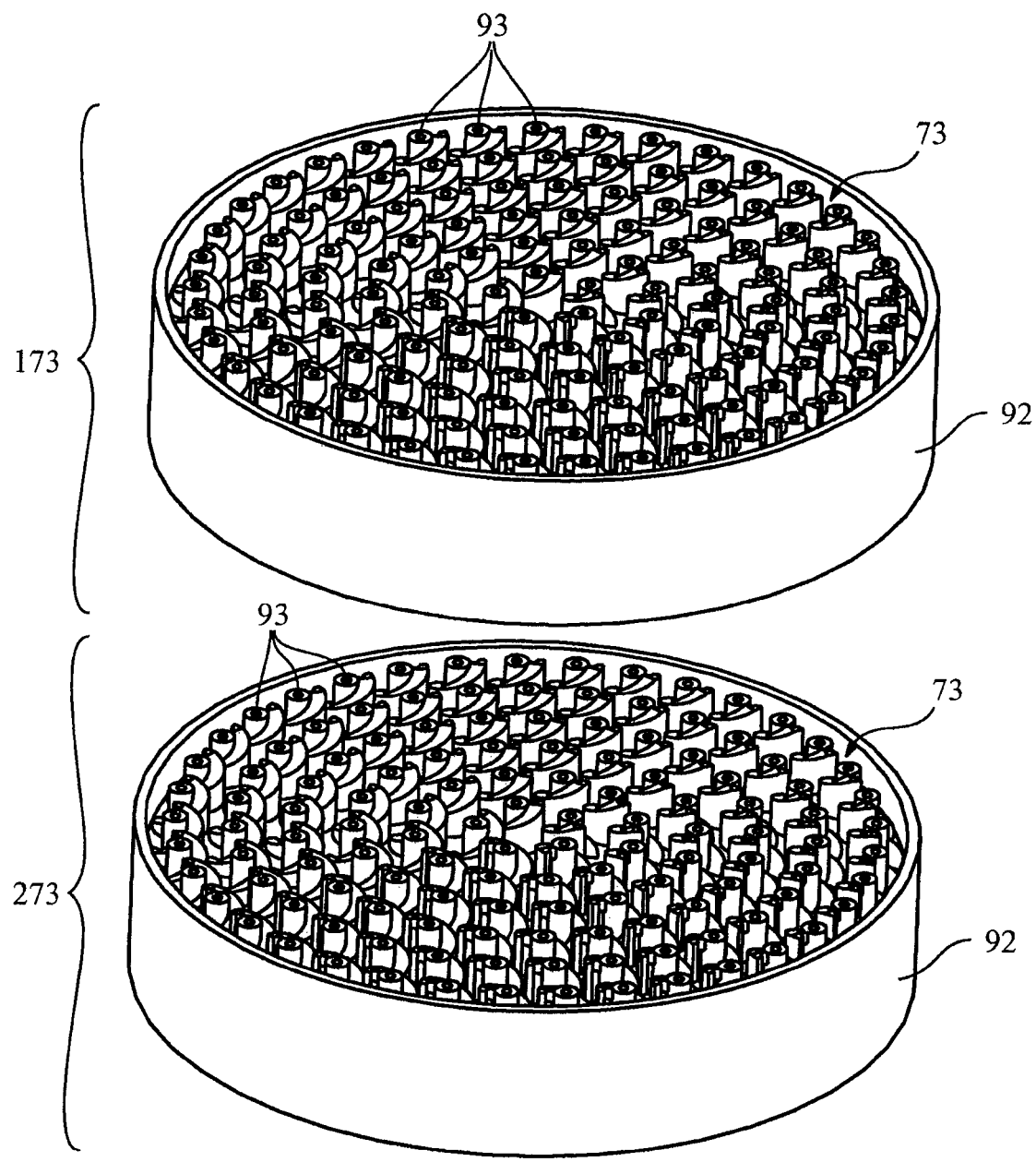
FIG. 10 is an exploded perspective view of the cyclone array of FIG. 8c constructed as two sequential stages with a common manifold between the stages.
Figure 11A:
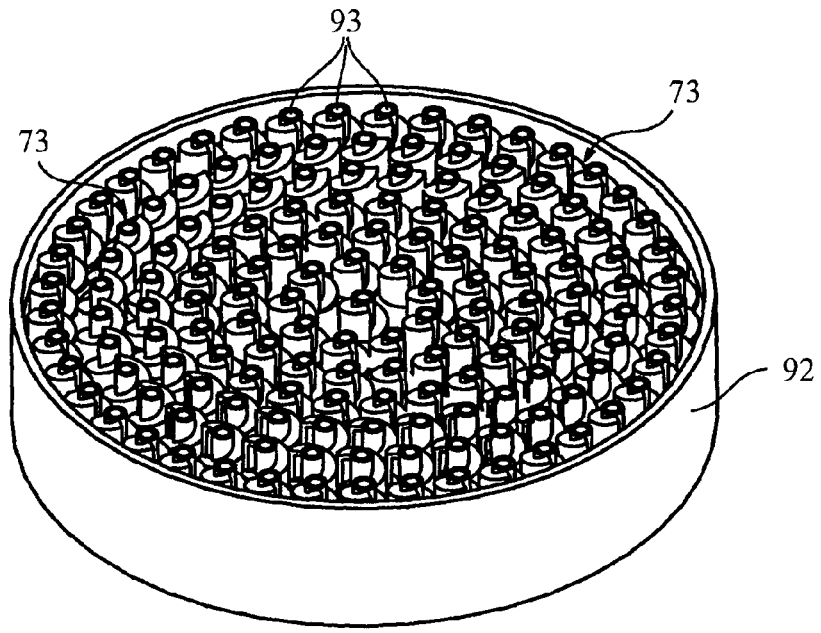
FIG. 11a is a perspective view of the cyclone array of FIG. 8b.
Figure 11:
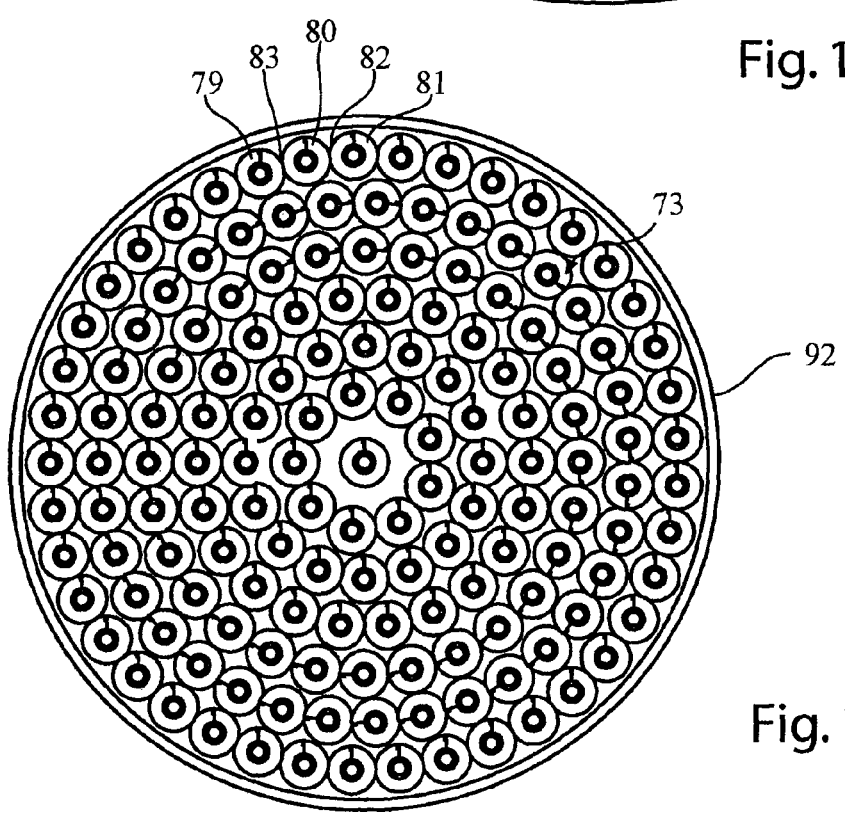
FIG. 11 is a top plan view of the cyclone array of FIG. 8b.
Figure 12:
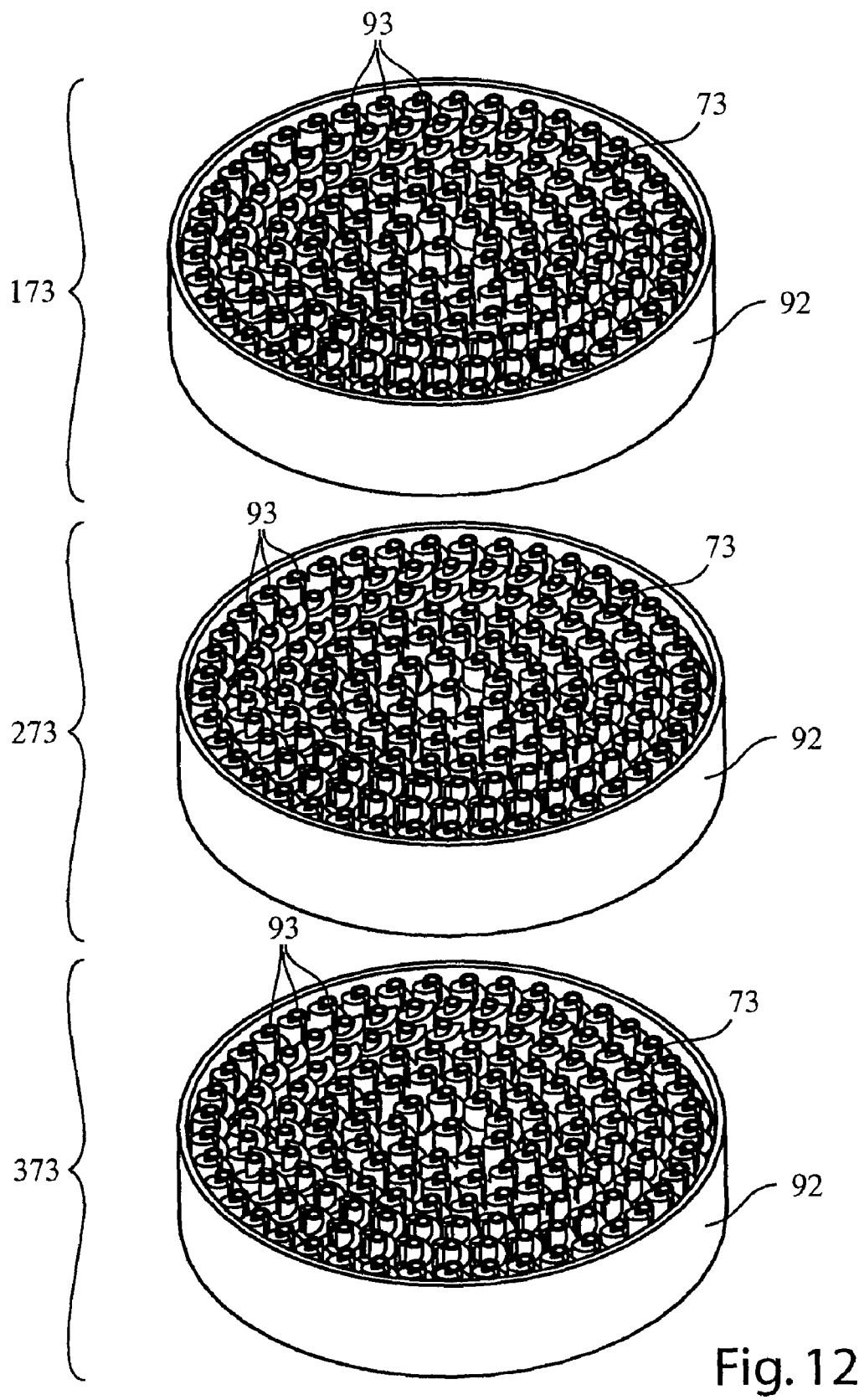
FIG. 12 is an exploded perspective view of the cyclone array of FIG. 8b constructed as three sequential stages with a common manifold between the stages.
Figure 13A:
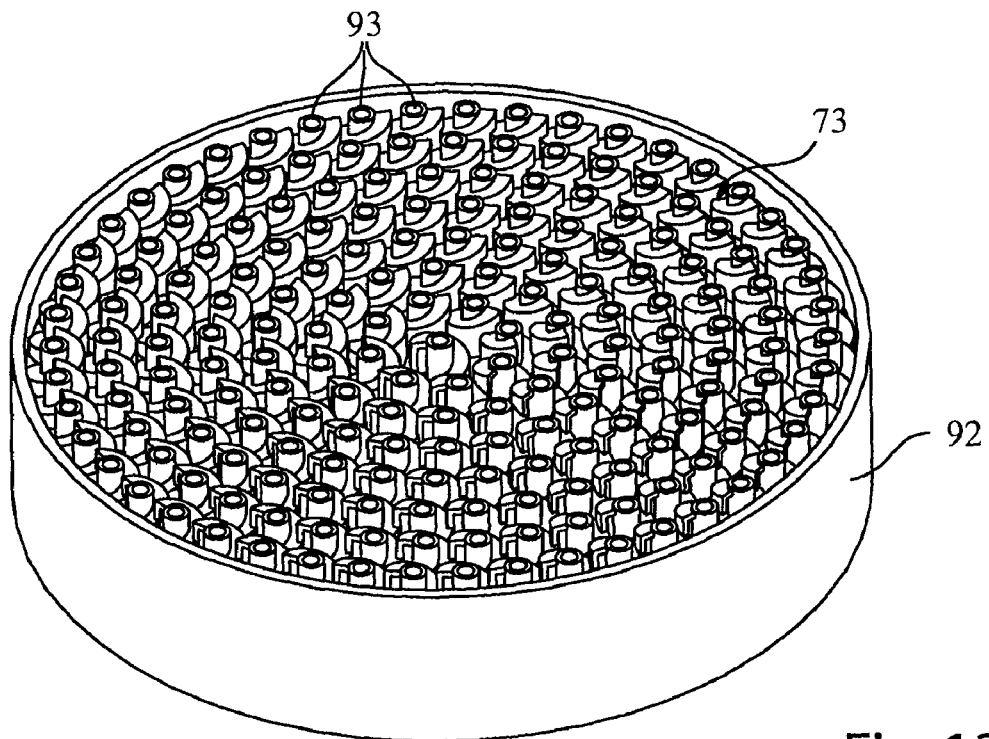
Figure 13:
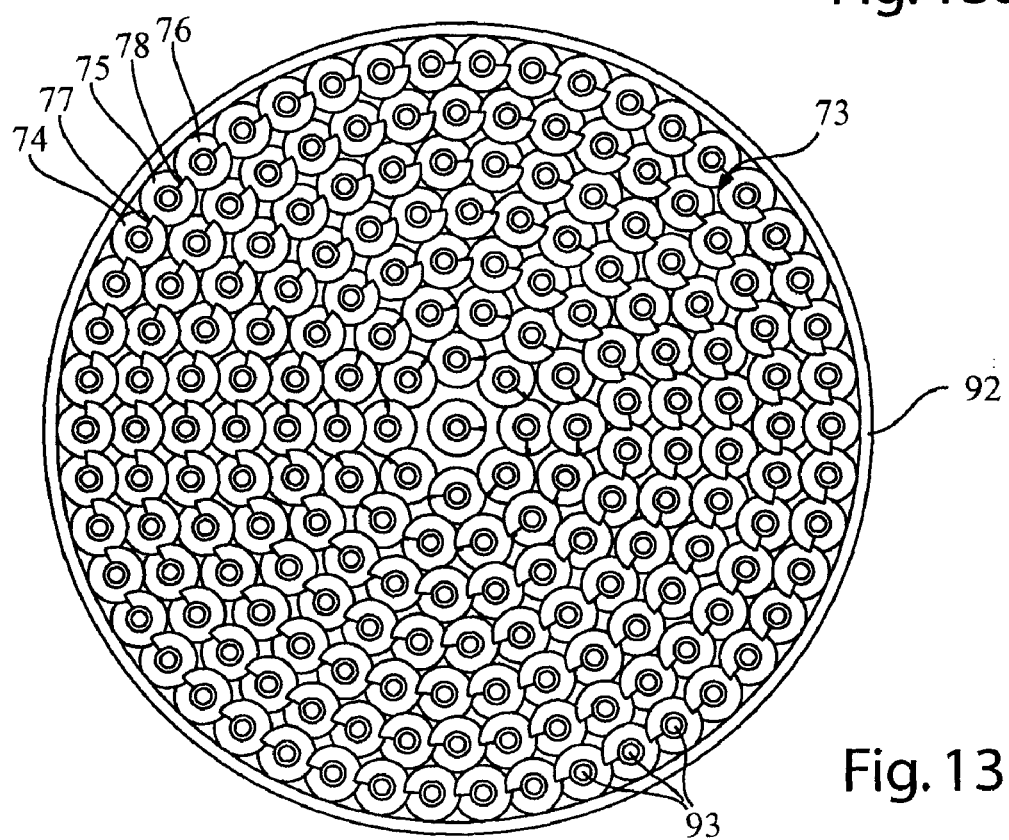
Figure 14:
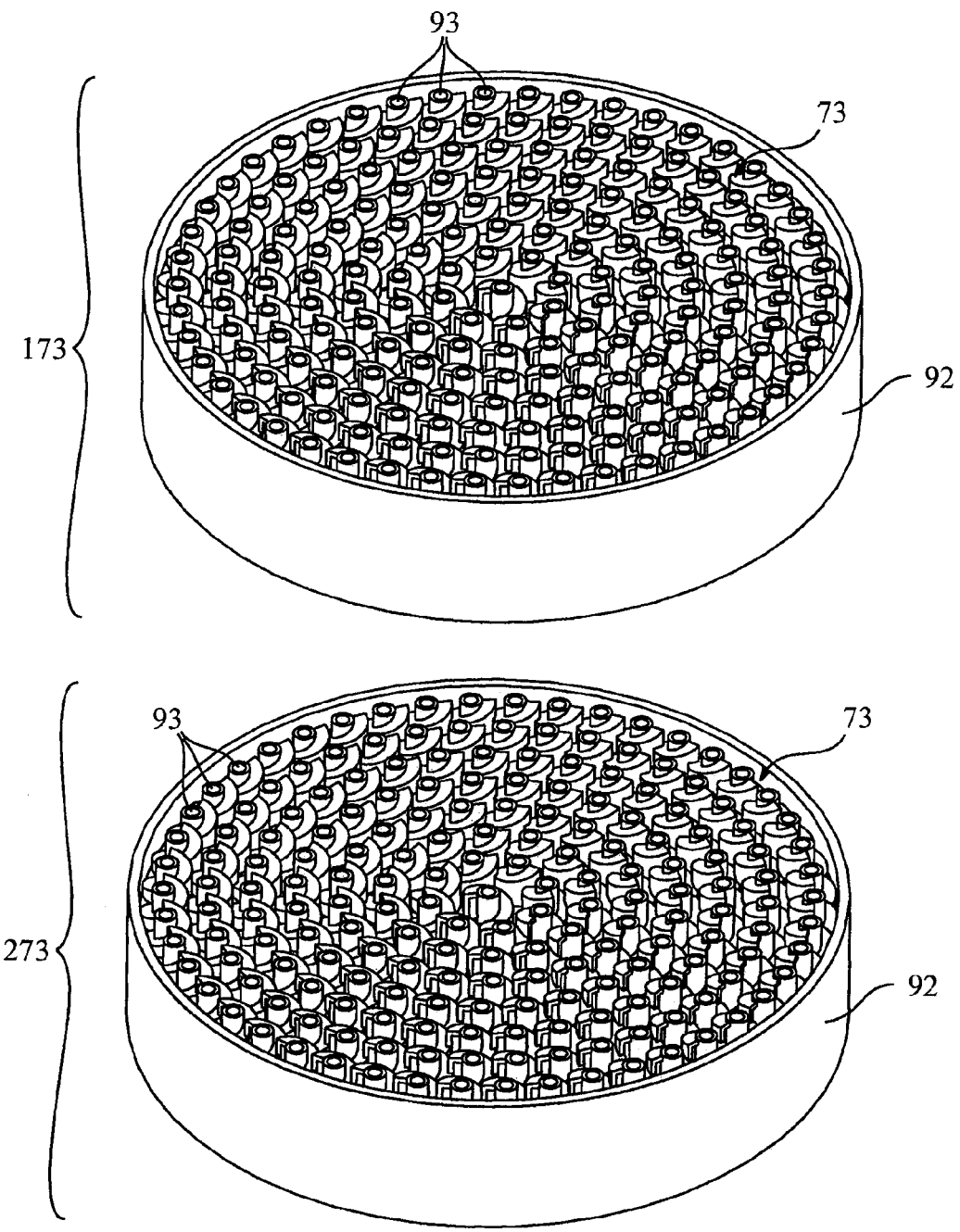
FIG. 14 is an exploded perspective view of the cyclone array described in FIG. 8a constructed as two sequential stages with a common manifold between the stages

Alternately, or in addition, an array of cyclones may be of various constructions to increase the compactness of the cyclone array or to increase the efficiency of the cyclone array. As exemplified in the embodiment of FIG. 8a, the construction of a cyclone array may employ a common wall between some and preferably all of the cyclones as shown in FIG. 8a where three cyclones 74, 75 and 76 within the array 73 are shown with a portion of their walls overlapping in areas 77 and 78 to allow a very compact geometry. Alternately, or in addition, the construction of a cyclone array 73 can employ a touching wall between some, and preferably all, of the cyclones. An example is shown in FIG. 8b where three cyclones 79, 80 and 81 are positioned with their walls touching at positions 82 and 83, which creates a stronger construction with fewer cyclones. Alternately, or in addition, the construction of a cyclone array 73 may employ spaced apart cyclone walls as shown in FIG. 8c where the cyclones 84, 85, 86, 87, and 88 are spaced apart which makes them easier to mold. An advantage of spacing the cyclones apart is that the space between the cyclones 84, 85, 86, 87, and 88 may form a region 89 where further particle collection can occur as the air travels (e.g., "spins") to enter the cyclonic inlets of each individual cyclone (e.g., if a manifold is provided which covers all of the cyclone inlets) as opposed to each inlet being connected directly to a fluid flow conduit. If the common floor 90 between the cyclones 84, 85 and the others from FIG. 8 is moved to the bottom of the cyclones 91, the capacity of the annular space 89 for the collection of fine particles will be increased. Preferably, the cyclone arrays described in FIGS. 8, 8a, 8b, 8c and 8d are constructed using one or more of the configurations described in FIGS. 7, 7a, 7b, 7c, and 7d.

Figure 16:
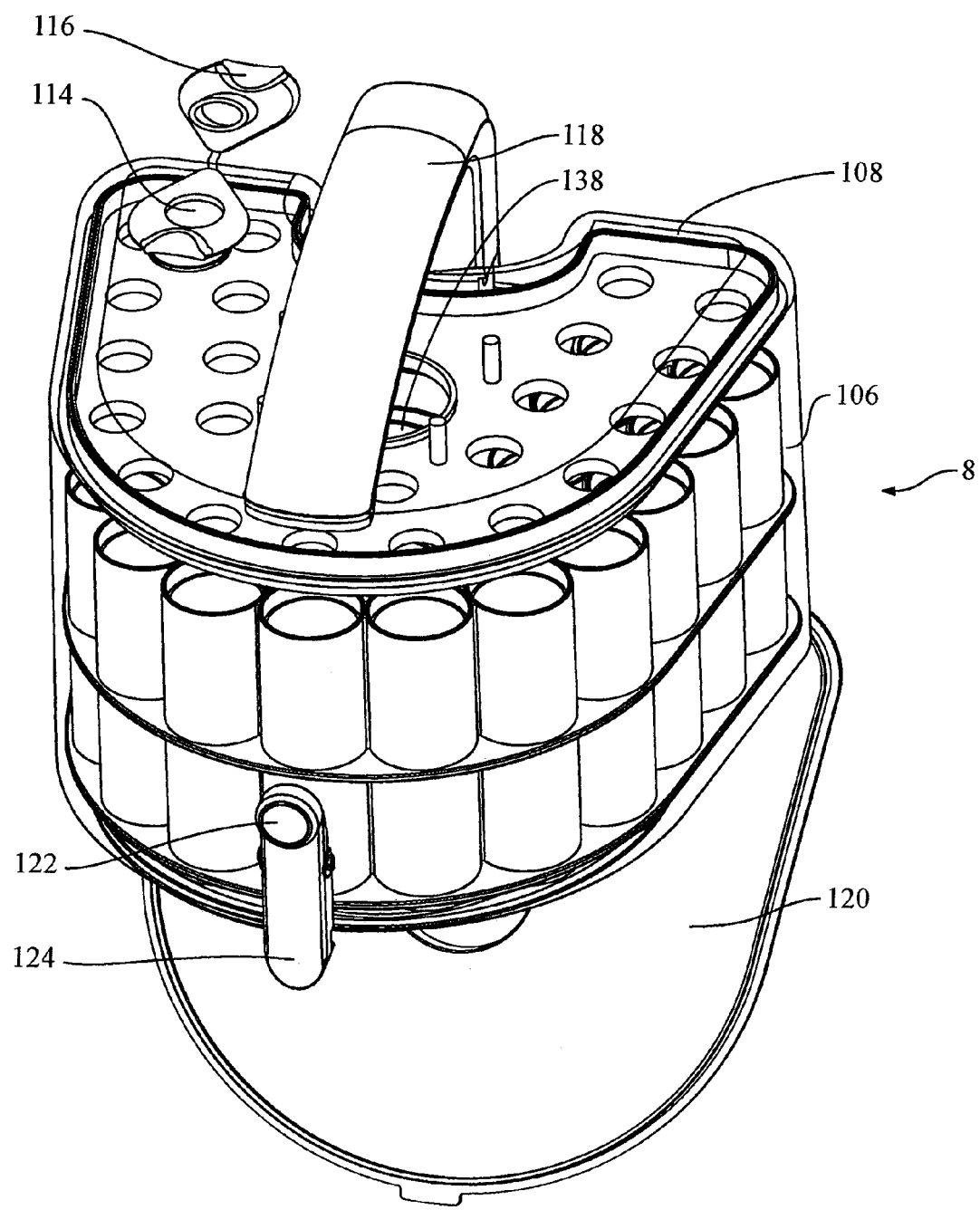
FIG. 16 is a perspective view of a cyclone array removed from a vacuum cleaner wherein the water inlet port is open.

If an array of cyclones is provided, then the cyclones are preferably cleaned by passing water therethrough. Accordingly, at least one water port may be provided to permit water to enter or exit the cyclone array. For example, as shown in FIG. 16, water inlet port 114 may be provided with a closable cap, or other closure member, 116. Water inlet port 114 is preferably provided on top surface 108 and is in communication with the fluid flow passage leading to the cyclones (e.g., the dirty air flow passage in a vacuum cleaner extending to the cyclone inlets). The inlets preferably are downstream from a header 130 and the water inlet port 114 is provided in the header. When cap 116 is open, a user may pour water into port 114. The water will flow through a passage to the cyclones. The user may then use handle 118 to move away, e.g., in a swirling motion. Thereafter, the water may be drained, e.g., by pushing button 122 that moves lever outwardly so that bottom door 120 pivots open to permit water and suspended dirt to be removed by passing downwardly out of bottom of stage cyclones 9 (see for example FIG. 20).

In accordance with this aspect, a plurality of cyclones in parallel may be provided wherein the cyclones have at least two dirt collection chambers, wherein the at least two dirt collection chambers are emptied at the same time. For example, the dirt collection chambers may have a common bottom 120 that is openable. Preferably, as exemplified in FIG. 20, each cyclone has a dirt collection chamber and all of the dirt collections chambers have a single common door so that, by opening a single door, all of the chambers are emptied at the same time. For example, in the embodiment of any of FIGS. 9, 9a, 10, 11, 11a, 12, 13, 14, the bottom 120 (not shown) may be pivotally mounted to peripheral wall 92 such that all cyclones are emptied concurrently.

The surface cleaning apparatus may have two cleaning stages wherein one of the stages, preferably the second, comprises a plurality of cyclones in parallel. The other cleaning stage, preferably the first cleaning stage may be any filtration or dirt collection member known in the art. It will be appreciated that, in another aspect, the surface cleaning apparatus may have only one cyclonic cleaning stage comprising a plurality of cyclones in parallel wherein the plurality of cyclones are removable as a unit, preferably with the associated dirt collection chamber or chambers.

Figure 17:
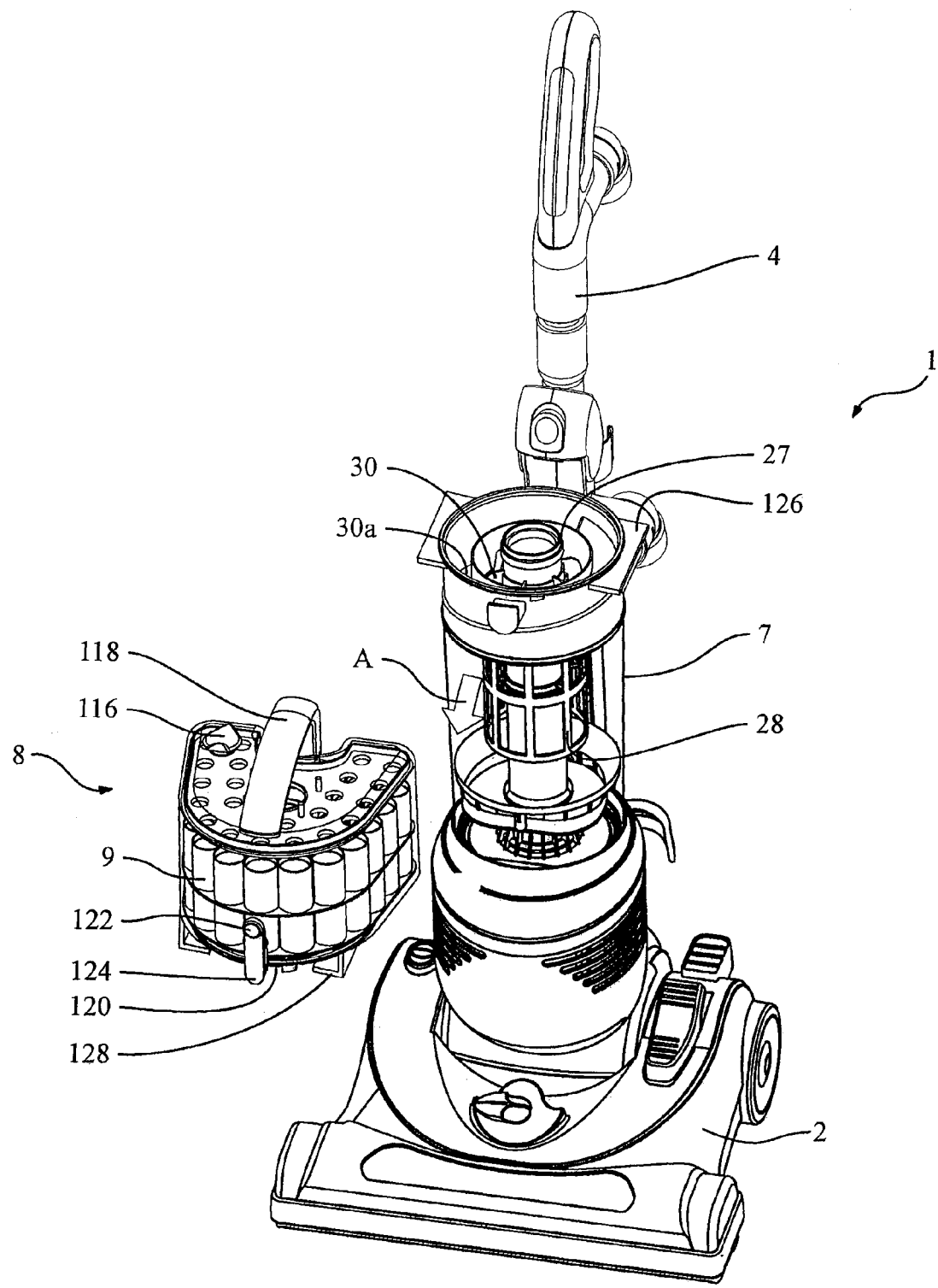
FIG. 17 is a perspective view of a vacuum cleaner wherein the second cyclonic stage is removed while the first cyclonic stage is retained in position on the vacuum cleaner.

In accordance with this aspect, it is preferred that two cyclonic stages are provided wherein at least one comprises a plurality of cyclones in parallel and the stages are emptied separately. For example, as shown in FIG. 17, second cyclonic cleaning stage 8, which comprises a plurality of cyclones in parallel, may be removed from vacuum cleaner 1 while the first stage cyclone 7 is retained in position in vacuum cleaner 1. The second cyclonic cleaning stage may be slidably mounted on flanges 126 that are received in L-shaped members 128 that are provided on the bottom panel of the stage 8, which is preferably a pivoting door 120. Accordingly, when second cyclonic cleaning stage 8 is removed, e.g., slide in the direction of arrow A, it may be carried to a garbage can, button 122 pressed and door 120 opened so that the second stage cyclones 9 may be emptied. Any locking member known in the art may be used to secure second cyclonic cleaning stage 8 in position on the vacuum cleaner and to connect the cyclone array 156 in air flow communication with the respective passages in the surface cleaning apparatus. For example, the cyclone array may be sealed in position by means of angled seals, a lifter mechanism or other sealing means known in the art. It will be appreciated that this design may be used if the vacuum cleaner only has one cyclonic cleaning stage.

Figures 18, 19:
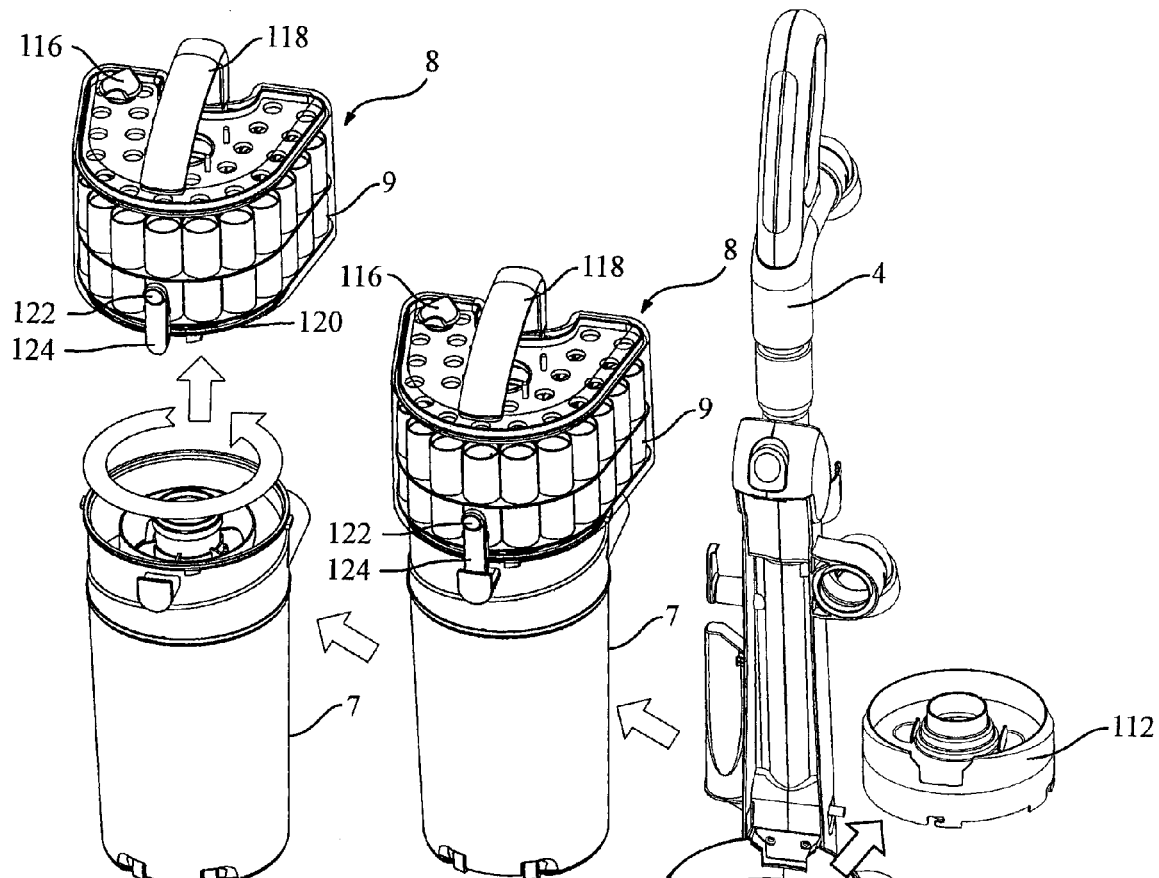
FIGS. 18 and 19 are perspective views of a vacuum cleaner wherein the first and second cyclonic stages are removed and the first and second cyclonic stages are subsequently separated for separate emptying.

Alternately, as shown in FIGS. 18 and 19, first and second cyclonic stages 7, 8 may be removed at the same time from the vacuum cleaner 1. Cyclonic stage 7 may then be emptied, e.g., by opening a bottom pivoting door 50. The cyclonic stages 7, 8 may first, or subsequently, be separated, such as by rotating cyclonic stage 8 relative to cyclonic stage 7 in the direction of arrow B as shown in FIG. 19. The second stage 8 may then be emptied. It will be appreciated that stages 7 and 9 may be emptied in any particular manner known in the art, such as by a bottom pivoting door or the dirt collection chamber being removed from the cyclone chamber.

In accordance with this aspect of the invention, it is preferred that the cyclone array is removed as a sealed unit, other than the other than fluid flow passages leading to and from the cyclones. For example, as shown in FIG. 2, air that exits the first stage cyclone 7 travels upwardly from outlet 27, through opening 150 in bottom 120 to one or more openings 148 in the bottom of second cyclonic cleaning stage 8 (See FIG. 20) that are upstream of header 130 and are connected thereto by a conduit. The air travels through the cyclones 9 and exits second cyclones 9 via outlets 13 to header 136 and then to down flow tube 138, which is upstream of conduit 14 and exits second cyclonic stage 8 via opening 152 in bottom 120. Thus, when second stage 8 is removed from the vacuum cleaner and/or the first stage, second stage 8 is sealed, other then the one or more openings in the bottom of second cyclonic cleaning stage 8 and the bottom 140 of down flow tube 138. The array may have a filter that is removable therewith.

Figure 20:
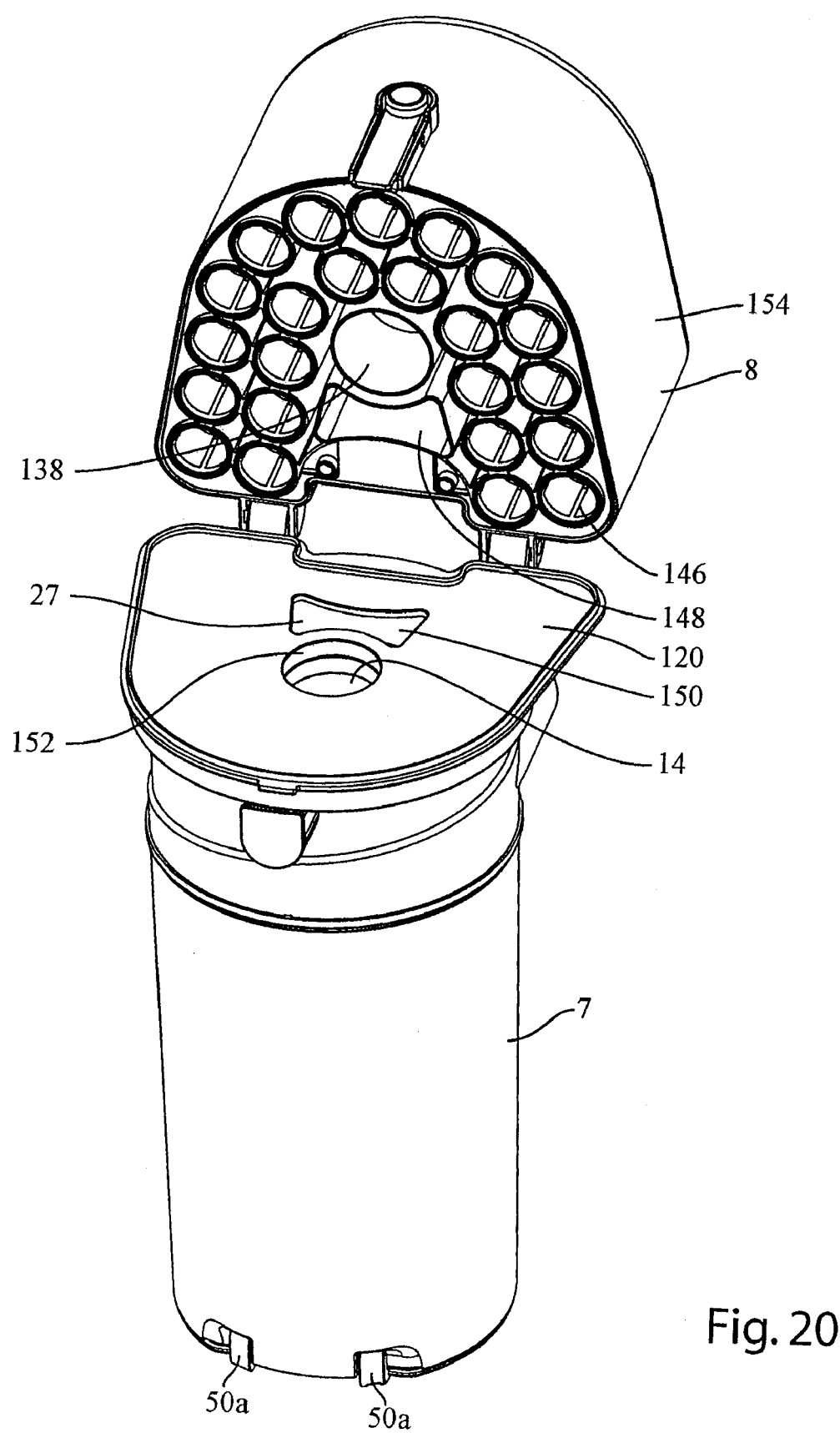
FIGS. 20 and 21 are perspective views of an alternate embodiment of a vacuum cleaner wherein the second cyclonic stage is removed while the first cyclonic stage is retained in position on the vacuum cleaner
Figure 21:
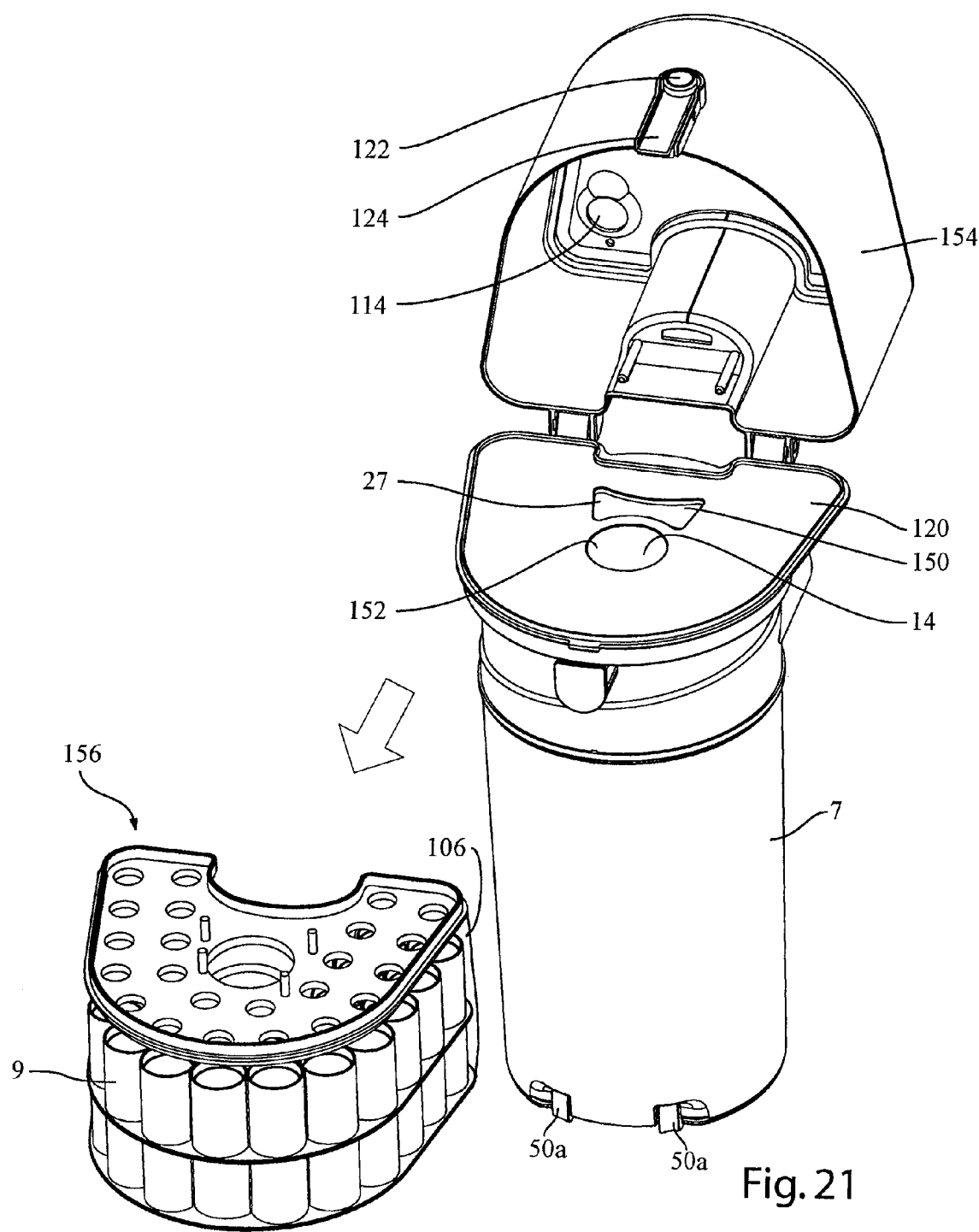

Another removal method is exemplified in accordance with the embodiment of FIGS. 20 and 21, wherein housing 154 of second cyclonic stage 8 is pivotally mounted to bottom 120 and, when opened, cyclone array 156 may be pulled downwardly out of housing 154 for emptying. Alternately, it will be appreciated that the top of housing 154 may pivot upwardly or otherwise open to permit cyclone array 156 to be pulled upwardly out of housing 154. It will be appreciated that, if the cyclone array 156 is preferably a sealed unit, then a bottom opening panel, with holes aligned with conduits 138 and 146, may be provided. In an alternate embodiment, the housing 154 may pivot upwardly leaving cyclone array 156 in position on top of the first stage cyclone 7 (or other filtration member or housing member). A consumer may then pick up cyclone array 156, such as by a handle, and remove it for emptying. It will be appreciated that this design may be used if the vacuum cleaner only has one cyclonic cleaning stage.

Transfer of Material Between Cyclone Stages

Figure 15:
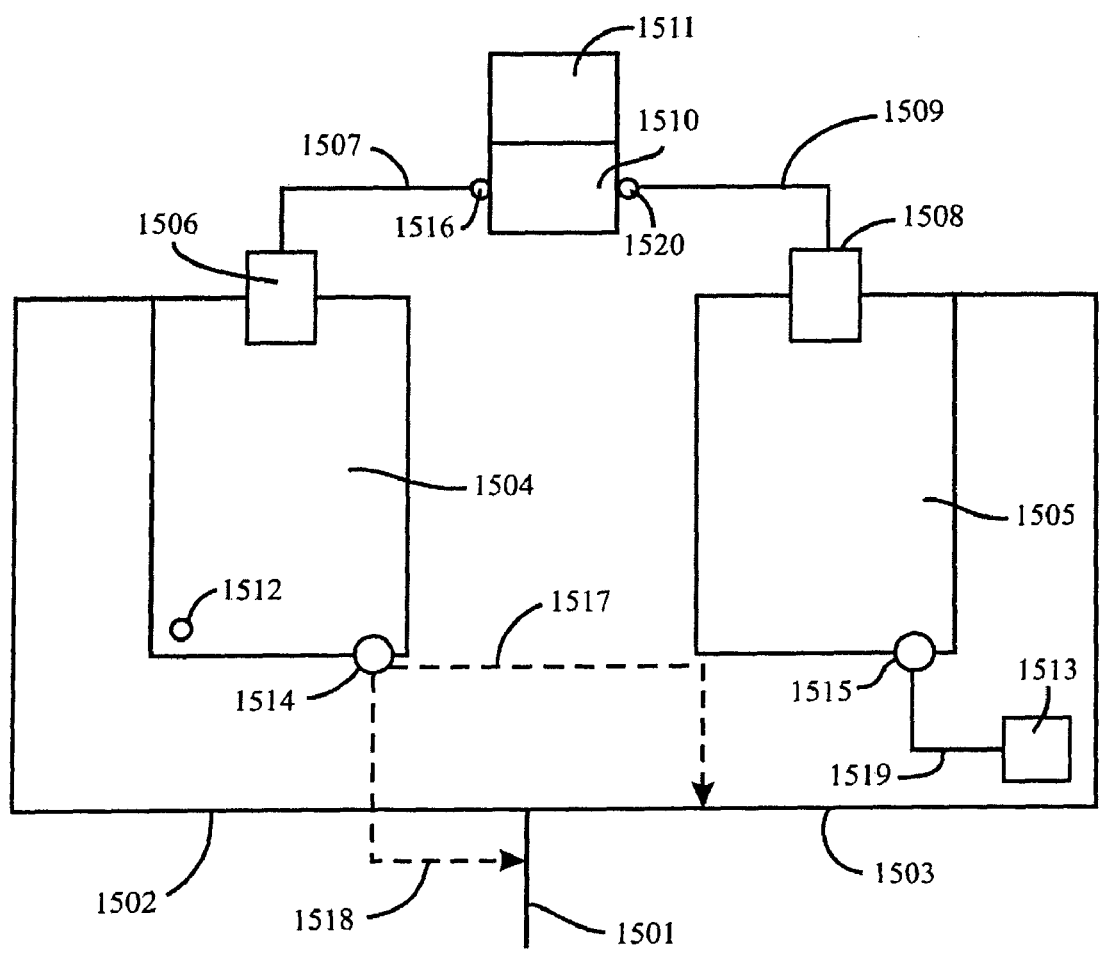
FIG. 15 is a schematic drawing of a vacuum cleaner having a plurality of cyclones in accordance with an alternate preferred embodiment of this invention.

In accordance with another aspect, which may be used individually or with any other aspect, a plurality of cyclones are configured such that material that is disentrained by one cyclone is conveyed to another cyclone by introducing the separated material into the fluid flow stream that travels to the other cyclone. An example of such an arrangement is shown in FIG. 15. As shown therein, a fluid flow duct 1501 branches into ducts 1502 and 1503, which in turn lead to cyclones 1504 and 1505. The fluid flowing within duct 1501 continuously or periodically contains one or more types of particles or other materials 1512 which are desired to be removed from the fluid flow stream. The cyclone separators 1504 or 1505, may be any cyclone separators or combination of cyclone separators known in the art, or any individual cyclone design or combination of cyclones described within this specification including but not limited to top inlet cyclones, side wall inlet cyclones, bottom inlet inverted cyclones and cyclones with plates. Optionally, the particles 1512 collected in the cyclone separator 1504 are continuously or periodically transferred into the ducts 1501 and/or 1503 by means 1514 so that over time most of the particles are collected in cyclone 1505 other than those which pass to an optional particle separation member 1510 due to the efficiency limitations of cyclones 1505 and 1504. Optionally, the air outlet 1506 from cyclone 1504 passes through duct 1507 to the optional particle separation member 1510, which is adjacent to the suction source 1511.

One advantage of this configuration is that, when used, e.g., in a vacuum cleaner, the transfer of particles from cyclone 1504 to cyclone 1505 allows the user to empty a single container, which simplifies emptying the vacuum cleaner.

In an alternate embodiment, material collected may be conveyed to container 1513. This container 1513 may be reusable or disposable, made of one or more organic or inorganic polymers, rubber, plastic, paper, cardboard, glass or metal, or any combination thereof, and be in the form of a bag, box, bottle, jar, bin or any other closed or semi closed form for easy disposal of the particles or transfer of the particles for other uses or operations. Accordingly, an advantage of this alternate embodiment is that a single automated mechanism may be used to continuously or periodically transfer the collected particles 1512 into a container 1513 as controlled by particle transfer means 1515.

It is understood that the container 1513 could optionally be fully or partially closed or sealed by the action of the user or optionally be automatically partially or fully closed or sealed by the mechanism of the system when the user initiates or carries out the release or removal of the container 1513. The container 1513 is preferably designed to contain most or all of the particles 1512. It is understood that the container 1513 or a portion of the container 1513 need not be gas or liquid tight but that it may be porous or contain a porous area or member which may optionally facilitate the entry and or exit of fluids, to optionally facilitate the disinfection of the container 1513 and/or its contents by the use of chlorine gas, ozone gas, pure oxygen or other agents, to optionally facilitate the compacting of the container 1513 and/or its contents by allowing gases to escape, and/or facilitates the container 1513 and/or its contents to biodegrade.

The particle transfer means 1514 may consist of a door mechanism which periodically opens to allow the particles to fall into a region from which the particles 1512 are drawn into ducts 1501 and/or 1503, during which time the suction source 1511 may either be turned off or its influence on cyclone separator 1504 interrupted such as by a valve 1516. The particle transfer means 1514 may alternately comprise a rotating member similar to a revolving door disposed vertically, horizontally, or at any angle which continuously or periodically transfers particles 1512 into a region from which the particles are conveyed by gravity or conveyed by means of a mechanism such as a screw or plunger into the duct member 1501 and/or 1503 by means of the duct members 1518 and 1517 respectively during which time the suction source 1511 may either be turned off or its influence on cyclone separator 1504 may optionally be interrupted by an optional member such as a valve 1516.

The particle transfer means 1515 may be the same as or different from particle transfer means 1514 transferring particles 1512 to container 1513 by means of the duct member 1519 during which time the suction source 1511 may either be turned off or its influence on cyclone separator 1505 may be optionally interrupted by an optional member such as a valve 1520.

The particle transfer means 1514 and 1515 may alternately each comprise a door that opens and closes periodically or by the action of the user, a vibratory plate, or a vibratory plate in combination with a valve or door.

It is understood that the operation of transferring the particles from cyclones 1504 and 1505 may be continuously actuated; automatically actuated on a periodic basis; actuated or halted in response to a particle level within the cyclones or within the container 1513; actuated in response to a sensor; actuated by the interaction of the user with the system such as attempting the removal of the cyclone 1505; the optional container 1513, or by the powering up or powering down of the system, or by a combination of one or more of these methods.

It is also understood that this invention can be applied to groups or arrays of cyclones wherein 1504 and 1505 represent a plurality of cyclones in parallel rather than a single cyclone.

It is understood that the optional particle separation member 1510 may be a cyclone, a plurality of parallel cyclones, two or more cyclones connected in series, two or more cyclonic stages wherein each cyclonic stage comprises a plurality of cyclones in parallel, two or more cyclonic stages wherein each cyclonic stage comprises a plurality of cyclones in parallel and each individual cyclone in an upstream array of cyclones in parallel is in series fluid flow communication with a single cyclone of the downstream array of cyclones in parallel, two or more cyclonic stages wherein each cyclonic stage comprises a plurality of cyclones in parallel and each individual cyclone in an upstream array of cyclones in parallel is in series fluid flow communication with more than one cyclone of the downstream array of cyclones in parallel (e.g. preferably two), two or more cyclonic stages wherein each cyclonic stage comprises a plurality of cyclones in parallel and each individual cyclone in an upstream array of cyclones in parallel is in series fluid flow communication with a manifold which feeds at least one cyclone of the downstream stage, a fibrous filter media, a fibrous media with an adhesive or surface treatment applied to aid in fine particle capture or retention, or a liquid bath through which the fluid stream must pass.

It is also understood that the optional particle separation member 1510 may be physically adjacent to the suction source 1511 or that it may be connected to the suction source 1511 by means of a duct or passage way, which may include one or more bends. It is also understood that the outlet of the cyclones may be through the bottom or side wall of the cyclone, or a combination thereof. It is also understood that the fluid flow 1501 may come from a floor nozzle of a vacuum cleaner or other floor cleaning device, from the wand or hose of a vacuum cleaner or other cleaning device, from the air in a room, from a fluid wherein one or more particles sizes or types is to be separated, from another source similar to those described above with reference to optional particle separation member 1510 or from a liquid bath through which the fluid stream must pass.

Figure 15A:
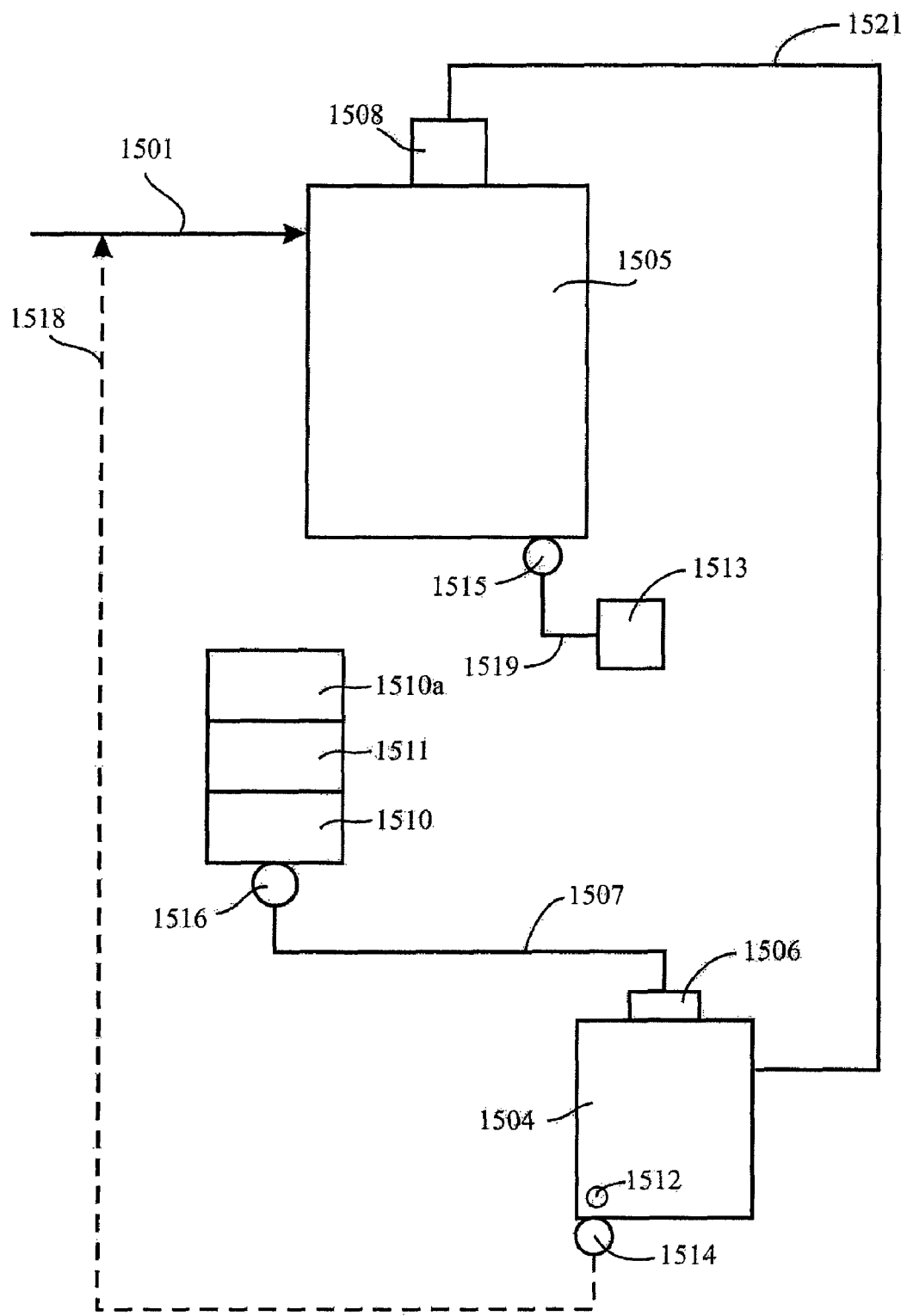
FIG. 15a is an alternate schematic drawing of a vacuum cleaner having a plurality of cyclones in accordance with an alternate preferred embodiment of this invention.

An alternate embodiment of a plurality of cyclones that are configured such that material that is disentrained by one cyclone is conveyed to another cyclone by introducing the separated material into the fluid flow stream that travels to the other cyclone is exemplified in FIG. 15*a*. FIG. 15*a* shows a fluid flow duct 1501, which leads to cyclone separator 1505. The fluid flowing within duct 1501 continuously or periodically contains one or more types of particles or other materials 1512 which it is desired be removed from said fluid flow stream. The cyclone separator 1504 may be designed to capture finer particles more efficiently as it is in series with and downstream of cyclone separator 1505.

The particles 1512 collected in the cyclone separator 1504 are continuously or periodically transferred by means 1514 into the duct 1501 so that over time more of the particles collect in cyclone 1505.

The particle transfer means 1514 operates exactly as described with respect to FIG. 15 except that it only feeds into fluid flow duct 1501 by means of duct member 1518. The particle transfer means 1515 operates exactly as described with respect to FIG. 15 except that in operation valve 1516 would be used to optionally disrupt the influence of suction source 1516 on cyclone 1505 as the cyclones 1504, 1505 are in series.

The air outlet 1506 from cyclone 1504 passes through duct 1507 to the optional particle separation member 1510, which is adjacent to the suction source 1511. It is also understood that an optional particle separation member 1510*a*, which is adjacent to the outlet of the suction source 1511 can also be provided. It is understood that the members 1510 and 1510*a* may optionally be removed together for cleaning and may be placed mechanically adjacent to each other. It is understood that the optional particle separation member 1510 or 1510*a* may be the same as described with respect to FIG. 15.

It is also understood in this invention that the optional particle separation member 1510 or 1510*a* may be physically adjacent to the suction source 1511 or that it may be connected to said suction by means of a duct or passage way which may include one or more bends. It is also understood that the outlet of the cyclones way be through the bottom or sidewall of the cyclone, or a combination thereof.

It is also understood that the fluid flow 1501 may come from any source as described with respect to FIG. 15.

It is also understood in this invention that the cyclone separators 1504 and 1505 may each represent a single or a plurality of parallel cyclones, and that this invention may be applied to more than two sequential cyclones so that the particles 1512 are collected in a number of cyclones or cyclone stages which is less than the total number of cyclones or cyclone stages. It is also understood that 1510 or 1510a may themselves be a plurality of cyclones mounted into the wall or the portion of the wall of a larger cyclone thereby creating a structure which minimizes energy losses in connecting ducts. It is also understood that the structures described in FIGS. 15 and 15A can be configured to remove nano-sized particles and live virus particles.

Transparent Plastic Sections

In accordance with another aspect, which may be used individually or with any other aspect, a surface cleaning apparatus has a plurality of cyclones in parallel 9 having at least one dirt collection chamber 52 wherein at least a portion of the dirt collection chamber below the maximum fill position (which may be a maximum fill line marked on the housing) is transparent.

For example, in the embodiment of FIG. 2a, second stage cyclones each have a dirt collection chamber 52 having an outer wall 100 that is transparent. Further, cyclone chamber 102 has an outer wall 104 that is transparent. Second stage cyclones 9 are provided within a casing or housing having a side wall 106 and a top wall 108 which are transparent. Provided that a portion of side wall 106 that is outward of the maximum fill line of dirt collection chamber 52 is transparent, then a user may view the maximum fill line or position and determine when to empty the second stage dirt collection chambers 52. It will be appreciated that, as exemplified, each of the second stage cyclones and the second stage cyclone housings may be made from transparent plastic (which may be shaded or tinted but still permit a user to see therethrough) and that part may be masked by a label or coating so as to render part thereof opaque. Provided the user can view when the dirt collection chamber(s) 52 are full, the user will have a visual signal to clean or empty the second stage cyclones. This design is particularly preferred when the plurality of cyclones 9 has an associated plurality of dirt collection chambers 52, and preferably each cyclone 9 has an associated dirt collection chamber 52, and, particularly, when the cyclones 9 are emptied separately from another cleaning stage.

Alternately, or in addition, a filter 112 (e.g., foam, HEPA, etc.) may be provided in a housing 110 wherein at least a portion of the housing that is visible, or may be made visible, is transparent. Preferably, all of housing 110 is transparent plastic. This permits a user to notice when filter 112 is dirty and requires cleaning or replacement. preferably, housing 110 is a pre-motor filter. Accordingly, for example, housing 112 may be provided in pre-motor area 16. Thus when cyclonic cleaning unit 6 is removed, a user can view housing 110, e.g., the top thereof. However, it will be appreciated that filter 112, which is not provided in the cyclone chamber, may be visible through a transparent side wall of the vacuum cleaner or may housing 110 may be visible when a door that is provided in the vacuum cleaner is opened. An advantage of using a housing is that the consumer need not touch filter 112 when removing filter 112 from the vacuum cleaner.

It will be appreciated that one or more filters (e.g., foam) may be removable with the cyclone array 156 and that these may be provided in a housing, a portion or all of which is transparent.

Uses

It is also understood that any or all of the embodiments may be used individually or in combination or sub-combinations. In addition to their use in surface cleaning appliances and other domestic appliances and breathing masks, they may also be used, singly or in combination, in other applications.

For example, the cyclonic embodiments described herein may be used in conjunction with a fan or other air moving means to create a sweeper, a sweeper with suction, a vacuum cleaner, a canister vacuum cleaner, an upright vacuum cleaner, a wet/dry vacuum cleaner, a stick vacuum cleaner, a carpet shampooer, a carpet extractor, a hand vacuum, a back pack vacuum, a vehicle mounted vacuum, or any other type of vacuum cleaner or dust extractor or to pick up unwanted particles and to subsequently remove unwanted particles from air.

Alternately, the cyclonic embodiments described herein may be applied to the inlet for cooling air to, and/or the outlet of air from, computers, electronic equipment, or mechanical equipment to protect a computer or equipment from particles, which may damage them or impair their function.

It is also understood that the cyclonic embodiments described herein may be used in conjunction with a fan or other air moving means to create an air cleaner, air purifier, airborne particle capture system, fan with a particle capture system, automotive cabin air filter, heating, cooling or ventilation system to capture unwanted particles from an air stream.

It is also understood that the cyclonic embodiments described herein may be used in conjunction with a fan or other air moving means to create a filter mask to capture unwanted particles from an air stream. A filter mask constructed with the cyclones descried in this specification or with any cyclones known in the art may be designed to filter the air that a person breathes in, breathes out, or both, so as to be able to create a portable means of isolating a person from their surrounding environment. A small fan may optionally be used to reduce the pressure that the person must exert with their lungs to breathe in and/or out through the cyclonic means.

It is also understood that the cyclonic embodiments described herein may be used in conjunction with a fluid moving device to create a means of removing unwanted particles from fluid. The cyclonic embodiments described in this specification may be placed in the duct leading to the fluid moving member, either directly adjacent or some distance away, to protect the fluid moving member from the particles and to remove them. The cyclonic embodiments described herein may alternately or also be placed in the duct leading from a fluid moving member, either directly adjacent or some distance away, to protect equipment downstream from the fluid moving member from the particles which the fluid moving member may introduce to the fluid stream. The positioning of the cyclonic embodiments described herein may be mechanically arranged so that they can both be removed for cleaning or servicing together.

It is also understood that the cyclonic inventions described herein may be used to reduce the particle emissions from any type of burner used to heat homes, heat water, and to remove emissions from the exhaust gasses from industrial processes, the exhaust gasses from internal combustion engines, the exhaust gasses from external combustion engines and the exhaust gasses from turbine engines. The cyclonic embodiments described herein may be placed in the duct leading to or from the emission source, either directly adjacent or some distance away, to protect the particle emission causing device from particles in the air stream which they require to operate. The cyclonic embodiments described herein may alternately or also be placed in the duct leading from the particle emissions source, either directly adjacent or some distance away, to protect equipment downstream from the emissions source and the environment from the particles which the emissions source may introduce into its exhaust stream.

The advantage of the multi stage cyclonic separation means described herein is that a vacuum cleaner, filter mask or other apparatus mentioned herein may be produced which can optionally reach HEPA or ULPA separation levels without the use of a filter.

The cyclonic separation means employed in this manner may be cleaned or disposed of, or a combination thereof.

Optional Fluid Flow Motors

The fan means used in any aspect may be a two to ten stage fan system operating from one or more motors in series or in parallel and the fan may be a propeller, an impeller, a Prandtl layer turbine also known as a Tesla turbine, or a combination thereof.

Optionally, the vacuum cleaner may be powered by means of a Stirling engine, a steam engine, or an internal combustion engine wherein said Stirling engine, steam engine, or internal combustion engine may optionally be operated from hydrogen gas produced by electricity from the wall or from a battery or produced by a chemical reaction or which may optionally be withdrawn from a storage vessel. The option to manually or automatically switch the hydrogen source powering the vacuum from one source to another may be provided. It is to be appreciated that a hydrogen powered appliance, including surface cleaning apparatus and other appliances for indoor use, may operate using any design known in the respective arts.

Hydrogen produced by electricity when an appliance, e.g. a surface cleaning apparatus, preferably a vacuum cleaner, is plugged into an electric outlet may be used to power the surface cleaning apparatus. All or a portion of the hydrogen may be stored for cordless operation. It will be appreciated that some hydrogen may be used as it is generated to operate the device. Such a hydrogen powered surface cleaning apparatus may be used alone or in combination with any other embodiment disclosed herein. The hydrogen produced by electricity when the vacuum is plugged in but not being used is a preferred method of operating. The storage means contemplated is any means known in the art including but not limited to pressurized storage, storage in a metal hydride or other adsorptive storage means. The hydrogen stored may be produced by fuel reforming, chemical reactions or by electrolysis. Alternately, or in addition, a central hydrogen generator which charges a small portable "vessel" which is plugged into the air cleaning device may be provided.

Adhesive Member

It is also understood that in any embodiment, an adhesive material such as agar or pectin or a rubber based adhesive may be applied to the all or a portion of interior surfaces of cyclone separator 20 to assist in the capture and retention of fine particles. For example, the adhesive can be applied to the interior and exterior of the down flow tubes 27*b* and 27*c* and/or plate 32 which may be removed for cleaning when the bottom of the cyclones is removed or this section may be disposed of and replaced with a clean piece with fresh adhesive. Alternately, or in addition, the mesh used to construct the screen 28 may incorporate an adhesive or micro-filaments, which aid in the entrapment of fibers, hairs or particles. Accordingly, if the screen 28 comprises an adhesive material, it will be appreciated that the screen 28 may be disposable.

This embodiment is particularly useful in cyclone separators where small quantities of fine particles are to be collected such as in the second, third, or fourth or other sequential stages of a multistage cyclone separator. Alternately, or in addition, the plate may be made from or coated with a fibrous material, such as micro filaments, to assist in retaining dirt in the cyclone casing. It will be appreciated that, in accordance with such embodiments, the plate may be disposable.

Water Mist

In accordance with another aspect, which may be used individually or with any other aspect, a water mist created, preferably, by means of electrostatically and/or mechanically atomization can be placed upstream of a cyclonic embodiment described herein or any cyclonic separation means known in the art to create a humidification means wherein the particles which do not become collected are cyclonically removed from the fluid flow stream. Optionally, one or more or a combination of the cyclonic embodiments described in this specification or any cyclonic separation means known in the art may be placed upstream of the mist source to prevent airborne particles from contaminating or otherwise interfering with the operation of the mist source.

The water, which does not evaporate, may be recirculated though a filter and/or ozone disinfection and oxidation system and/or ultra violet light disinfection system before it is reused in the atomization process. If ozonated water is used to create the mist, air disinfection can be achieved before a down stream cyclone separator is employed to remove the remaining ozonated water droplets from the air stream.

It is also understood that ozone gas can be introduced into an air stream to oxidize pollutants and to disinfect airborne particles upstream and that the down stream cyclone separator can remove oxidized particles and that if optionally, an electrostatic and/or mechanical atomization mist source is employed, the ozone gas can be captured in the water droplets and the water droplets can be removed by means of a down stream cyclone separator.

The improvements may be used in a single application, or individually or in sub-combinations. In particular, the improvements in the design of cyclones and arrays of cyclones may be used in a single application, or individually or in sub-combinations. For example, one or more of the improvements may be used in a single vacuum cleaner. The improvements which are selected may be determined based on the degree of particulate removal which is required, whether a pre and/or post motor filter is utilized, the amount of back pressure which may be produced by the air flow path through the vacuum cleaner, the power of the suction motor and the like.

It will be appreciated that various modifications and alterations of the embodiments known herein may be made and each is within the scope of the following claims.

The invention claimed is:

1. A surface cleaning apparatus cleaner comprising:

(a) a dirty air inlet;

(b) a handle;

(c) a cyclone chamber having a longitudinal axis, a fluid inlet downstream from the dirty air inlet, a dirt outlet comprising an opening at a first end of the cyclone chamber and a fluid outlet spaced from the first end, the opening having an area;

(d) a plate having a cyclone chamber surface and the cyclone chamber surface of the plate having an area that is larger than the area of the opening;

(e) a passage extending between the cyclone chamber and a dirt collection chamber, the passage defined at least in part by first and second opposed walls extending at an angle to the longitudinal axis such that separated dirt travels at least outwardly as the dirt travels through the passage; and, (f) an air flow motor.

2. The surface cleaning apparatus of claim 1 wherein the passage is formed between the cyclone chamber surface of the plate and an end surface of the first end of the cyclone chamber.

3. The surface cleaning apparatus of claim 2 wherein the cyclone chamber has an inner surface adjacent the first end and the dirt collection chamber has an inner surface adjacent the dirt outlet, the plate is positioned spaced from the end surface and the inner surface of the dirt collection chamber has a perimeter that is larger then a perimeter of the inner surface of the cyclone chamber adjacent the first end.

4. The surface cleaning apparatus of claim 1 wherein the plate comprises a disc positioned adjacent a cyclone chamber end of the dirt collection chamber and the dirt collection chamber extends under at least a portion of the disc.

5. The surface cleaning apparatus of claim 1 further comprising a flow director having a flow directing surface that extends inwardly and downwardly into the cyclone chamber from an outer wall of the cyclone chamber to a position spaced from the plate and the passage is formed between the flow director and the cyclone chamber surface of the plate.

6. The surface cleaning apparatus of claim 1 wherein the passage extends generally transverse to a longitudinal axis of the cyclone chamber.

7. The surface cleaning apparatus of claim 1 wherein the opening is in a plane transverse to the longitudinal axis of the cyclone chamber.

8. The surface cleaning apparatus of claim 1 wherein the first and second opposed walls extend transversely.

9. The surface cleaning apparatus of claim 1 wherein the passage is L shaped in vertical section taken along the longitudinal axis.

10. A surface cleaning apparatus comprising:
(a) a dirty air inlet;
(b) a handle;
(c) a cyclone chamber having a longitudinal axis, a fluid inlet downstream from the dirty air inlet, a fluid outlet and a dirt outlet at a dirt outlet end of the cyclone chamber;
(d) a plate having a cyclone chamber surface;
(e) a passage extending between the cyclone chamber surface and an end surface at the dirt outlet end of the cyclone chamber, wherein the dirt outlet comprises an opening in the end surface, the opening is in a plane transverse to the longitudinal axis of the cyclone chamber, the cyclone chamber surface having an area that is larger then the area of the opening and,
(f) an air flow motor.

11. The surface cleaning apparatus of claim 10 wherein the cyclone chamber has an inner surface adjacent the opening and the dirt collection chamber has an inner surface adjacent the plate, the plate is positioned spaced from the opening and the inner surface of the dirt collection chamber has a perimeter that is larger then a perimeter of the inner surface of the cyclone chamber adjacent the opening.

12. The surface cleaning apparatus of claim 10 wherein the plate comprises a disc positioned adjacent a cyclone chamber end of the dirt collection chamber and the dirt collection chamber extends under at least a portion of the disc.

13. The surface cleaning apparatus of claim 10 further comprising a flow director having a flow directing surface that extends inwardly into the cyclone chamber from an outer wall of the cyclone chamber to a position spaced from the plate and the passage is formed between the flow director and the cyclone chamber surface of the plate.

14. The surface cleaning apparatus of claim 10 wherein the passage extends generally transverse to a longitudinal axis of the cyclone chamber.

15. The surface cleaning apparatus of claim 10 wherein the passage comprising a first portion that extends in a first direction and a second portion that extends in a second direction that is at an angle to the first direction.

16. The surface cleaning apparatus of claim 10 wherein the passage is L shaped in vertical section taken along the longitudinal axis.

17. A surface cleaning apparatus comprising:
(a) a dirty air inlet;
(b) a handle;
(c) a cyclone chamber having a longitudinal axis, a fluid inlet downstream from the dirty air inlet, a dirt outlet at a first end of the cyclone chamber;
(d) a plate having a cyclone chamber surface;
(e) a passage extending between the cyclone chamber and a dirt collection chamber, the passage comprising a first portion that extends in a first direction and a second portion that extends in a second direction that is at an angle to the first direction; and,
(f) an air flow motor.

18. The surface cleaning apparatus of claim 17 wherein the first portion conveys separated dirt outwardly.

19. The surface cleaning apparatus of claim 18 wherein the second portion conveys separated dirt away from the cyclone chamber.

20. The surface cleaning apparatus of claim 17 wherein the first portion extends transversely to the longitudinally extending axis.

21. The surface cleaning apparatus of claim 20 wherein the second portion extends longitudinally.

22. The surface cleaning apparatus of claim 20 wherein the fluid outlet is spaced from the first end.

23. The surface cleaning apparatus of claim 17 wherein the passage is L shaped in vertical section taken along the longitudinal axis.

* * * * *